(12) United States Patent
Matsusaka

(10) Patent No.: US 7,760,439 B2
(45) Date of Patent: Jul. 20, 2010

(54) VARIABLE POWER OPTICAL SYSTEM, IMAGING LENS DEVICE AND DIGITAL APPARATUS

(75) Inventor: Keiji Matsusaka, Osaka (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 92 days.

(21) Appl. No.: 12/091,353

(22) PCT Filed: Oct. 19, 2006

(86) PCT No.: PCT/JP2006/320853

§ 371 (c)(1),
(2), (4) Date: Jun. 10, 2008

(87) PCT Pub. No.: WO2007/049504

PCT Pub. Date: May 3, 2007

(65) Prior Publication Data

US 2009/0115884 A1 May 7, 2009

(30) Foreign Application Priority Data

Oct. 25, 2005 (JP) .............................. 2005-310418

(51) Int. Cl.
*G02B 15/14* (2006.01)
(52) U.S. Cl. ........................................ 359/680; 359/682
(58) Field of Classification Search .................. 359/680, 359/682, 689, 691
See application file for complete search history.

(56) References Cited

U.S. PATENT DOCUMENTS

| | | | |
|---|---|---|---|
| 6,515,804 B2 | 2/2003 | Watanabe et al. | ............ 359/689 |
| 6,611,386 B2 | 8/2003 | Tanaka | ........................ 359/689 |
| 6,943,962 B2 | 9/2005 | Sekita | ........................ 359/689 |

(Continued)

FOREIGN PATENT DOCUMENTS

EP    1950593 A2 *  7/2008

(Continued)

OTHER PUBLICATIONS

Supplementary European Search Report dated Jun. 17, 2009 for counterpart European Application No. EP 06 81 2031.

*Primary Examiner*—David N Spector
(74) *Attorney, Agent, or Firm*—Sidley Austin LLP

(57) ABSTRACT

There is provided a zoom optical system having lens elements produced with less difficulty i.e. with substantially the same skill level as the conventional arrangement, with sufficient miniaturization. The zoom optical system includes a first lens group having a negative optical power, and a second lens group having a positive optical power in the order from the object side, the distance between the first lens group and the second lens group being decreased in zooming from a wide angle end to a telephoto end. The first lens group is constituted of a negative lens element and a positive meniscus lens element. The second lens group is constituted of a biconvex positive lens element and a negative meniscus lens element. Assuming that D1 represents a thickness of the first lens group on the optical axis AX from a forwardmost lens surface to a rearmost lens surface, fw represents a composite focal length of the entirety of the optical system at the wide angle end, and f2 represents a composite focal length of the second lens group, the zoom optical system satisfies the following relation:

$0.5 < D1/fw < 0.8$ $0.7 < f2/fw < 2.0$

5 Claims, 22 Drawing Sheets

U.S. PATENT DOCUMENTS

| | | | |
|---|---|---|---|
| 6,968,128 B2 | 11/2005 | Itoh | 396/79 |
| 7,050,242 B2 | 5/2006 | Adachi | 359/689 |
| 7,145,732 B2 | 12/2006 | Matsusaka et al. | 359/689 |
| 2001/0022694 A1 | 9/2001 | Tanaka | 359/680 |
| 2004/0212898 A1 | 10/2004 | Adachi | 359/680 |
| 2004/0223231 A1* | 11/2004 | Sekita | 359/680 |
| 2005/0018314 A1 | 1/2005 | Yamaguchi et al. | 359/676 |
| 2005/0231817 A1* | 10/2005 | Matsusaka et al. | 359/680 |

FOREIGN PATENT DOCUMENTS

| | | | |
|---|---|---|---|
| JP | 2001-4920 A | 1/2001 | |
| JP | 2001-242378 A | 9/2001 | |
| JP | 2001-318311 A | 11/2001 | |
| JP | 2002-14284 A | 1/2002 | |
| JP | 2002-365542 A | 12/2002 | |
| JP | 2004-325975 A | 11/2004 | |
| JP | 2004-333767 A | 11/2004 | |
| JP | 2005-128194 A | 5/2005 | |
| JP | 2005-292403 A | 10/2005 | |
| WO | WO 2007/049504 A3 | 5/2007 | |

* cited by examiner

FIG. 22
SCHEMATIC DIAGRAMS ON LENS
GROUP MOVEMENT IN ZOOMING
EXAMPLES 1, 2, 7 ⇒ Gr1: U-TURN, Gr3: FIXED
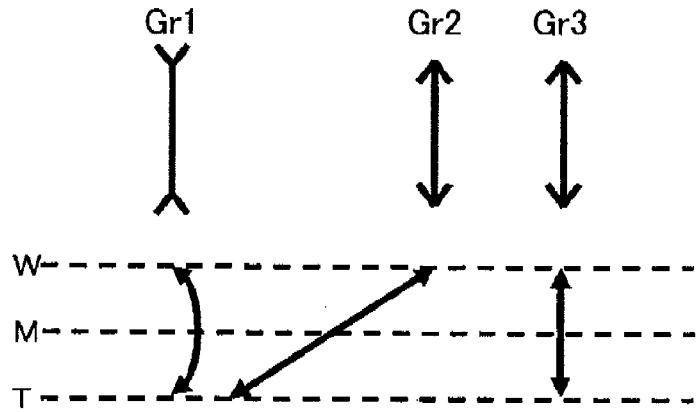
EXAMPLE 3 ⇒ Gr1: U-TURN, Gr3: FIXED, ENTIRE LENGTH AT WIDE ANGLE END>ENTIRE LENGTH AT TELEPHOTO END
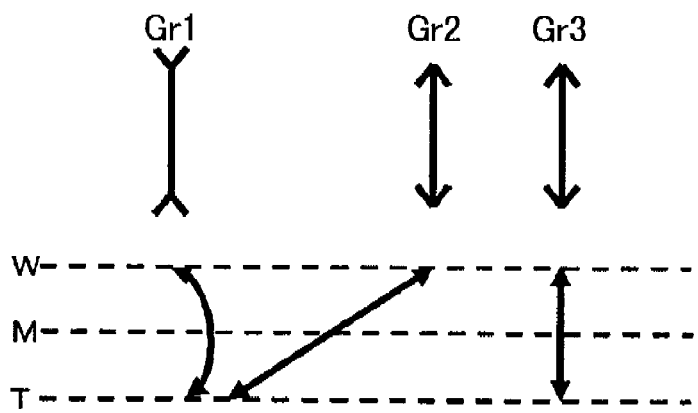
EXAMPLE 4 ⇒ FIXED, Gr3: U-TURN, Gr4: FIXED
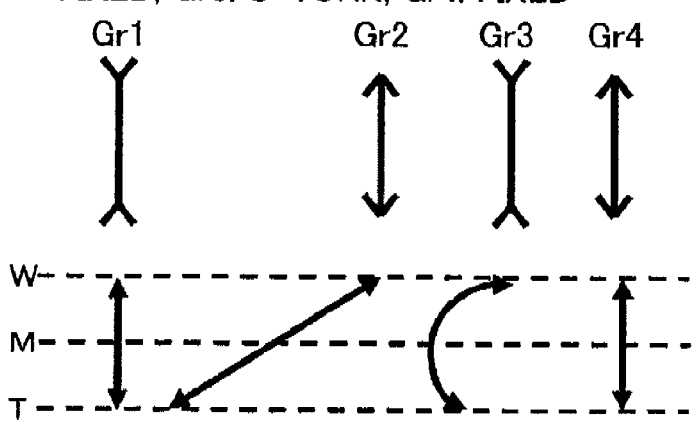

FIG. 23
EXAMPLE 5 ⇒ Gr1: U-TURN
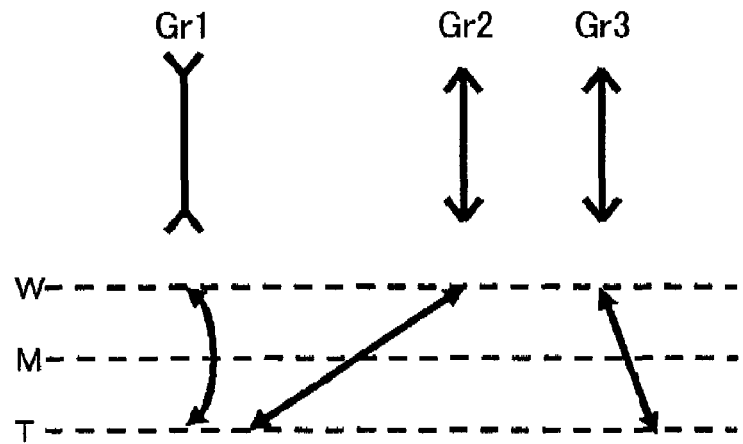
EXAMPLE 6 ⇒ Gr1: U-TURN, ENTIRE LENGTH AT WIDE ANGLE END>ENTIRE LENGTH AT TELEPHOTO END
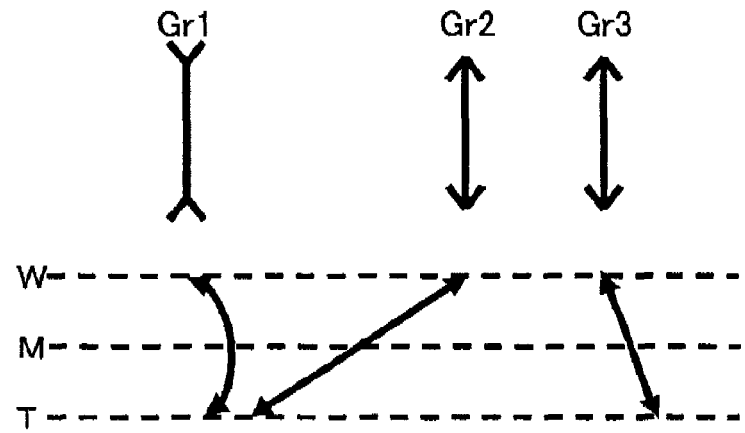
EXAMPLE 8
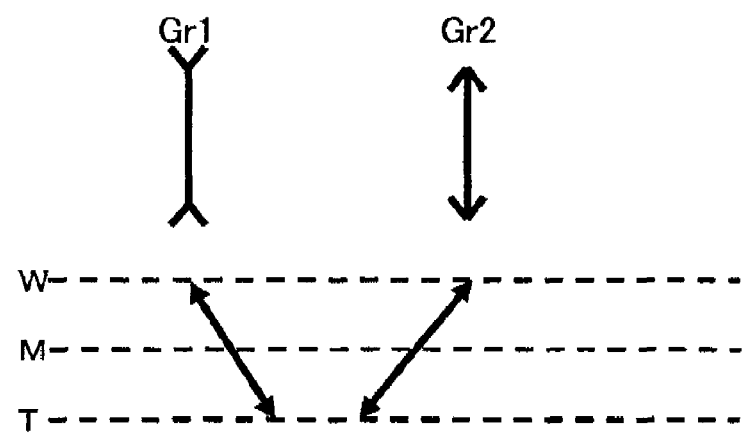

VARIABLE POWER OPTICAL SYSTEM, IMAGING LENS DEVICE AND DIGITAL APPARATUS

RELATED APPLICATIONS

This application is a National Stage of International Application No. PCT/JP2006/320853, filed Oct. 19, 2006, which is based on Japanese Patent Application No. 2005-310418, the entire contents of which is incorporated herein by reference.

TECHNICAL FIELD

The present invention relates to a zoom optical system constituted of lens groups and adapted to zoom by changing the distance between the lens groups in the optical axis direction, an imaging lens device incorporated with the zoom optical system, and a digital apparatus loaded with the imaging lens device, and more particularly to a zoom optical system or a like device suitable for miniaturization.

BACKGROUND ART

In recent years, mobile phones or PDAs (Personal Digital Assistants) have been widespread. Also, the specifications in which a compact digital still camera unit or a compact digital video unit is incorporated in the mobile phone or the PDA have been generalized. In a digital apparatus such as the mobile phone or the PDA, a small and low-pixel-number image sensor, as compared with an independent product such as a digital still camera, and an imaging lens device provided with a single focus optical system constituted of one to three plastic lens elements are generally used, in view of severe constraints regarding the size or cost of the digital apparatus.

Since the magnification of the single focus optical system is substantially equivalent to visual magnification, an object to be photographed is limited to the one located near a photographer. Under the current rapid development of high-pixel, high-resolution image sensors, there is a demand for a compact zoom optical system that is compatible with a high-pixel image sensor, and is loadable in a mobile phone or a like device capable of photographing a subject remotely away from a photographer.

For instance, patent document 1 discloses a negative-positive two-component zoom optical system, which is made compact by forming an image-side lens surface closest to the object side into an aspherical shape. In the zoom optical system, since the curvature of the image-side lens surface closest to the object side is large, it is difficult to produce the image-side lens surface by molding. It is required to produce a so-called composite aspherical lens element by coating a resin on a spherical lens element, which may increase the production cost. Also, since production error sensitivity is high with respect to the lens elements in both of the first lens group and the second lens group, an adjustment operation is required at the time of assembling the lens elements, which may further increase the production cost.

Patent document 2 discloses a negative-positive-positive three-component zoom optical system, wherein a moving amount of the lens elements for zooming is suppressed by increasing a zoom load of the second lens group. The optical system disclosed in patent document 2, however, uses three lens elements in each of the first lens group and the second lens group, which is far from sufficient miniaturization.

Patent document 3 discloses a negative-positive-positive-positive four-component zoom optical system, wherein the total thickness of lens elements in a collapsed state is reduced by using an aspherical lens element made of a material having a high refractive index and a low dispersion rate in the second lens group. However, since impact resistance required in a mobile terminal is significantly large, it is difficult to employ a collapsible structure itself. Further, since the optical power of the second lens group in the optical system proposed in patent document 3 is small, a large moving amount is required in the second lens group. Consequently, the entire optical length of the optical system in a use state may be too large for a mobile terminal.

A retrofocus arrangement incorporated with a first lens group having a negative optical power is suitable in an optical system which uses an image sensor and has a zoom ratio of about two to three times, considering general requirements of securing a back focus distance, maintaining a telecentric state, or the like. However, in the case where the retrofocus arrangement is employed, the negative optical power is increased, as the zoom optical system is miniaturized. As a result, the curvature of the lens elements in the first lens group may be unduly increased, which may increase the expansion ratio of the lens elements. Thus, it may be difficult to produce a zoom optical system or measure a surface configuration of lens elements.

Patent document 1: Japanese Unexamined Patent Publication No. 2001-4920

Patent document 2: Japanese Unexamined Patent Publication No. 2001-318311

Patent document 3: Japanese Unexamined Patent Publication No. 2002-365542

DISCLOSURE OF THE INVENTION

In view of the above conventional disadvantages, it is an object of the present invention to provide a zoom optical system, an imaging lens device, and a digital apparatus having lens elements in a first lens group produced with less difficulty i.e. with substantially the same skill level as the conventional arrangement, with sufficient miniaturization.

A zoom optical system according to an aspect of the invention includes a first lens group having a negative optical power, and a second lens group having a positive optical power in the order from an object side, a distance between the first lens group and the second lens group being decreased in zooming from a wide angle end to a telephoto end The first lens group includes at least one negative lens element and at least one positive lens element. The second lens group is constituted of three or less lens elements. The zoom optical system satisfies the conditional expressions (1) and (2).

$$0.5 < D1/fw < 0.8 \quad (1)$$

$$0.7 < f2/fw < 2.0 \quad (2)$$

where

D1: a thickness of the first lens group on an optical axis from a forwardmost lens surface to a rearmost lens surface, fw: a composite focal length of an entirety of the optical system at the wide angle end, and f2: a composite focal length of the second lens group.

A zoom optical system according to another aspect of the invention includes a first lens group having a negative optical power, and a second lens group having a positive optical power in the order from an object side, a distance between the first lens group and the second lens group being decreased in zooming from a wide angle end to a telephoto end. The first lens group includes at least one negative lens element and at least one positive lens element. The second lens group is constituted of three or less lens elements. The zoom optical system satisfies the conditional expressions (3) and (4):

$$|\Delta Z1pi/d1pi|<0.2 \qquad (3)$$

$$0.7<f2/fw<2.0 \qquad (4)$$

where $\Delta Z1pi$: a sag amount of an image-side lens surface of a positive lens element in the first lens group at a maximum effective radius, with a vertex of the lens surface being defined as a reference, $d1pi$: the maximum effective radius of the image-side lens surface of the positive lens element in the first lens group, $fw$: a composite focal length of an entirety of the optical system at the wide angle end, and $f2$: a composite focal length of the second lens group.

An imaging lens device according to yet another aspect of the invention includes the aforementioned zoom optical system, and an image sensor for converting an optical image of a subject into an electrical signal, wherein the zoom optical system is operable to form the optical image of the subject on a light receiving surface of the image sensor.

A digital apparatus according to still another aspect of the invention includes the aforementioned imaging lens device, and a controller for causing the imaging lens device and the image sensor to perform at least one of still image shooting and moving image shooting of the subject, wherein the zoom optical system of the imaging lens device is mounted in such a manner as to be operable to form the optical image of the subject on the light receiving surface of the image sensor.

These and other objects, and novel features of the present invention will become more apparent upon reading the following detailed description along with the accompanying drawings.

BRIEF DESCRIPTION OF THE DRAWINGS

FIGS. 4A and 4B are diagrams showing an external appearance of a camera phone loaded with a zoom optical system embodying the invention, wherein FIG. 4A shows an operating surface of the camera phone, and FIG. 4B shows a back surface of the camera phone.

FIG. 22 is a diagram showing moving directions of the lens groups in the Examples of the zoom optical system embodying the invention.

FIG. 23 is a diagram showing moving directions of the lens groups in the Examples of the zoom optical system embodying the invention.

BEST MODE FOR CARRYING OUT THE INVENTION

Figure 1:
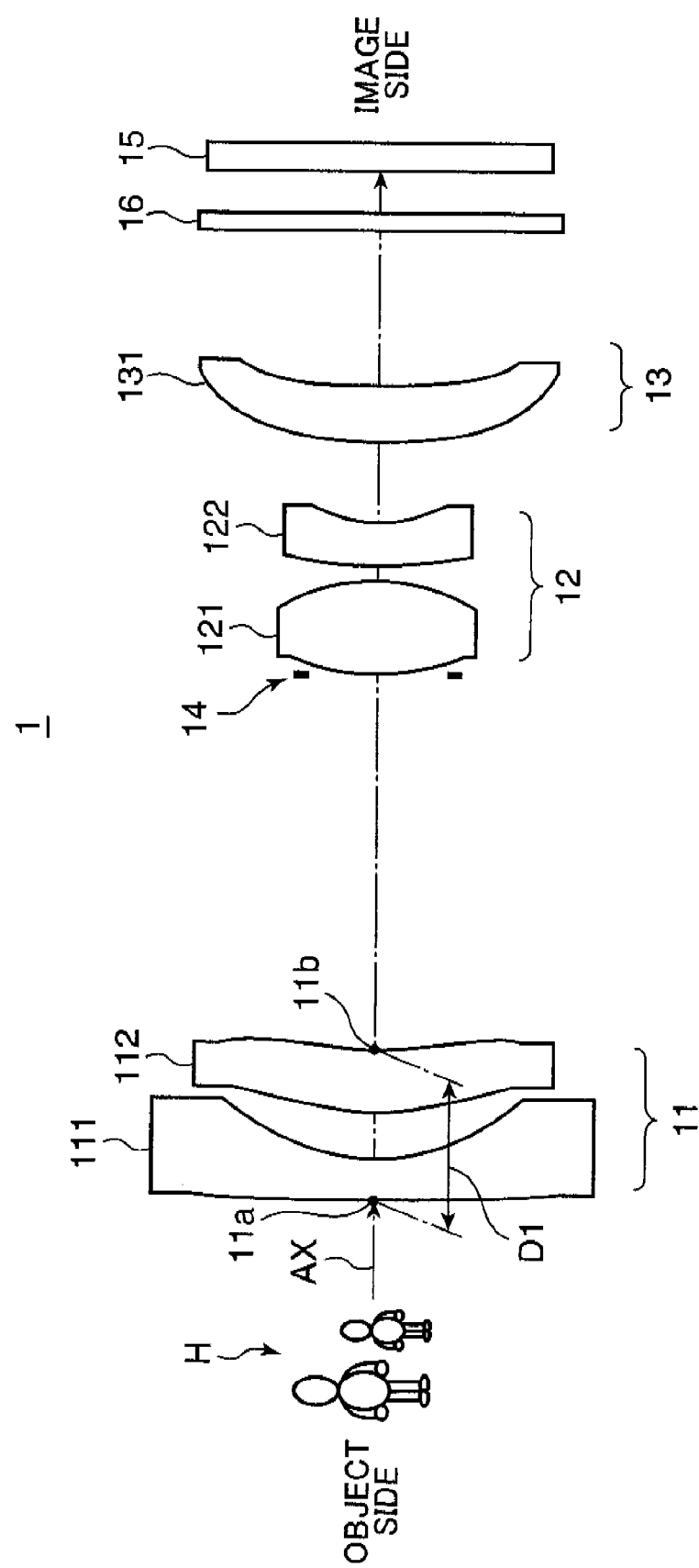
FIG. 1 is a diagram schematically showing an arrangement of an imaging optical system to which an embodiment of the invention is applied.

In the following, an embodiment of the invention is described referring to the drawings. The terms used in the following description are defined as follows throughout the specification.

(a) The refractive index is a refractive index with respect to d-line (wavelength: 587.56 nm).

(b) The Abbe number is an Abbe number vd obtained by the following definitional equation:

$$vd=(nd-1)/(nF-nC)$$

where nd, nF, and nC are refractive indexes with respect to d-line, F-line (wavelength: 486.13 nm), and C-line (wavelength: 656.28 nm), respectively, and vd is the Abbe number.

(c) The indication concerning a surface configuration is an indication based on paraxial curvature.

(d) The optical power of each of single lens elements constituting a cemented lens element is defined in a condition that both lens surfaces of the individual single lens elements face the air.

Figure 2:
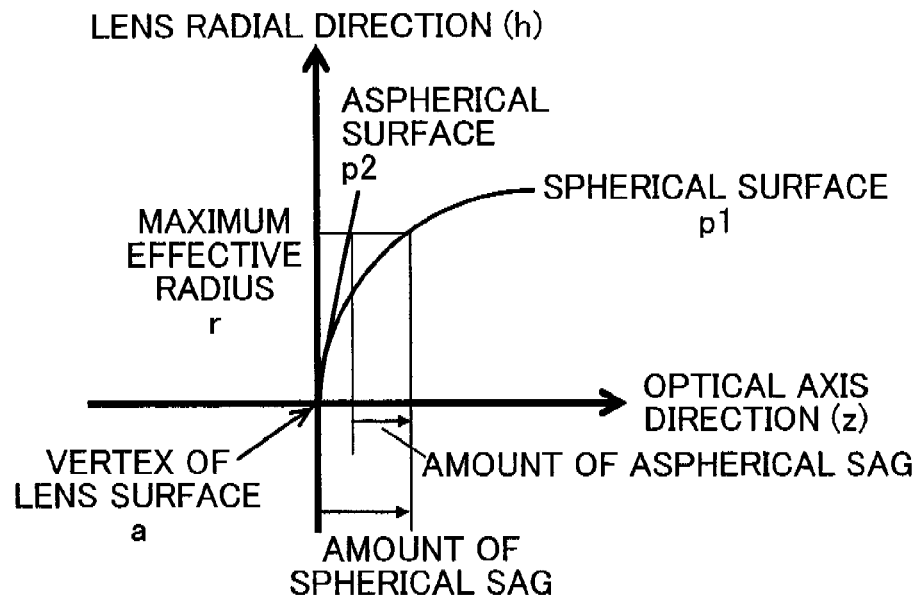
FIG. 2 is a diagram showing a definition on the amount of aspherical sag.

(e) The amount of aspherical sag is a parameter representing a difference between an amount of spherical sag based on paraxial curvature, and a distance in the optical axis direction from a vertex of a lens surface to a point on a curve of an aspherical surface with respect to a maximum effective radius (see FIG. 2).

(f) A resin material to be used as a material for a composite aspherical lens element (a lens element with an aspherical shape, which is obtained by coating a film of resin material on a spherical glass member as a substrate) merely provides an additive function to a glass substrate. Accordingly, the composite aspherical lens element is not regarded as an individual optical member, but is regarded as a single lens element based on the premise that the glass substrate has an aspherical surface. In this case, the refractive index of the glass material composing the glass substrate is defined as the refractive index of the composite aspherical lens element.

(g) Concerning lens elements, the indication "concave", "convex", or "meniscus" shows a shape of a lens element near the optical axis i.e. near the center of the lens element, in other words, shows a shape based on paraxial curvature.

<Description on Arrangement of Zoom Optical System>

FIG. 1 is an optical path diagram at a wide angle end, showing an arrangement example of a zoom optical system 1 embodying the invention. The zoom optical system 1 is adapted to form an optical image of a subject H on a light receiving surface of an image sensor 15 for converting the optical image into an electric signal. The zoom optical system 1 is a zoom optical system, wherein a first lens group 11 having a negative optical power, a second lens group 12 having a positive optical power, and a third lens group 13 having a positive optical power (or a negative optical power) are arranged in this order from an object side (i.e. the side of the subject H), and the distance between the first lens group 11 and the second lens group 12 is decreased in zooming from the wide angle end to a telephoto end.

In this embodiment, the first lens group 11 is constituted of a biconcave negative lens element 111, and a positive meniscus lens element 112 convex to the object side; the second lens group 12 is constituted of a biconvex positive lens element 121, and a negative meniscus lens element 122 convex to the object side; and the third lens group 13 is constituted merely of a positive meniscus lens element 131 convex to the object side. An optical diaphragm 14 is arranged on the object side of the second lens group 12. The image sensor 15 is arranged on the image side of the zoom optical system 1 by way of a low-pass filter 16. In the zoom optical system 1 having the above arrangement, an optical image of the subject H is guided along an optical axis AX toward the light receiving surface of the image sensor 15 with a proper zoom ratio, whereby the optical image of the subject H is captured by the image sensor 15.

In the embodiment of the invention, as exemplified by the zoom optical system 1 having the above arrangement, the first lens group 11 is constituted of at least one negative lens element (i.e. the negative lens element 111), and at least one positive lens element (i.e. the positive meniscus lens element 112); and the second lens group is constituted of three or less lens elements (i.e. the biconvex positive lens element 121 and the negative meniscus lens element 122). In the zoom optical system 1 having the above arrangement, the first lens group 11 closest to the object side has a negative dominant arrangement having a negative optical power. This is advantageous in miniaturizing the entire length of the optical system or the size of a forwardmost lens element in a zoom lens unit having a zoom ratio of about two to three times. Also, since the first lens group 11 has the negative lens element 111 and the positive meniscus lens element 112, magnification chromatic aberration can be desirably corrected. Further, since the second lens group 12 is constituted of two lens elements i.e. the biconvex positive lens element 121 and the negative meniscus lens element 122, the load of a driving device for driving the second lens group 12 whose moving amount in zooming is large can be reduced, thereby enabling to reduce the cost by reducing the number of lens elements.

The zoom optical system 1 is so configured as to satisfy the conditional expression (1) concerning D1/fw, and the conditional expression (2) concerning f2/fw, assuming that D1 represents a thickness of the first lens group 11 in a direction of the optical axis AX from a forwardmost lens surface 11$a$ to a rearmost lens surface 11$b$, fw represents a composite focal length of the entirety of the optical system 1 at the wide angle end, and f2 represents a composite focal length of the second lens group 12.

$$0.5 < D1/fw < 0.8 \tag{1}$$

$$0.7 < f2/fw < 2.0 \tag{2}$$

Satisfying the above requirement enables to provide the compact zoom optical system 1 with a desirable optical performance, without making it difficult to produce lens elements.

According to another aspect, the zoom optical system 1 is so configured as to satisfy the conditional expression (3) concerning |ΔZ1pi/d1pi|, and the conditional expression (4) concerning f2/fw, assuming that ΔZ1pi represents a sag amount of an image-side lens surface (corresponding to the rearmost lens surface 11$b$ in the example of FIG. 1) of the positive meniscus lens element 112, as a positive lens element in the first lens group 11, at a maximum effective radius with a vertex of the lens surface being defined as a reference, d1pi represents the maximum effective radius of the image-side lens surface of the positive meniscus lens element 112, fw represents a composite focal length of the entire optical system at the wide angle end of the zoom optical system 1, and f2 represents a composite focal length of the second lens group 12.

$$|\Delta Z1pi/d1pi| < 0.2 \tag{3}$$

$$0.7 < f2/fw < 2.0 \tag{4}$$

Satisfying the above requirement also enables to provide the compact zoom optical system 1 with a desirable optical performance, without making it difficult to produce lens elements.

In this embodiment, preferably, the value of D1/fw in the conditional expression (1) satisfies the conditional expression (1)'.

$$0.6 < D1/fw < 0.8 \tag{1}'$$

If the value of D1/fw is under the lower limit in the conditional expression (1)', the optical power of each lens element in the first lens group 11 may be weakened, which may likely increase the moving amount required for correcting the image point.

Preferably, the value of f2/fw in the conditional expressions (1) and (4) satisfies the conditional expression (2)'.

$$0.8 < f2/fw < 1.8 \tag{2}'$$

If the value of f2/fw is over the upper limit in the conditional expression (2)', the moving amount of the second lens group 12 required for zooming may be increased, because the optical power of the second lens group 12 is reduced. As a result, the entire length of the optical system may be increased. On the other hand, if the value of f2/fw is under the lower limit in the conditional expression (2)', it is required to adjust the positions between the lens elements, because decentering error sensitivity of the second lens group 12 is increased. As a result, the production cost may be increased.

Preferably, the value of $|\Delta Z1pi/d1pi|$ in the conditional expression (3) satisfies the conditional expression (3)'.

$$|\Delta Z1pi/d1pi|<0.15 \tag{3}'$$

If the value of $|\Delta Z1pi/d1pi|$ is over the upper limit in the conditional expression (3)', it may be difficult to arrange an independent diaphragm member such as the optical diaphragm 14 shown in FIG. 1. As a result, the configuration of a lens barrel may be complicated, or the freedom in designing a lens barrel may be restrained.

In the following, preferred arrangements on the first lens group 11, the second lens group 12, and the third lens group 13, and preferred arrangements on the entirety of the zoom optical system 1 are described one by one.

[First Lens Group 11]

Preferably, the first lens group 11 is so configured as to satisfy the conditional expression (5) concerning T1e/T1c, assuming that T1e represents a maximum value of a thickness of the negative lens element 111, as a negative lens element closest to the object side in the first lens group 11, in the optical axis direction of the negative lens element 111, and Tc1 represents a thickness of the negative lens element 111 on the optical axis AX.

$$1<T1e/T1c<4 \tag{5}$$

Satisfying the above requirement enables to produce a zoom optical system superior in production feasibility and optical performance. Particularly preferably, the first lens group 11 satisfy the conditional expression (5)1 '.

$$2<T1e/T1c<4 \tag{5}'$$

If the value of T1e/T1c is under the lower limit in the conditional expression (5)1, correction of field curvature or astigmatism may likely be insufficient.

As shown in FIG. 1, preferably, the first lens group 11 is constituted of, in this order from the object side, a negative lens element (i.e. the biconcave negative lens element 111), and a positive lens element (i.e. the positive meniscus lens element 112), and satisfy the conditional expression (7) concerning $|f1n/f1p|$, assuming that f1p represents a focal length of the positive meniscus lens element 112, and f1n represents a focal length of the negative lens element 111.

$$0.2<|f1n/f1p|<0.5 \tag{7}$$

Satisfying the above requirement enables to produce the zoom optical system 1 capable of sufficiently correcting astigmatism and distortion aberration, and producing the lens elements with less difficulty.

In particular, two-piece lens arrangement constituted of the biconcave negative lens element 111 and the positive meniscus lens element 112 convex to the object side in the order from the object side enables to easily perform back focus adjustment at the wide angle end, and desirably correct off-axis aberration of a wide-angle ray. Also, arranging a positive meniscus lens element convex to the object side enables to desirably correct astigmatism and enhance the performance of maintaining an image plane. Alternatively, a negative meniscus lens element convex to the object side may be used, in place of the biconcave negative lens element 111.

In the above lens arrangement, preferably, the parameters N1p and $|v1p-v1n|$ satisfy the conditional expressions (9) and (10), assuming that N1p represents a refractive index of the positive meniscus lens element 112, v1p represents the Abbe number of the positive meniscus lens element 112, and v1n represents the Abbe number of the negative lens element 111.

$$N1p>1.7 \tag{9}$$

$$|v1p-v1n|>20 \tag{10}$$

Satisfying the above requirement enables to produce the zoom optical system 1 advantageous in miniaturization and correcting magnification chromatic aberration.

Preferably, the value of N1p in the conditional expression (9) satisfies the conditional expression (9)'.

$$N1p>1.75 \tag{9}'$$

If the value of N1p is under the lower limit in the conditional expression (9)', correction of astigmatism and distortion aberration may be difficult, as the zoom optical system 1 is miniaturized. Also, in the case where an intended optical power is secured while securing miniaturization, aberration resulting from decrease of the curvature radius of the lens elements may be increased, and production of the lens elements may be difficult.

Preferably, the first lens group 11 includes a cemented lens element (in the example of FIG. 1, the negative lens element 111 and the positive meniscus lens element 112 are cemented to each other). Including the cemented lens element in the first lens group 11 is advantageous in significantly reducing decentering error sensitivity of each lens surface in the first lens group 11, and maintaining sensitivity balance in an intended condition even in need of adjustment between lens elements. Further, the lens barrel arrangement of the first lens group 11 can be simplified.

Preferably, the first lens group 11 satisfies the conditional expressions (13) and (14).

$$1.5<|f1/fw|<3.5 \tag{13}$$

$$0.5<|f1/ft|<1.5 \tag{14}$$

where f1: a composite focal length of the first lens group 11 fw: a composite focal length of the entirety of the optical system at the wide angle end ft: a composite focal length of the entirety of the optical system at the telephoto end If the values of $|f1/fw|$ and $|f1/ft|$ are over the upper limits in the conditional expressions (13) and (14), respectively, particularly, correction of astigmatism and distortion aberration at the wide angle end may be insufficient. On the other hand, if the values of $|f1/fw|$ and $|f1/ft|$ are under the lower limits in the conditional expressions (13) and (14), respectively, the power of each lens element constituting the first lens group 11 may be unduly increased, which may make it difficult to produce an intended zoom optical system. In addition, correction of magnification chromatic aberration may likely be insufficient Preferably, the first lens group 11 satisfies the conditional expressions (13)' and (14)'.

$$1.8<|f1/fw|<3.0 \tag{13}'$$

$$0.6<|f1/ft|<1.2 \tag{14}'$$

If the values of $|f1/fw|$ and $|f1/ft|$ are over the upper limits in the conditional expressions (13)' and (14)', respectively, the negative power of the first lens group 11 may be weakened, which may increase the diameter of the forwardmost lens element. On the other hand, if the values of $|f1/fw|$ and $|f1/ft|$ are under the lower limits in the conditional expressions (13)' and (14)', respectively, particularly, error sensitivity of the first lens group 11 at the telephoto end may be increased, which may require an adjustment between lens elements.

[Second Lens Group 12]

As shown in FIG. 1, the second lens group 12 is constituted of, in this order from the object side, a positive lens element (i.e. the biconvex positive lens element 121), and a negative lens element (i.e. the negative meniscus lens element 122), and satisfy the conditional expression (8) concerning |f2n/f2p|, assuming that f2p represents a focal length of the positive lens element in the second lens group 12, and f2n represents a focal length of the negative lens element in the second lens group 12.

$$0.7 < |f2n/f2p| < 1.8 \quad (8)$$

The above lens arrangement is advantageous in performing sufficient spherical aberration and on-axis chromatic aberration. Also, the positive-negative lens arrangement in the order from the object side enables to make the principal point position of the second lens group 12 closer to the first lens group 11, thereby enabling to reduce the substantial optical power of the second lens group 12 while securing a zoom function. Thus, the above lens arrangement is advantageous in reducing error sensitivity. Further, satisfying the conditional expression (8) enables to perform sufficient correction of spherical aberration, and suppress magnification chromatic aberration.

Particularly preferably, the second lens group 12 satisfies the conditional expression (8)'.

$$0.9 < |f2n/f2p| < 1.5 \quad (8)'$$

If the value of |f2n/f2p| is over the upper limit or under the lower limit in the conditional expression (8)', the powers of the positive lens element and the negative lens element may be unduly increased to correct spherical aberration, on-axis chromatic aberration, or magnification chromatic aberration. As a result, production error sensitivity may be increased, which may likely lower the productivity.

As shown in FIG. 1, preferably, the second lens group is constituted of two lens elements i.e. the biconvex positive lens element 121, and the negative meniscus lens element 122 strongly concave to the image side in this order from the object side. Alternatively, a biconcave lens element strongly concave to the image side may be used, in place of the negative meniscus lens element 122. Arranging the biconvex positive lens element 121 is advantageous in increasing the power of the second lens group 12, and reducing the moving amount of the second lens group 12 in zooming. Also, forming a lens surface strongly concave to the image side in the positive meniscus lens element 122 is advantageous in desirably correct astigmatism and chromatic aberration.

In the above arrangement, preferably, the parameters |N2p−N2n| and |ν2p−ν2n| satisfy the conditional expressions (11) and (12), respectively, assuming that N2p represents a refractive index of the biconvex positive lens element 121 (i.e. the positive lens element in the second lens group 12), ν2p represents the Abbe number of the biconvex positive lens element 121, N2n represents a refractive index of the negative meniscus lens element 122 (i.e. the negative lens element in the second lens group 12), and ν2n represents the Abbe number of the negative meniscus lens element 122.

$$|N2p - N2n| > 0.15 \quad (11)$$

$$|\nu 2p - \nu 2n| > 30 \quad (12)$$

Satisfying the above requirement enables to suppress astigmatism and sufficiently correct on-axis chromatic aberration.

Preferably, the second lens group 12 satisfies the conditional expression (15).

$$0.3 < f2/ft < 0.9 \quad (15)$$

If the value of f2/ft is over the upper limit in the conditional expression (15), the power of the second lens group 12 may be weakened, which may make it difficult to obtain a zoom ratio of about two to three times. On the other hand, if the value of f2/ft is under the lower limit in the conditional expression (15), error sensitivity of the second lens group 12 may be unduly increased, which may make it difficult to produce an intended optical system.

Particularly preferably, the second lens group 12 satisfies the conditional expression (15)'.

$$0.4 < f2/ft < 0.8 \quad (15)'$$

If the value of f2/ft is over the upper limit in the conditional expression (15)', the power of the second lens group 12 may be weakened. As a result, the moving amount of the second lens group 12 required for zooming may be increased, and the entire length of the optical system may be increased, which may obstruct miniaturization. On the other hand, if the value of f2/ft is under the lower limit in the conditional expression (15)', decentering error sensitivity of the second lens group 12 may be increased, which may require an adjustment between the lens elements, thereby increasing the production cost.

Preferably, the second lens group 12 includes a cemented lens element (in the example of FIG. 1, the biconvex positive lens element 121 and the negative meniscus lens element 122 are cemented to each other). Including the cemented lens element in the second lens group 12 is advantageous in significantly reducing error sensitivity of each lens surface in the second lens group 12, and simplifying the lens barrel arrangement of the second lens group 12.

Further preferably, at least one surface of the positive lens element (in the example of FIG. 1, the biconvex positive lens element 121) in the second lens group 12 has an aspherical shape. This arrangement enables to desirably correct spherical aberration and coma aberration resulting from increase of the power of the second lens group 12 by miniaturization.

[Third Lens Group 13]

As shown in FIG. 1, the zoom optical system 1 of the embodiment may include the third lens group 13 on the image side of the second lens group 12. In this arrangement, preferably, the positive meniscus lens element 131 in the third lens group 13 shown in FIG. 1 has a positive optical power. Thereby, the zoom optical system 1 has a negative-positive-positive lens arrangement constituted of the first lens group 11, the second lens group 12, and the third lens group 13. Since the moving amount of the second lens group 12 is reduced, the zoom optical system 1 is advantageous in miniaturization. Also, the arrangement enables to bring the incident angle of an off-axis ray with respect to the image plane (i.e. the light receiving surface of the image sensor 15) closer to a telecentric state.

As shown in FIG. 1, preferably, the third lens group 13 has one lens element i.e. the positive meniscus lens element 131 convex to the object side. The one-piece lens arrangement enables to make the principal point position of the lens element away from the image plane, and reduce an incident angle with respect to the image plane. Thus, the arrangement is advantageous in microminiaturizing the zoom optical system 1.

As described above, in the case where the third lens group 13 is constituted of one positive lens element (i.e. the positive meniscus lens element 131), preferably, the third lens group 13 satisfies the conditional expression (16)

$$\nu p < 40 \quad (16)$$

where νp: the minimum value of the Abbe number of the positive lens element constituting the third lens group 13. Composing the positive meniscus lens element 131 of a high dispersive material that enables to satisfy the relation: νp<40 is advantageous in sufficiently correcting magnification chromatic aberration at the telephoto end, even if the optical power of the second lens group 12 is increased to miniaturize the zoom optical system 1.

Preferably, the minimum value νp of the Abbe number satisfies the conditional expression (16)' to sufficiently correct magnification chromatic aberration, even in use of the image sensor 15 with a high pixel number and a fine pixel pitch.

$$\nu p < 32 \quad (16)'$$

Setting the minimum value νp of the Abbe number to a value smaller than 32 enables to compensate for insufficient correction of magnification chromatic aberration and perform an image pickup operation with sufficient contrast, even in use of the image sensor 15 with a high pixel number and a fine pixel pitch.

Preferably, the positive meniscus lens element 131 satisfies the conditional expression (17).

$$4 < fp/fw < 7 \quad (17)$$

where fp: a focal length of the positive lens element.

If the value of fp/fw is over the upper limit in the conditional expression (17), an aspherical surface is essentially required to bring an incident angle with respect to the image plane closer to a telecentric state. Also, the amount of aspherical sag may likely increase, which may increase the production cost. On the other hand, if the value of fp/fw is under the lower limit in the conditional expression (17), a difference in incident angle with respect to the image plane between the wide angle end and the telephoto end may be increased, which may likely lower a peripheral illuminance.

In this section, the amount of aspherical sag defined in the above is described referring to FIG. 2. Now, let it be assumed that the optical axis direction corresponds to a horizontal axis, the lens radial direction corresponds to a vertical axis, and an intersection between the horizontal axis and the vertical axis corresponds to a vertex "a" of a lens surface. Also, let it be assumed that p1 represents a curve of a spherical surface, p2 represents a curve of an aspherical surface, and "r" represents a maximum effective radius of a lens element constituted of the spherical surface and the aspherical surface. Then, the amount of spherical sag (sag/sagitta) corresponds to a distance in the optical axis direction between the vertex "a" of the lens surface, and a point on the curve p1 of the spherical surface with respect to the maximum effective radius "r". The amount of aspherical sag is a parameter representing a difference between the amount of spherical sag, and a distance in the optical axis direction from the vertex "a" of the lens surface to a point on the curve p2 of the aspherical surface with respect to the maximum effective radius "r".

[Various Preferred Arrangements on Zoom Optical System]

Preferably, the zoom optical system 1 satisfies the conditional expression (6) concerning the value of Lb/fW.

$$Lb/fW < 1.5 \quad (6)$$

Satisfying the above requirement enables to produce the lens element with less difficulty, because there is no need of increasing the negative power of the first lens group 11 to secure a long back focus distance, and increasing the curvature of the negative lens element 111.

Also, as shown in FIG. 1, one of the preferred lens arrangements is the zoom optical system 1 constituted merely of three lens groups i.e. the first lens group 11, the second lens group 12, and the third lens group 13. Reducing the number of lens groups or lens elements as much as possible, as in the zoom optical system 1, is more advantageous in miniaturizing the zoom optical system, as compared with the other zoom optical system. In the three-component zoom optical system 1 having a negative-positive-positive lens arrangement as shown in FIG. 1, the optical power of the third lens group 13 is smaller than the optical power of the first lens group 11 or the second lens group 12. Accordingly, it is relatively easy to constitute the third lens group 13 of a single lens element, which is further advantageous in miniaturizing the zoom optical system 1.

In the case where the three-component zoom optical system 1 having a negative-positive-positive lens arrangement is adopted, preferably, the third lens group 13 is fixed in zooming from the wide angle end toward the telephoto end. Fixing the third lens group 13 in zooming enables to simplify the lens barrel arrangement and improve precision in positioning.

Preferably, each of the first lens group 11 and the second lens group 12 in the zoom optical system 1 is constituted of three or less lens elements. This enables to reduce the load of the driving device for driving the first lens group 11 whose lens element generally has a large outer diameter, or the second lens group 12 having a large moving amount in zooming. This enables to reduce the production cost by reducing the number of lens elements. Considering this merit, the zoom optical system 1 shown in FIG. 1 has a preferred lens arrangement.

As shown in the zoom optical system 1 depicted in FIG. 1, preferably, the optical diaphragm 14 (i.e. an aperture stop) is provided on the object side of the second lens group 12, and the aperture diameter thereof is fixed. Firstly, arranging the optical diaphragm 14 on the object side of the second lens group 12 is advantageous in minimizing the size of the forwardmost lens element in the first lens group 11. Secondly, fixing the aperture diameter is advantageous in reducing the thickness of the zoom optical system 1 in the optical axis direction, because there is no need of increasing the distance between the first lens group 11 and the second lens group 12 over a required value.

Preferably, the zoom optical system 1 satisfies the conditional expression (18).

$$0.1 < Y'/TL < 0.3 \quad (18)$$

where

Y': a maximum image height

TL: a maximum value of a distance in the optical axis direction from a vertex of a lens surface closest to the object side to an image plane in the entire zoom range.

If the value of Y'/TL is over the upper limit in the conditional expression (18), the power of the second lens group 12 may be unduly increased, because the moving amount of the second lens group 12 for zooming is decreased. As a result, it is difficult to satisfy the production requirements such as the radius of curvature of each lens element constituting the second lens group 12. On the other hand, if the value of Y'/TL is under the lower limit in the conditional expression (18), it may be difficult to mount the zoom optical system in a mobile terminal or a like device, considering the size constraints.

Particularly preferably, the zoom optical system 1 satisfies the conditional expression (18)'.

$$0.13 < Y'/TL < 0.2 \quad (18)'$$

If the value of Y'/TL is over the upper limit in the conditional expression (18)', the power of the second lens group 12 may be unduly increased, which may increase error sensitivity in the second lens group 12. As a result, adjustment between lens elements is required, which may increase the production cost. On the other hand, if the value of Y'/TL is under the lower limit in the conditional expression (18)', not only the size of the optical system but also a load of a driving member resulting from an increase in moving amount in zooming may be increased. As a result, the size of the driving device may likely increase.

Preferably, the zoom optical system 1 satisfies the conditional expression (19).

$$0.2 < t2/TL < 0.4 \quad (19)$$

where t2: a distance required for the second lens group to move in zooming from the wide angle end to the telephoto end.

If the value of t2/TL is over the upper limit in the conditional expression (19), it may be difficult to secure a space for installing a mechanical shutter which is effective in preventing smear. Also, the lens barrel arrangement may be complicated in order to avoid contact among driving members, which may resultantly increase the production cost. On the other hand, if the value of t2/TL is under the lower limit in the conditional expression (19), decentering error sensitivity of the second lens group 12 may be increased, which may likely be difficult to produce an intended zoom optical system.

Preferably, the zoom optical system 1 satisfies the conditional expressions (20) and (21).

$$10 < \alpha w < 25 \quad (20)$$

$$|\alpha w - \alpha t| < 15 \quad (21)$$

where

αw: an angle (deg) of a principal ray, at a maximum image height, of incident rays onto the imaging surface of the image sensor 15 with respect to a normal to an image plane at the wide angle end, and αt: an angle (deg) of the principal ray, at the maximum image height, of the incident rays onto the imaging surface of the image sensor 15 with respect to the normal to the image plane at the telephoto end.

Figure 3:
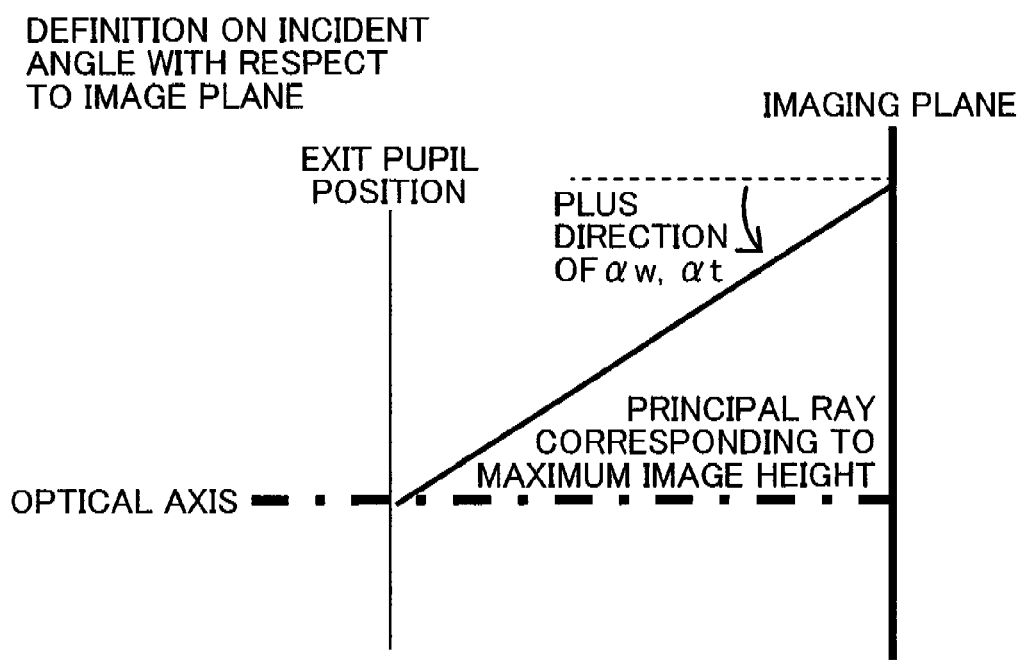
FIG. 3 is a diagram showing a definition on an incident angle of a principal ray onto an image plane.

Concerning the angles αw (deg) and αt (deg), the direction shown in FIG. 3 is defined as the plus direction. Specifically, the left side in FIG. 3 corresponds to the object side, and the right side in FIG. 3 corresponds to the image side, and the angle of the principal ray in the case where an exit pupil position is on the object side with respect to the image plane is in the plus direction.

If the value of αw is over the upper limit in the conditional expression (20), intended telecentricity cannot be secured for the incident angle of the incident ray onto the image sensor 15. As a result, even if a lens array corresponding to the pixels of the image sensor 15 is arranged in front of the imaging surface of the image sensor 15, it may be difficult to prevent lowering of peripheral illuminance. On the other hand, if the value of αw is under the lower limit in the conditional expression (20), it may be difficult to secure miniaturization while securing a wide angle of view. If the value of |αw−αt| is over the upper limit in the conditional expression (21), a difference in incident angle between the wide angle end and the telephoto end may be unduly increased, which may make it difficult to optimize the lens array. As a result, peripheral illuminance may likely reduce at the wide angle end or the telephoto end.

In the following, a focusing arrangement of the zoom optical system 1 is described. In the zoom optical system 1, preferably, focusing from an infinite object distance to a close object distance may be performed by moving the first lens group 11 to the object side. A change in aberrations resulting from moving the first lens group 11 is relatively small. Accordingly, performance degradation by focusing can be suppressed. Also, since a large back focus distance with respect to the moving amount of the first lens group 11 can be secured, it is possible to obtain desirable focusing performance up to a position close to the lens element by about several centimeters with a less moving amount.

In the zoom optical system, preferably, focusing from an infinite object distance to a close object distance is performed by moving the third lens group 13, or the lens group closer to the image side than the third lens group 13 to the object side. This arrangement enables to obtain a clear image up to the close object distance without increasing the entire length of the optical system by protrusion of a lens barrel, or increasing the diameter of the forwardmost lens element. Judgment as to whether the first lens group 11 is to be moved, or the third lens group 13 (or the lens group closer to the image side than the third lens group 13) is to be moved in focusing is determined depending on the optical specifications of the zoom optical system 1. Specifically, the first lens group 11 is moved in activating the macro function, and the third lens group 13 is moved in prioritizing miniaturization of the zoom optical system 1.

In the case where the third lens group 13 is constituted of a positive lens group, and focusing is performed by the third lens group 13, preferably, a fourth lens group closer to the image side than the third lens group 13 is a negative lens group. This arrangement enables to significantly enhance the optical performance with respect to a close distance object at the telephoto end. Also, the exit pupil position at the telephoto end can be arranged closer to the object side than the image plane. As a result, a distance of an incident angle of an incident ray with respect to the image plane between the wide angle end and the telephoto end can be reduced.

Concerning a process for manufacturing the zoom optical system 1, there is no specific constraint on the material of each lens element constituting the first through the third lens group 11 through 13. Various glass materials or resin (plastic) materials may be used, as far as the optical material satisfies the aforementioned requirements. Use of a resin material, however, is advantageous in suppressing the production cost or reducing the weight of the zoom optical system 1, as compared with a case of producing lens groups of a glass material, because the resin material is lightweight, and mass production of the resin material is feasible by injection molding or a like process. In view of this, preferably, the zoom optical system 1 has at least one lens element made of a resin material. It is needless to say that the zoom optical system 1 has two or more lens elements made of a resin material.

In the case where at least two lens elements made of a resin material are used, preferably, a negative lens element (i.e. the negative lens element 111 in FIG. 1) in the first lens group 11, and a positive lens element (the positive meniscus lens element 131) in the third lens group 13 are made of a resin material. This arrangement enables to suppress back focus error resulting from a change in ambient temperature.

It is preferable to use a lens element obtained by molding a material, in which inorganic particles having a maximum diameter of 30 nm or less are dispersed in a resin material, as the resin lens element. Use of the resin lens element is advantageous in minimizing a refractive index change by a temperature change.

In this section, a refractive index change by a temperature change is described in detail. A refractive index change "A" by a temperature change is expressed by the following expression (22) by differentiating a refractive index "n" by a temperature "t", based on the Lorenz-Lorenz equation.

$$A = \frac{(n^2+2)(n^2-1)}{6n}\left\{(-3\alpha) + \frac{1}{[R]}\frac{\partial [R]}{\partial t}\right\} \quad (22)$$

where α is a linear expansion coefficient, and [R] is a molecular refraction.

Generally, in the case of using a resin material, contribution of the second term in the expression (22) is smaller than the first term. Accordingly, the second term is significantly negligible. For instance, in the case of using a PMMA resin, the linear expansion coefficient α is $7\times10^{-5}$. Substituting the linear expansion coefficient α in the expression (22) yields $A=-1.2\times10^{-4}$ [/° C.], which approximately coincides with an actually measured value. It is preferable to suppress the refractive index change "A" by a temperature change, which has conventionally been about $-1.2\times10^{-4}$ [/° C.], to a value smaller than $8\times10^{-5}$ [/° C.] in absolute value. More preferably, the refractive index change by a temperature change is smaller than $6\times10^{-5}$ [/° C.] in absolute value. Setting the refractive index change by a temperature change to a value smaller than $6\times10^{-5}$ [/° C.] in absolute value enables to suppress a back focus error at the time when the ambient temperature changes to about half of the conventional arrangement. The refractive index change "A" (=dn/dT) by a temperature change of a resin material usable in the zoom optical system 1 is shown in Table 1.

TABLE 1

| plastic material | A (approximate value) [$10^{-5}$/° C.] |
|---|---|
| polyolefin-based resin | −11 |
| polycarbonate-based resin | −14 |

In the above arrangement, preferably, the positive lens element in the third lens group 13, or the lens group closer to the image side than the third lens group 13 is the resin lens element. This enables to reduce the production cost without obstructing miniaturization. In view of likelihood that the positive lens element may affect back focus adjustment when the temperature changes, using a material, in which inorganic particles of 30 nm or less are dispersed, is advantageous in significantly reducing the influence of the positive lens element.

Preferably, in the zoom optical system 1, all the lens surfaces facing the air are aspherical. This arrangement enables to miniaturize the zoom optical system 1, and secure high quality of an image.

In the case where an aspherical glass lens element is used in the zoom optical system 1, the aspherical glass lens element may be produced by molding, or by combining a glass material and a resin material. The molded lens element can be mass-produced, but the kind of glass material to be used in the molded lens element is limited. The composite glass-resin lens element has advantages that there are many kinds of glass material to be used as a substrate, and freedom in designing is high. Generally, it is difficult to produce an aspherical lens element using a high refractive material by molding. Accordingly, the advantages of the composite lens element can be maximally utilized in the case where a lens element having a single aspherical surface is used.

Preferably, the zoom optical system 1 has a mechanical shutter having a function of blocking light from the image sensor 15, in place of the optical diaphragm 14. The mechanical shutter is effective in preventing smear in the case where a CCD (Charge Coupled Device) sensor is used as the image sensor 15, for instance.

A conventional well-known cam mechanism or stepping motor may be used as a drive source for driving the lens groups, the diaphragm, the shutter, or a like member provided in the zoom optical system 1. In the case where the moving amount is small, or the weight of the driving members is light, use of a microminiaturized piezoelectric actuator enables to drive the lens groups independently of each other, while suppressing increase in volume of the driving device or electric power consumption. This is further advantageous in miniaturizing an imaging lens device incorporated with the zoom optical system 1.

One of the most preferred lens arrangements in the embodiment of the invention is the zoom optical system 1, as shown in FIG. 1, which is constituted of the first lens group 1, the second lens group 12, and the third lens group 13 in this order from the object side, wherein the first lens group 11 is constituted of the negative lens element (i.e. the negative lens element 111), and the positive meniscus lens element (i.e. the positive meniscus lens element 112) convex to the object side, the second lens group 12 is constituted of the biconvex lens element (i.e. the biconvex positive lens element 121); and the negative lens element (i.e. the negative meniscus lens element 122); and the third lens group 13 is constituted of the positive lens element (i.e. the positive meniscus lens element 131). Specifically, the principal point position of the second lens group 12 can be made closer to the first lens group 11 by arranging the positive lens element and the negative lens element in the second lens group 12 in this order from the object side. This enables to reduce the substantial power of the second lens group 12 while keeping the zoom function, and reduce error sensitivity. Also, the power of the second lens group 12 can be increased by arranging the biconvex lens element in the second lens group 12. This enables to reduce the moving amount of the second lens group 12 in zooming. Further, constituting the third lens group 13 of the positive lens element is advantageous in bringing the incident angle of an off-axis ray onto the light receiving surface of the image sensor 15 to a telecentric state.

The image sensor 15 is adapted to photoelectrically convert an optical image of a subject H formed by the zoom optical system 1 into image signals of color components of R, G, and B in accordance with the light amount of the subject image for outputting the image signals to a predetermined image processing circuit. For instance, the image sensor 15 is a one-chip color area sensor of a so-called "Bayer matrix", in which patches of color filters each in red (R), green (G), and blue (B) are attached in a checkered pattern on respective surfaces of CCDs arrayed in two dimensions. Examples of the image sensor 15 are a CMOS image sensor, and a VMIS image sensor in addition to the CCD image sensor.

The low-pass filter 16 is a parallel-plane optical component which is disposed on the imaging surface of the image sensor 15 for removing noise components. Examples of the low-pass filter 16 are e.g. a birefringent low-pass filter made of a crystal or a like material, whose predetermined crystalline axis direction is regulated, and a phase low-pass filter for realizing required optical cutoff frequency characteristic by a diffraction effect. It is not necessarily required to provide the low-pass filter 16. Further alternatively, an infrared cutoff filter may be used to reduce noise included in an image signal from the image sensor 15, in place of the aforementioned optical low-pass filter 16. Further alternatively, the function of the birefringent low-pass filter and the function of the phase low-pass filter may be realized by a single low-pass filter by applying infrared reflective coat to a surface of the optical low-pass filter 16.

<Description on Digital Apparatus Incorporated with Zoom Optical System>

Figure 4A:
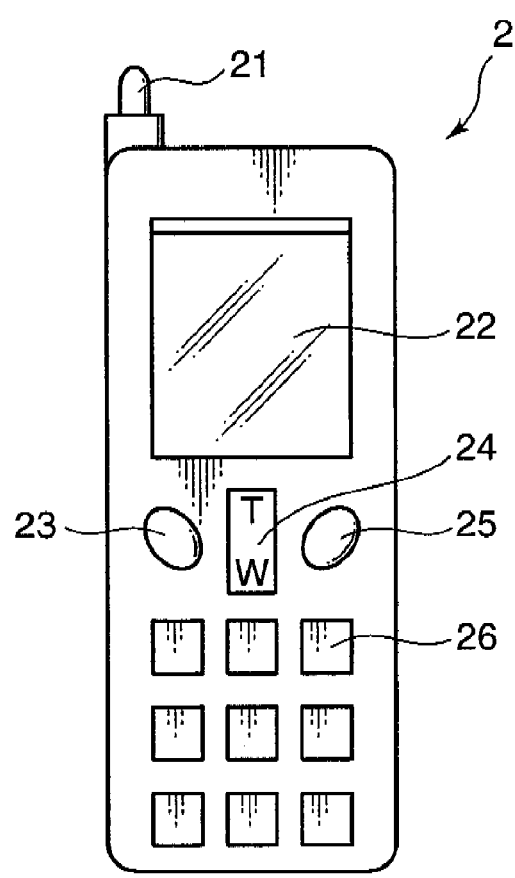
Figure 4B:
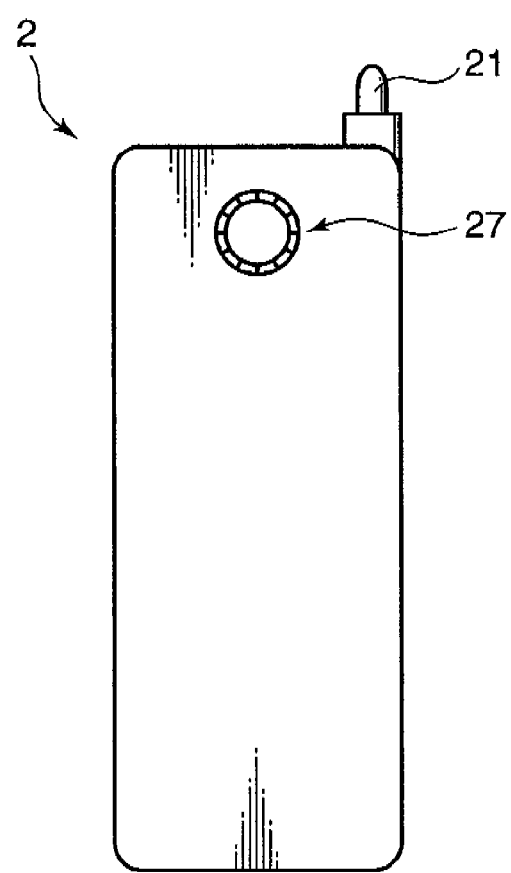

In this section, a digital apparatus incorporated with the aforementioned zoom optical system 1 is described. FIGS. 4A and 4B are diagrams showing an external appearance of a mobile phone 2, as an example of a digital apparatus embodying the invention. In this embodiment, the digital apparatus includes a digital still camera, a video camera, a digital video unit, a PDA (Personal Digital Assistant), a personal computer, a mobile computer, and peripheral devices thereof such as a mouse, a scanner, and a printer.

FIG. 4A is a diagram showing an operating surface of the mobile phone 2, and FIG. 4B is a diagram showing a back surface of the mobile phone 2. The mobile phone 2 has an antenna 21 at an upper part thereof, and, on the operating surface thereof, a substantially rectangular display 22, an image changeover button 23 for activating the image photographing mode, and changing over the image photographing mode between still image shooting and moving image shooting, a zoom button 24 for controlling zooming, a shutter button 25, and a dial button 26. The symbol "T" representing zooming to the telephoto end and the symbol "W" representing zooming to the wide angle end are marked on an upper part and a lower part of the zoom button 24, respectively. The zoom button 24 includes a two-contact switch operable in such a manner that a designated zoom is performed when the relevant marked part is depressed. The mobile phone 2 is built-in with the imaging lens device 27 incorporated with the aforementioned zoom optical system 1.

Figure 5:
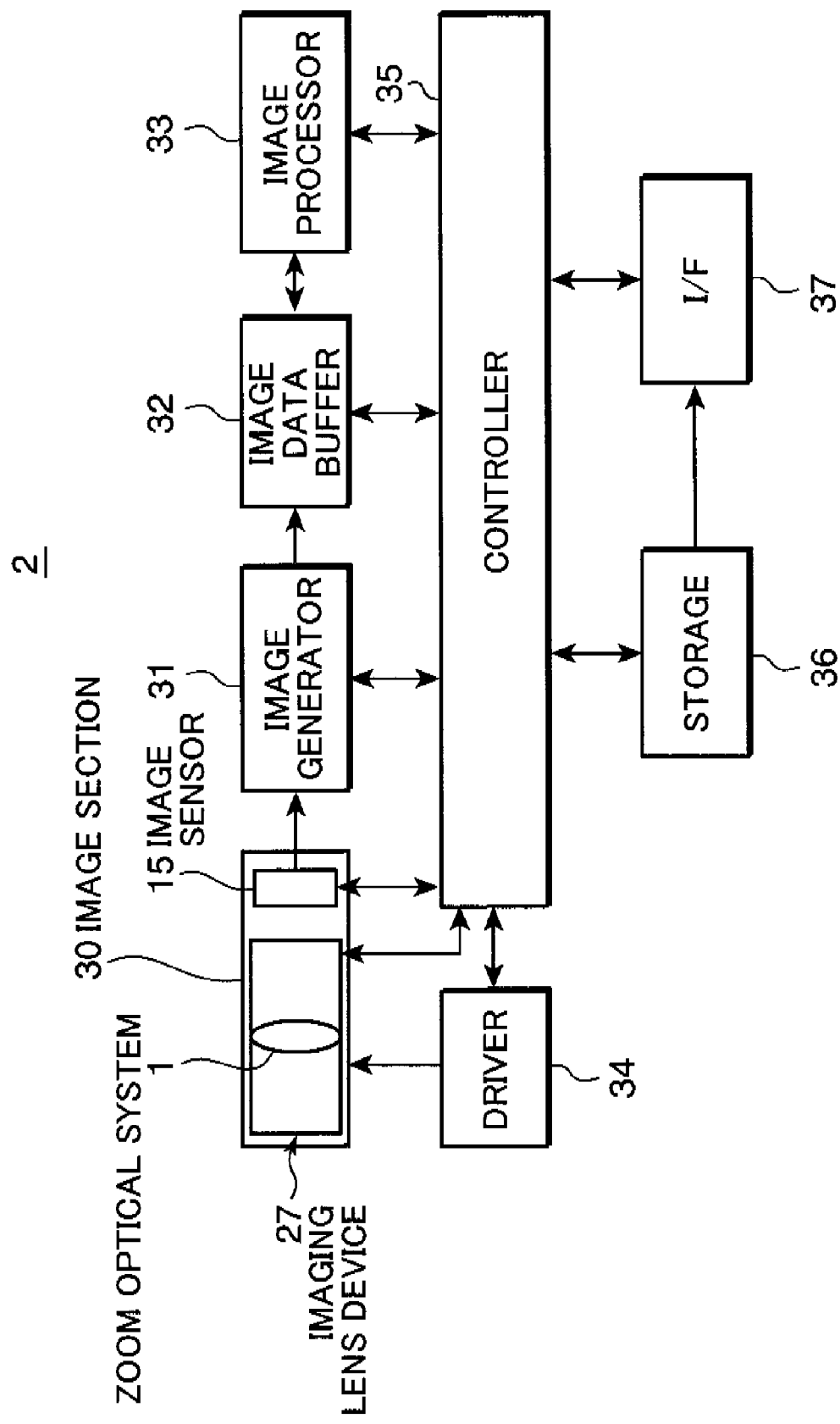
FIG. 5 is a functional block diagram showing a functional part relating to an imaging operation to be executed by a mobile phone, as an example of a digital apparatus loaded with the zoom optical system embodying the invention.

FIG. 5 is a functional block diagram showing an electric configuration relating to an imaging operation to be executed by the mobile phone 2. The mobile phone 2 includes an imaging section 30, an image generator 31, an image data buffer 32, an image processor 33, a driver 34, a controller 35, a storage 36, and an I/F 37 for imaging functions.

The imaging section 30 includes the imaging lens device 27 and the image sensor 15. The imaging lens device 27 has the zoom optical system 1 with the arrangement as shown in FIG. 1, and an unillustrated lens driving device for driving the lens elements in the optical axis direction for zooming and focusing. Light rays from a subject are formed on the light receiving surface of the image sensor 15 by the zoom optical system 1, whereby an optical image of the subject H is obtained.

The image sensor 15 converts the optical image of the subject formed by the zoom optical system 1 into electric signals (i.e. image signals) of color components of R (red), G (green), and B (blue) for outputting to the image generator 31 as image signals of the colors of R, G, and B. The image sensor 15 is operable to perform an imaging operation such as one of still image shooting operation and moving image shooting operation, or a readout operation (horizontal scanning, vertical scanning, transfer) of an output signal from each pixel in the image sensor 15 under the control of the controller 35.

The image generator 31 performs amplification processing, digital conversion processing, or a like processing with respect to an analog output signal from the image sensor 15; and performs well-known image processing such as determination of proper black level with respect to the entirety of the image, gamma correction, white balance (WB) adjustment, contour correction, or color disparity correction to generate image data of each pixel from the image signal. The image data generated by the image generator 31 is outputted to the image data buffer 32.

The image data buffer 32 temporarily stores the image data, and is as a memory to be used as a work area for allowing the image processor 33 to perform the following processing with respect to the image data. The image data buffer 32 is e.g. constituted of an RAM (Random Access Memory).

The image processor 33 is a circuit for performing image processing such as resolution conversion with respect to the image data temporarily stored in the image data buffer 32. The image processor 33 may be operable to correct aberration that has not been corrected by the zoom optical system 1, according to needs.

The driver 34 drives the lens groups of the zoom optical system 1 in such a manner that intended zooming and focusing are performed based on a control signal outputted from the controller 35.

The controller 35 includes e.g. a microprocessor, and controls respective operations of the imaging section 30, the image generator 31, the image data buffer 32, the image processor 33, the driver 34, the storage 36, and the I/F 37. Specifically, the controller 35 controls the imaging lens device 27 and the image sensor 15 to perform at least one of still image shooting and moving image shooting of a subject.

The storage 36 is a storing circuit for storing the image data generated by the still image shooting or the moving image shooting of the subject. The storage 36 includes e.g. an ROM (Read Only Memory) or an RAM. In other words, the storage 36 has a function as a memory for storing still image data or moving image data.

The I/F 37 is an interface for transmitting and receiving image data to and from an external device. The I/F 37 is an interface in conformity with the standards e.g. USB or IEEE1394.

An imaging operation to be executed by the mobile phone 2 having the above arrangement is described. First, in shooting a still image, the image photographing mode is activated by depressing the image changeover button 23. In this embodiment, depressing the image changeover button 23 one time activates the still image shooting mode, and depressing the image changeover button 23 once more in this state changes over the image photographing mode to the moving image shooting mode. In other words, in response to receiving a command from the image changeover button 23, the controller 35 in the main body of the mobile phone 2 causes the imaging lens device 27 and the image sensor 15 to perform at least one of still image shooting and moving image shooting of a subject located on the object side.

When the still image shooting mode is activated, the controller 35 controls the imaging lens device 27 and the image sensor 15 to perform still image shooting, and also drives the unillustrated lens driving device in the imaging lens device 27 for focusing. Thereby, an optical image of the subject in a focus state is cyclically formed on the light receiving surface of the image sensor 15 for conversion into image signals of color components of R, G, and B. Thereafter, the image signals are outputted to the image generator 31. The image signals are temporarily stored in the image data buffer 32 for image processing in the image processor 33. After the image processing, the processed image data is transferred to a memory (not shown) for the display 22 so that an image is displayed on the display 22. The photographer is allowed to view the display 22 and adjust the position of the displayed image in such a manner that the main subject image is located in an intended position within the display screen. When the photographer depresses the shutter button 25 in this state, a still image can be captured. In other words, image data is stored in the storage 36 as a memory for still image data.

In the above operation, if the subject is located away from the photographer, or the photographer wishes to obtain an enlarged image of the subject nearby, and accordingly, zoom shooting is carried out, the photographer depresses the upper part of the zoom button 24 where the symbol "T" is marked. Then, the controller 35 controls the lens groups to drive for zooming in accordance with a depressed time, thereby causing the zoom optical system 1 to continuously zoom the image. If the photographer wishes to reduce the magnification of the subject image because of excessive zooming or a like condition, the photographer depresses the lower part of the zoom button 24 where the symbol "W" is marked. Then, the controller 35 controls the zoom optical system 1 to continuously zoom the image in accordance with a depressed time. In this way, the photographer is allowed to adjust the magnification by using the zoom button 24, even if the subject is away from the photographer. Similarly to normal photographing with the same magnification, an enlarged still image can be obtained by adjusting the position of the displayed image in such a manner that the main subject image is located in an intended position within the display screen, and by depressing the shutter button 25 in this state.

In performing moving image shooting, after the still image shooting mode is activated by depressing the image changeover button 23 one time, the image photographing mode is changed over to the moving image shooting mode by depressing the image changeover button 23 once again in this state. Thereby, the controller 35 controls the imaging lens device 27 and the image sensor 15 to perform moving image shooting. Thereafter, similarly to the operation to be executed in the still image shooting mode, the photographer is allowed to view the display 22 and adjust the position of the displayed image in such a manner that the subject image obtained through the imaging lens device 27 is located in an intended position within the display screen. Similarly to the operation to be executed in the still image shooting mode, the photographer is allowed to adjust the magnification of the subject image by using the zoom button 24. The moving image shooting is started in response to depressing the shutter button 25 in this state. During the moving image shooting, the photographer is allowed to desirably change the magnification of the subject image by manipulating the zoom button 24.

In performing the moving image shooting, the controller 35 controls the imaging lens device 27 and the image sensor 15 to perform moving image shooting, and drives the unillustrated lens driving device in the imaging lens device 27 for focusing. Thereby, an optical image in a focus state is cyclically formed on the light receiving surface of the image sensor 15 such as a CCD sensor for conversion into image signals of color components of R, G, and B. Thereafter, the image signals are outputted to the image generator 31. The image signals are temporarily stored in the image data buffer 32 for image processing in the image processor 33. Thereafter, the processed image data is transferred to the memory for the display 22 so that an image is displayed on the display 22. The moving image shooting is ended by depressing the shutter button 25 again in this state. The acquired moving image is sent to the storage 36 as a memory for moving image data to store the moving image data.

<Description on Examples of Zoom Optical System>

In the following, examples of the zoom optical system 1 as shown in FIG. 1, specifically, the zoom optical system 1 incorporated with the imaging lens device 27 to be mounted in the mobile phone 2, as shown in FIGS. 4A and 4B, is described referring to the drawings.

Example 1

Figure 6:
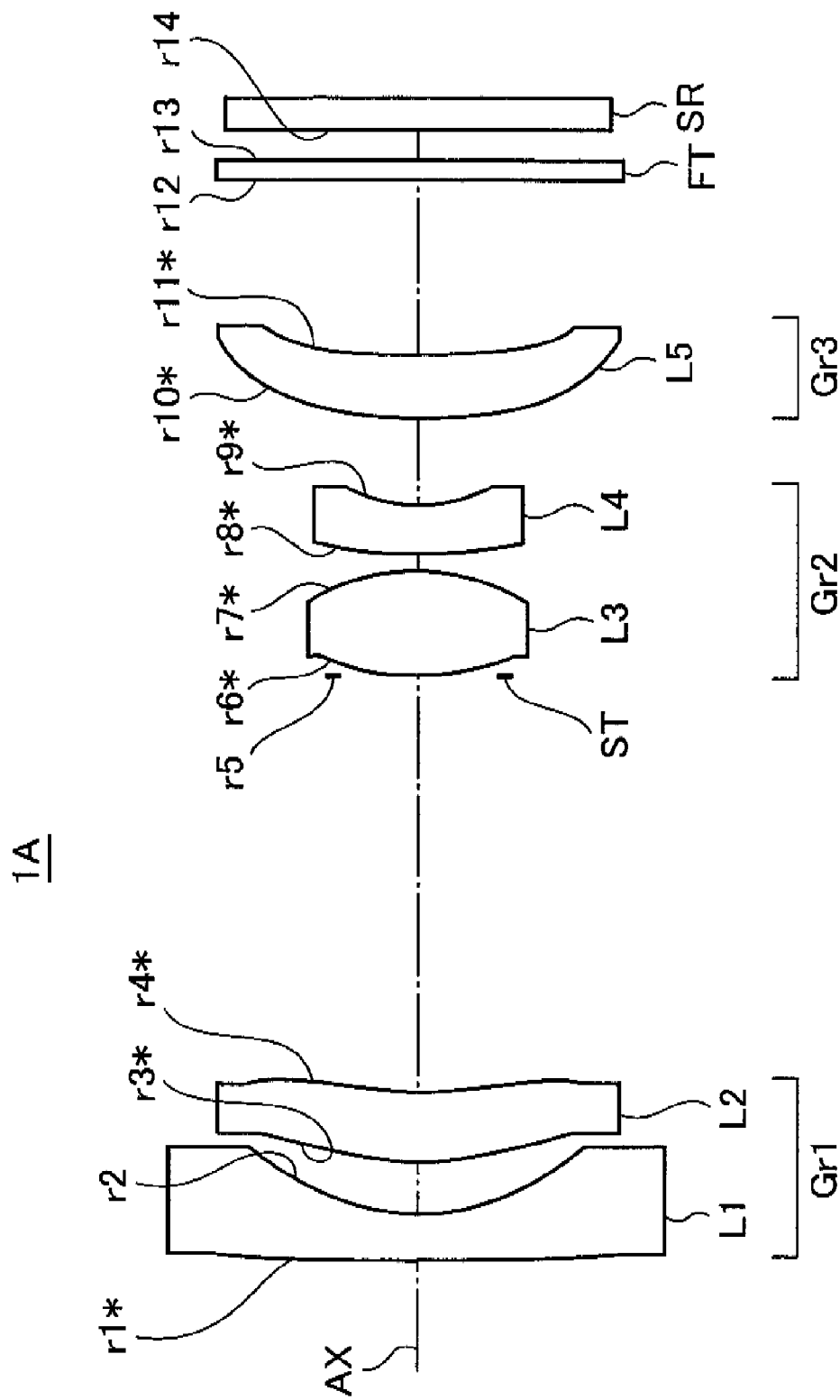
FIG. 6 is a cross-sectional view showing an optical path diagram at a wide angle end in a zoom optical system as Example 1 of the invention.

FIG. 6 is a cross-sectional view (i.e. an optical path diagram), taken along the optical axis (AX), showing an arrangement of lens groups in a zoom optical system 1A in Example 1. The optical path diagrams in FIG. 6, and FIGS. 7 through 13 to be described later each shows a lens arrangement at the wide angle end (W). Throughout Example 1, and Examples 2 through 8 to be described later, the lens groups include, in this order from the object side in the drawings (i.e. from the left side in FIG. 6), a first lens group (Gr1) having a negative optical power as a whole, a second lens group (Gr2) having a positive optical power, and a third lens group (Gr3) having a positive or negative optical power, except for Example 8. In other words, the lens arrangement is a negative dominant arrangement, in which the first lens group (Gr1) closest to the object side has a negative optical power.

The zoom optical system 1A in Example 1 shown in FIG. 6 has the following lens arrangement in the order from the object side. Specifically, the first lens group (Gr1) has a negative optical power as a whole, and is constituted of a biconcave negative lens element (L1) and a positive meniscus lens element (L2) convex to the object side. The second lens group (Gr2) has a positive optical power as a whole, and is constituted of a biconvex positive lens element (L3) and a negative meniscus lens element (L4) convex to the object side. An aperture stop (ST) which is moved with the first lens group (Gr1) and the second lens group (Gr2) in zooming is provided on the object side of the second lens group (Gr2). The third lens group (Gr3) is constituted of a positive meniscus lens element (L5) which has a positive optical power and is convex to the object side. A light receiving surface of an image sensor (SR) is arranged on the image side of the third lens group (Gr3) via a plane parallel plate (FT). The plane parallel plate (FT) corresponds to an optical low-pass filter, an infrared cutoff filter, a cover glass for an image sensor, or a like element.

Alternatively, a mechanical shutter may be provided in place of the aperture stop (ST) In FIG. 6, a continuously zoomable zoom optical system is described. Alternatively, a two-focal-point switching type zoom optical system having identical optical arrangements in two optical units may be employed to attain further miniaturization. In particular, in the case where the first lens group (Gr1) makes a U-turn (i.e. the trajectory of the first lens group (Gr1) is convex toward the image side) in zooming from the wide angle end to the telephoto end, and as a result, the entire length of the optical system is substantially the same at the wide angle end and the telephoto end, use of the two-focal-point switching type zoom optical system is advantageous in reducing the size of the zoom optical system including a driving mechanism as a lens unit, because the first lens group (Gr1) can be fixed in zooming. These features are also applied to Examples 2 through 8 to be described later (and accordingly, repeated description thereof will be omitted in the following).

In FIG. 6, the surface attached with the symbol ri (i=1, 2, 3, . . . ) indicates the i-th lens surface from the object side (a cemented lens surface constituting a cemented lens element is counted as a lens surface), and the surface ri attached with an asterisk (*) is an aspherical surface. The aperture stop (ST), both surfaces of the plane parallel plate (FT), and the light receiving surface of the image sensor (SR) are each regarded as one lens surface. The same definition is also applied to the optical path diagrams (see FIGS. 7 through 13) concerning other Examples to be described later, and the symbols in FIGS. 7 through 13 identical to those in FIG. 6 have basically the same meaning as in FIG. 6. It should be noted, however, that all the symbols have the same meaning. For instance, although the same symbol (r1) is attached to the lens surface closest to the object side throughout the drawings of FIGS. 6 through 13, this does not mean that the curvatures or a like feature of the lens surfaces attached with the symbol (r1) are identical throughout Examples.

In the above arrangement, an incident ray from the object side is transmitted through the first lens group (Gr1), the second lens group (Gr2), the third lens group (Gr3), and the parallel plane plate (FT) in this order along the optical axis AX, and forms an optical image of the object on the light receiving surface of the image sensor (SR). Then, the image sensor (SR) converts the optical image corrected by the parallel plane plate (FT) into an electric signal. The electric signal is subjected to a predetermined processing such as digital image processing or image compression processing, according to needs. Thereafter, the processed signal is recorded in a memory of a mobile phone, a personal digital assistant, or a like device, as a digital video signal, or transmitted to other digital apparatus wiredly or wirelessly.

FIG. 22 (and FIG. 23) is a diagram showing moving directions of the lens groups in zooming. In FIG. 22 (and FIG. 23), the moving directions of lens groups in Example 2 and thereafter to be described later are also shown, as well as the moving directions of the lens groups in Example 1. Similarly to FIGS. 6 through 13, in FIG. 22 (and FIG. 23), the left side corresponds to the object side, and the first lens group (Gr1), the second lens group (Gr2), the third lens group (Gr3), and the fourth lens group (Gr4) are arranged in this order from the object side. In FIG. 22 (and FIG. 23), the symbol "W" represents the wide angle end where the focal length is the shortest, i.e., the angle of view is the largest, and the symbol "T" represents the telephoto end where the focal length is the longest, i.e. the angle of view is the smallest. The symbol "M" represents the middle (hereinafter, called as "mid point") between the wide angle end (W) and the telephoto end (T) in terms of focal length. Although the actual lens groups are moved linearly along the optical axis, in FIG. 22 (and FIG. 23), the positions of the lens groups at the wide angle end (W), the mid point (M), and the telephoto end (T) are shown in the upper row, the middle row, and the lower row, respectively, in each of the illustrations.

As shown in FIG. 22, in Example 1, the first lens group (Gr1) and the second lens group (Gr2) are movable in zooming, and the third lens group (Gr3) is fixed in zooming. Specifically, in zooming from the wide angle end (W) to the telephoto end (T), the second lens group (Gr2) is linearly moved toward the object side, and the first lens group (Gr1) is moved in such a manner that the trajectory thereof is convex toward the image side. It should be noted, however, in Example 1 and below-mentioned Examples, the moving directions, the moving amounts, or the like of the lens groups are varied depending on the optical powers of the lens groups, the lens arrangement, or a like condition. For instance, in FIG. 22, although the second lens group (Gr2) is linearly moved, the movement includes a case where the trajectory of the second lens group (Gr2) is convex toward the object side or the image side, and a case where the second lens group (Gr2) makes a U-turn.

Construction data concerning the lens elements in the zoom optical system 1A in Example 1 are shown in Tables 2 and 3. All the lens elements (L1 through L5) in the zoom optical system 1A are glass lens elements. Also, the values of the conditional expressions (1) through (21) in the case where the conditional expressions (1) through (21) are applied to the optical system in Example 1 are shown in Table 20 to be described later. In Table 20, since the conditional expressions (2) and (4) are identical to each other, description on the conditional expression (4) is omitted.

TABLE 2

| LENS SURFACE NO. | RADIUS OF CURVATURE (mm) | AXIAL SURFACE DISTANCE (mm) | | | REFRACTIVE INDEX | ABBE NUMBER |
| --- | --- | --- | --- | --- | --- | --- |
| | | W | M | T | | |
| 1* | −98.036 | 0.800 | | | 1.77250 | 49.77 |
| 2 | 4.251 | 0.895 | | | | |
| 3* | 5.294 | 1.248 | | | | |
| 4* | 9.537 | 7.276 | 2.539 | 0.900 | 1.80518 | 25.43 |
| 5 | ∞ | 0.000 | | | | |
| 6* | 3.445 | 1.787 | | | 1.61154 | 61.22 |
| 7* | −4.100 | 0.336 | | | | |
| 8* | 11.773 | 0.800 | | | 1.80518 | 25.43 |
| 9* | 2.471 | 1.572 | 4.875 | 7.948 | | |
| 10* | 14.714 | 1.092 | | | 1.80518 | 25.43 |
| 11* | 39.562 | 3.005 | | | | |
| 12 | ∞ | 0.300 | | | 1.51680 | 64.12 |
| 13 | ∞ | 0.540 | | | | |
| 14 | ∞ | | | | | |

TABLE 3

| LENS SURFACE NO. | CONICAL COEFFICIENT | ASPHERICAL COEFFICIENT | | | |
| --- | --- | --- | --- | --- | --- |
| | | A | B | C | D |
| 1 | 0 | 1.14E−03 | 2.74E−06 | −9.09E−07 | 0.00E+00 |
| 3 | 0 | −1.25E−03 | −5.22E−04 | −7.06E−06 | 1.80E−06 |
| 4 | 0 | −4.04E−04 | −9.03E−04 | 6.83E−05 | −1.75E−06 |
| 6 | 0 | −4.99E−03 | −1.75E−03 | 1.75E−04 | −1.15E−04 |

TABLE 3-continued

| LENS SURFACE NO. | CONICAL COEFFICIENT | ASPHERICAL COEFFICIENT | | | |
|---|---|---|---|---|---|
| | | A | B | C | D |
| 7 | 0 | 9.84E−03 | −4.93E−03 | 6.51E−04 | −3.66E−05 |
| 8 | 0 | −2.17E−04 | −1.74E−03 | 3.96E−05 | 2.29E−04 |
| 9 | 0 | −8.65E−03 | 3.36E−03 | −1.29E−03 | 5.76E−04 |
| 10 | 0 | 5.64E−03 | −1.06E−04 | −3.89E−06 | 1.48E−06 |
| 11 | 0 | 6.42E−03 | 2.30E−04 | −7.18E−05 | 7.34E−06 |

Table 2 indicates, in the order from the left-side column thereof, the lens surface numbers, radii of curvature (unit: mm) of the respective lens surfaces, distances (i.e. axial surface distances) (unit: mm) between the lens surfaces on the optical axis at the wide angle end (W), the mid point (M), and the telephoto end (T) in an infinite focal state, refractive indices of the respective lens elements, and the Abbe numbers of the respective lens elements. The value in each blank column regarding the axial surface distance at the mid point (M) and the telephoto end (T) is the same as that in the corresponding left-side column at the wide angle end (W). The axial surface distances are distances calculated on the presumption that the medium residing in the region between a pair of opposing planes (including an optical plane and an image plane) is the air. As shown in FIG. 6, the surface attached with the symbol ri (i=1, 2, 3, . . . ) indicates the i-th optical surface from the object side on the optical path, and the surface ri attached with an asterisk (*) is an aspherical plane (i.e. a refractive optical plane of an aspherical configuration or a plane having a refractive power substantially equivalent to the action of an aspherical plane). Since the aperture stop (ST), both surfaces of the plane parallel plate (FT), and the light receiving surface of the image sensor (SR) are flat, respective radii of curvature thereof are infinite (∞).

The aspherical configuration of the optical plane is defined by the following conditional expression (23), wherein a vertex of the lens surface is represented as the point of origin, and a local orthogonal coordinate system (x, y, z) is used, with the direction from the object toward the image sensor being the plus direction of z-axis.

$$z = \frac{c \cdot h^2}{1 + \sqrt{1 - (1+k)c^2 \cdot h^2}} + A \cdot h^4 + B \cdot h^6 + C \cdot h^8 + D \cdot h^{10} + E \cdot h^{12} + F \cdot h^{14} \quad (23)$$

z: a displacement in z-axis direction at the height position h (relative to the vertex of the lens surface),
h: a height in a direction perpendicular to z-axis ($h^2=x^2+y^2$),
c: a paraxial curvature (=1/radius of curvature),
A, B, C, D, E, F: aspherical coefficients of 4th, 6th, 8th, 10th, 12th, and 14th orders, respectively, and
k: a conical coefficient.

As is obvious from the conditional expression (23), the radii of curvature of the aspherical lens elements shown in Table 2 each shows a value approximate to the vertex of the lens surface of the corresponding lens element. Also, Table 3 shows the conical coefficient k of the aspherical surface (i.e. the i-th lens surface attached with the asterisk (*) in Table 2), and the aspherical coefficients A, B, C, and D.

Figure 14:
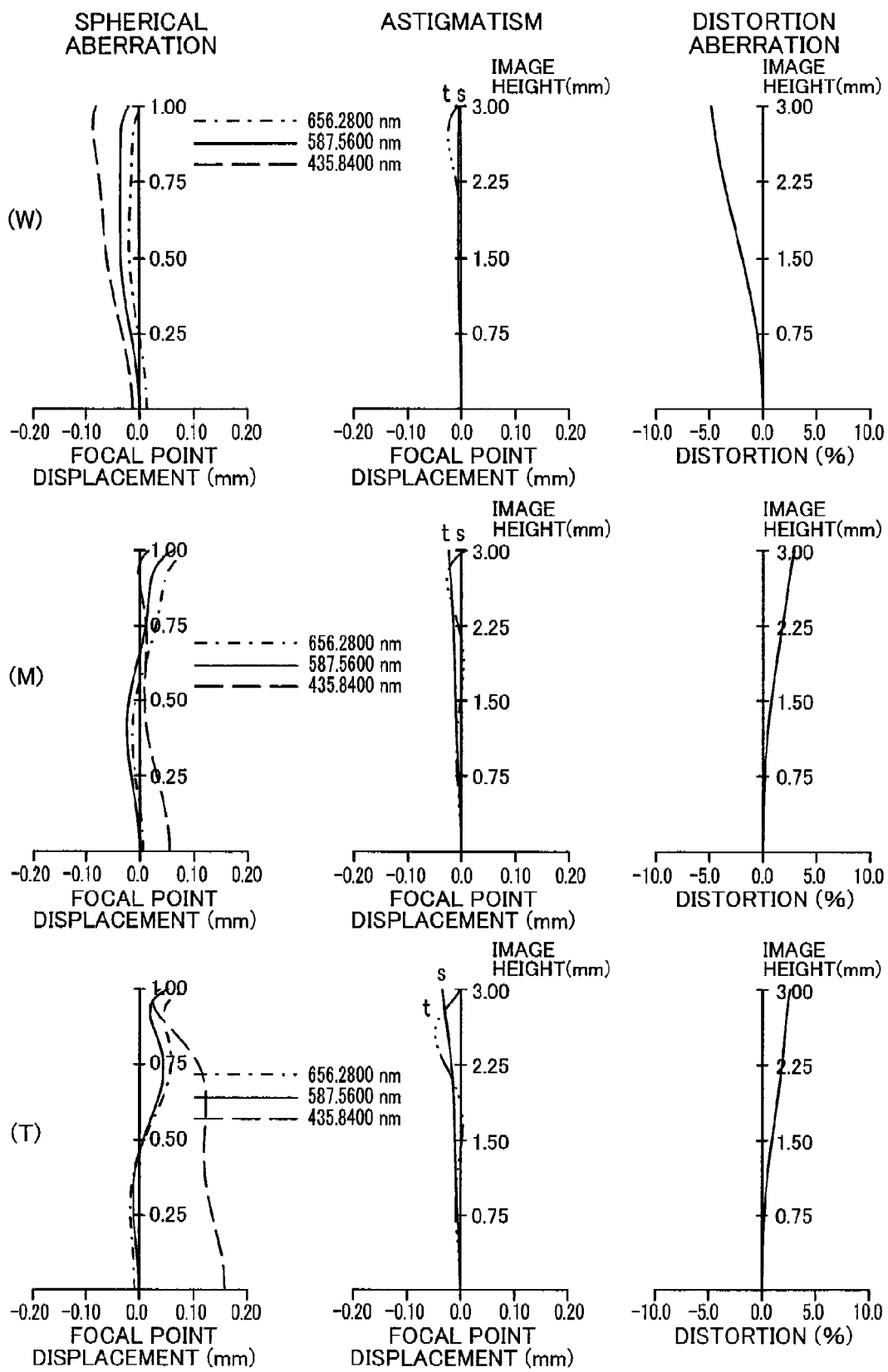
FIG. 14 is aberration diagrams showing spherical aberration, astigmatism, and distortion aberration of lens groups in Example 1.
Figure 15:
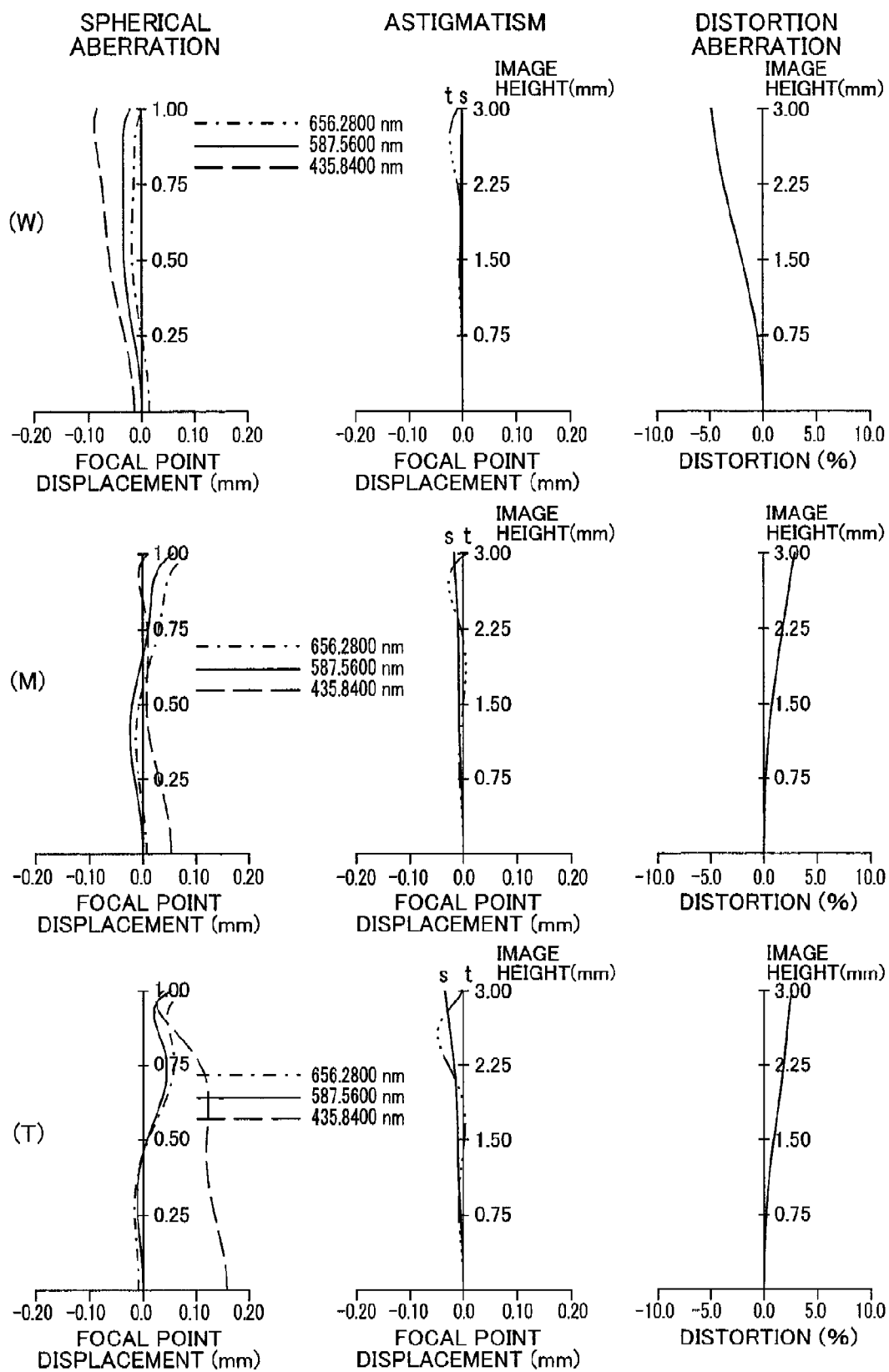
FIG. 15 is aberration diagrams showing spherical aberration, astigmatism, and distortion aberration of lens groups in Example 2.
Figure 16:
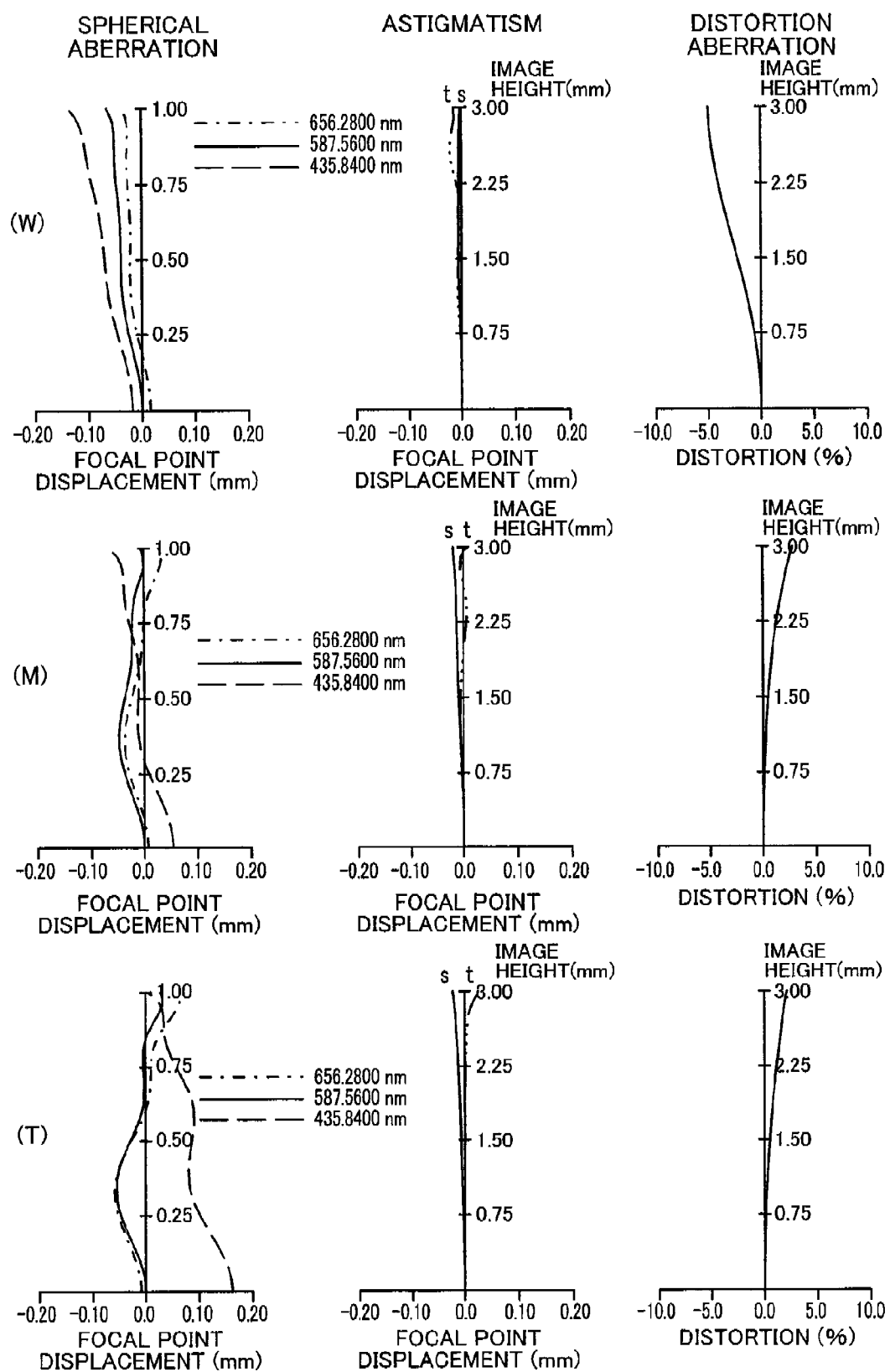
FIG. 16 is aberration diagrams showing spherical aberration, astigmatism, and distortion aberration of lens groups in Example 3.
Figure 17:
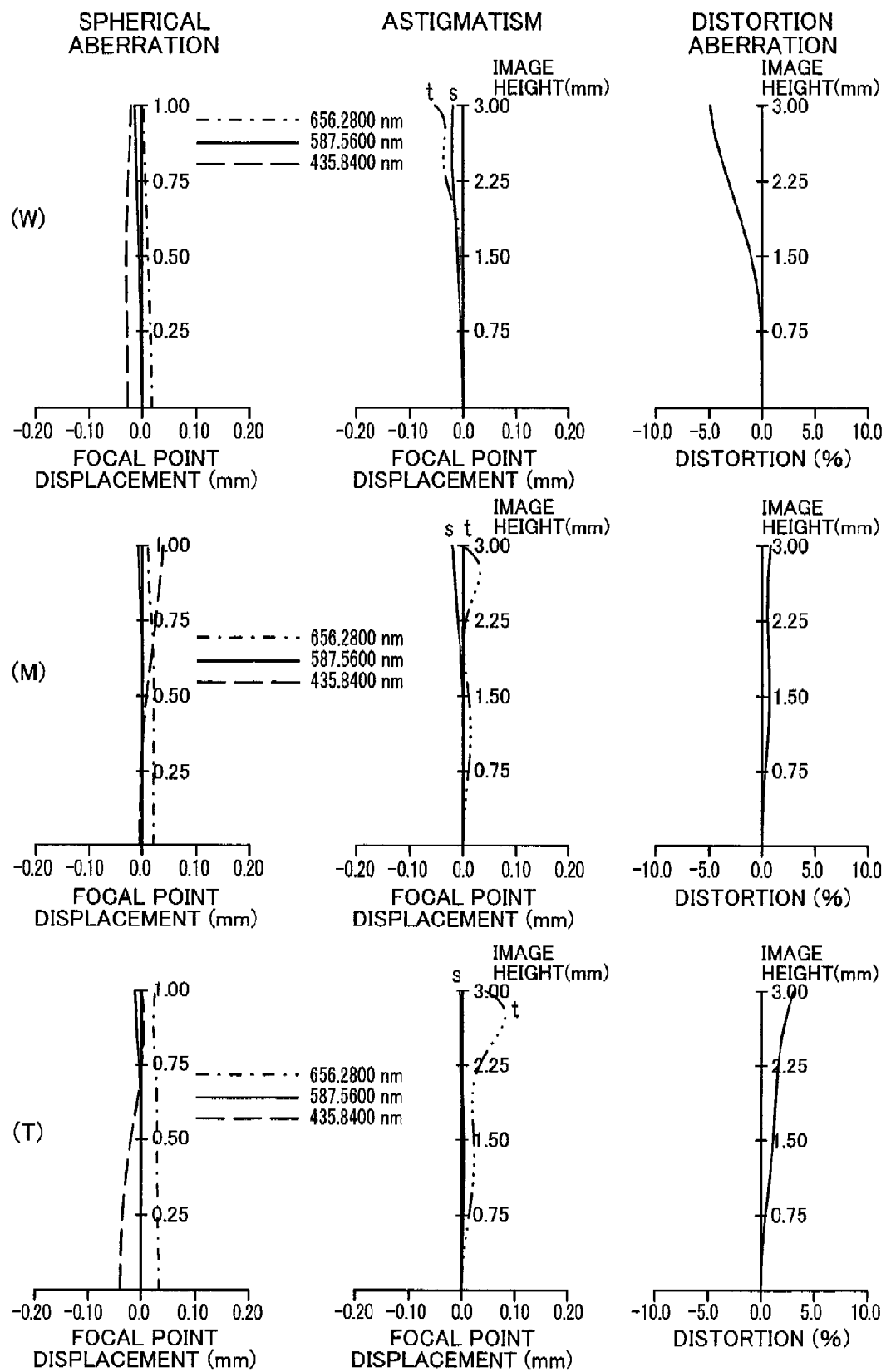
FIG. 17 is aberration diagrams showing spherical aberration, astigmatism, and distortion aberration of lens groups in Example 4.
Figure 18:
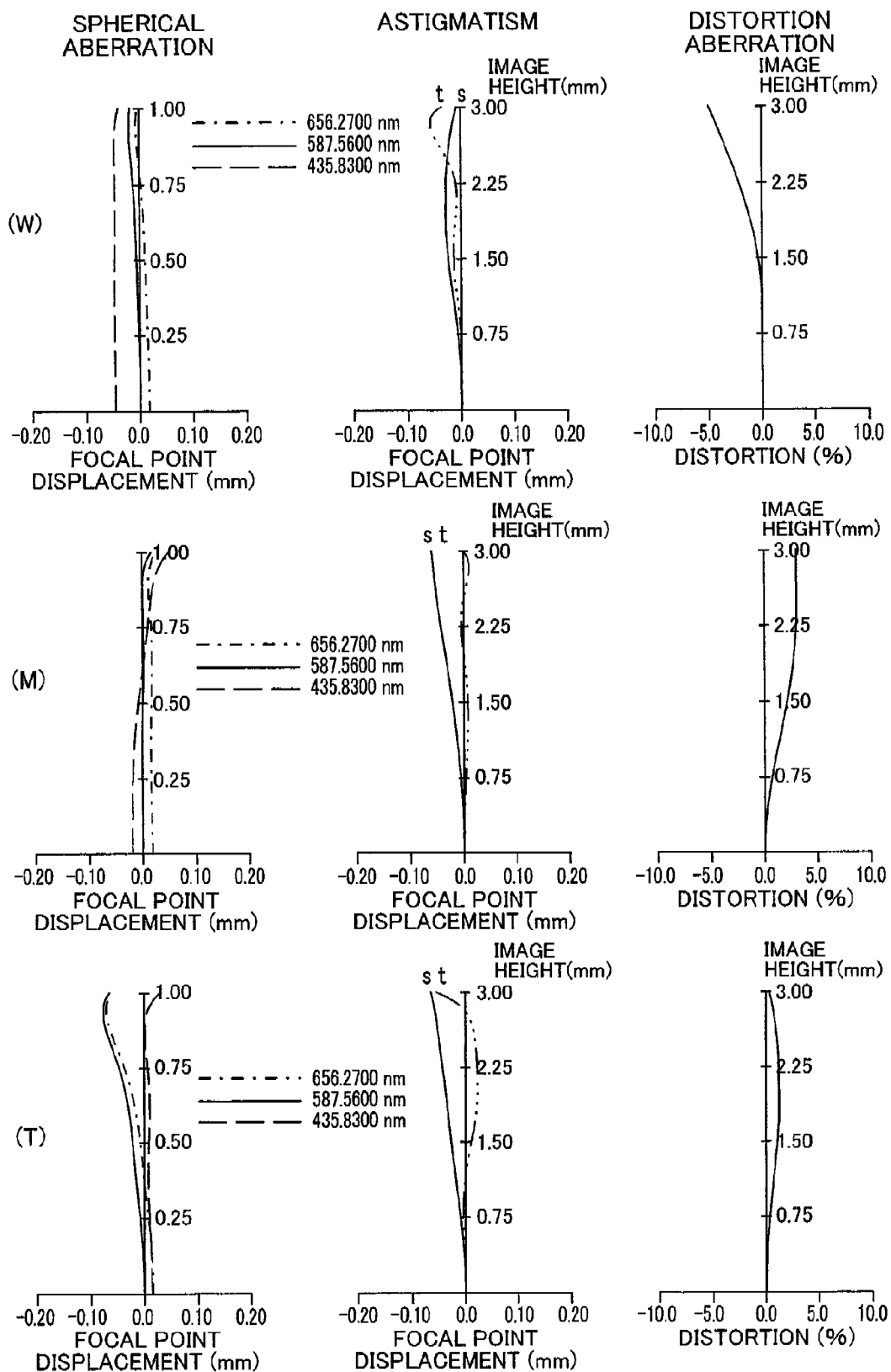
FIG. 18 is aberration diagrams showing spherical aberration, astigmatism, and distortion aberration of lens groups in Example 5.
Figure 19:
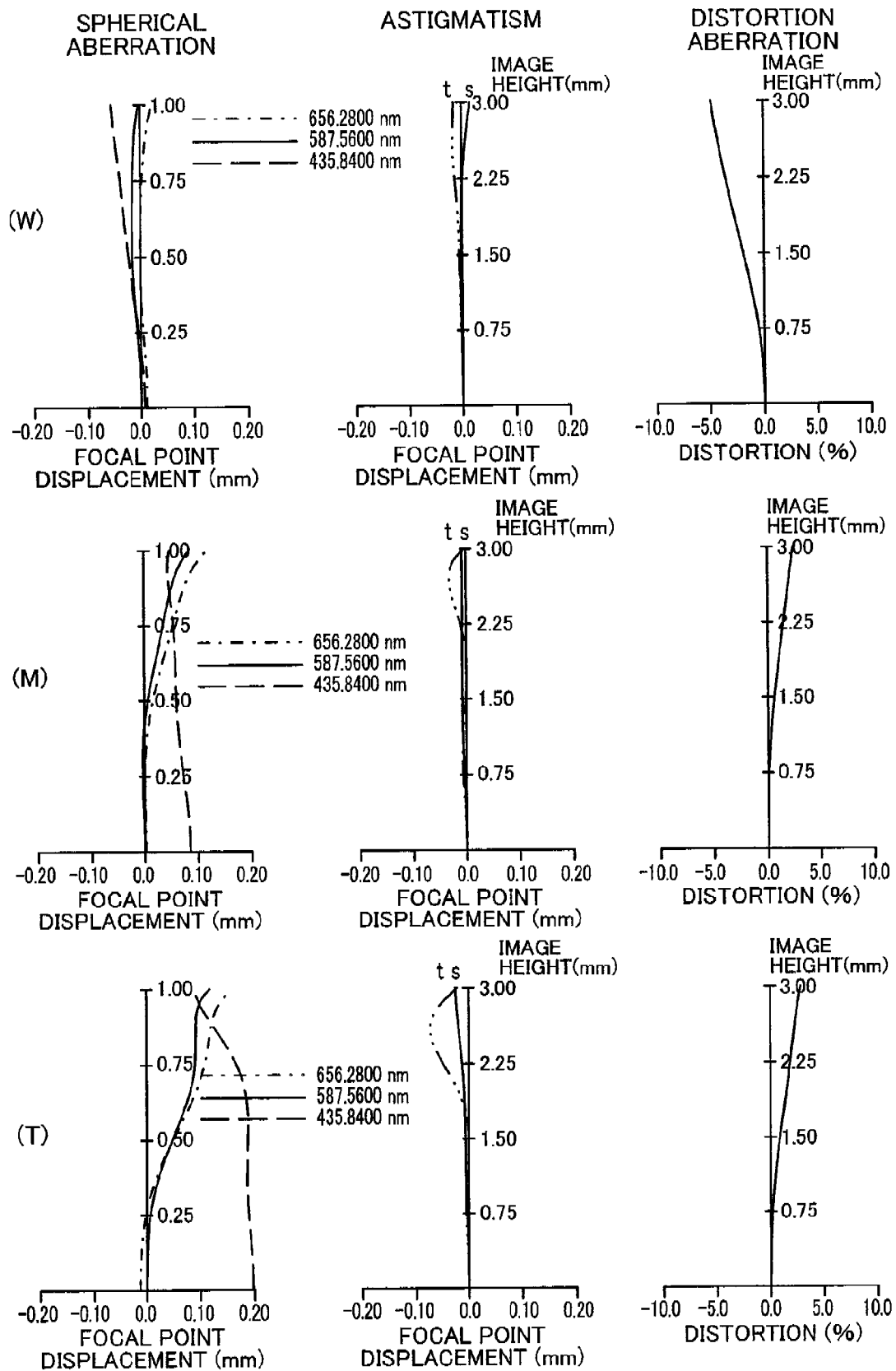
FIG. 19 is aberration diagrams showing spherical aberration, astigmatism, and distortion aberration of lens groups in Example 6.
Figure 20:
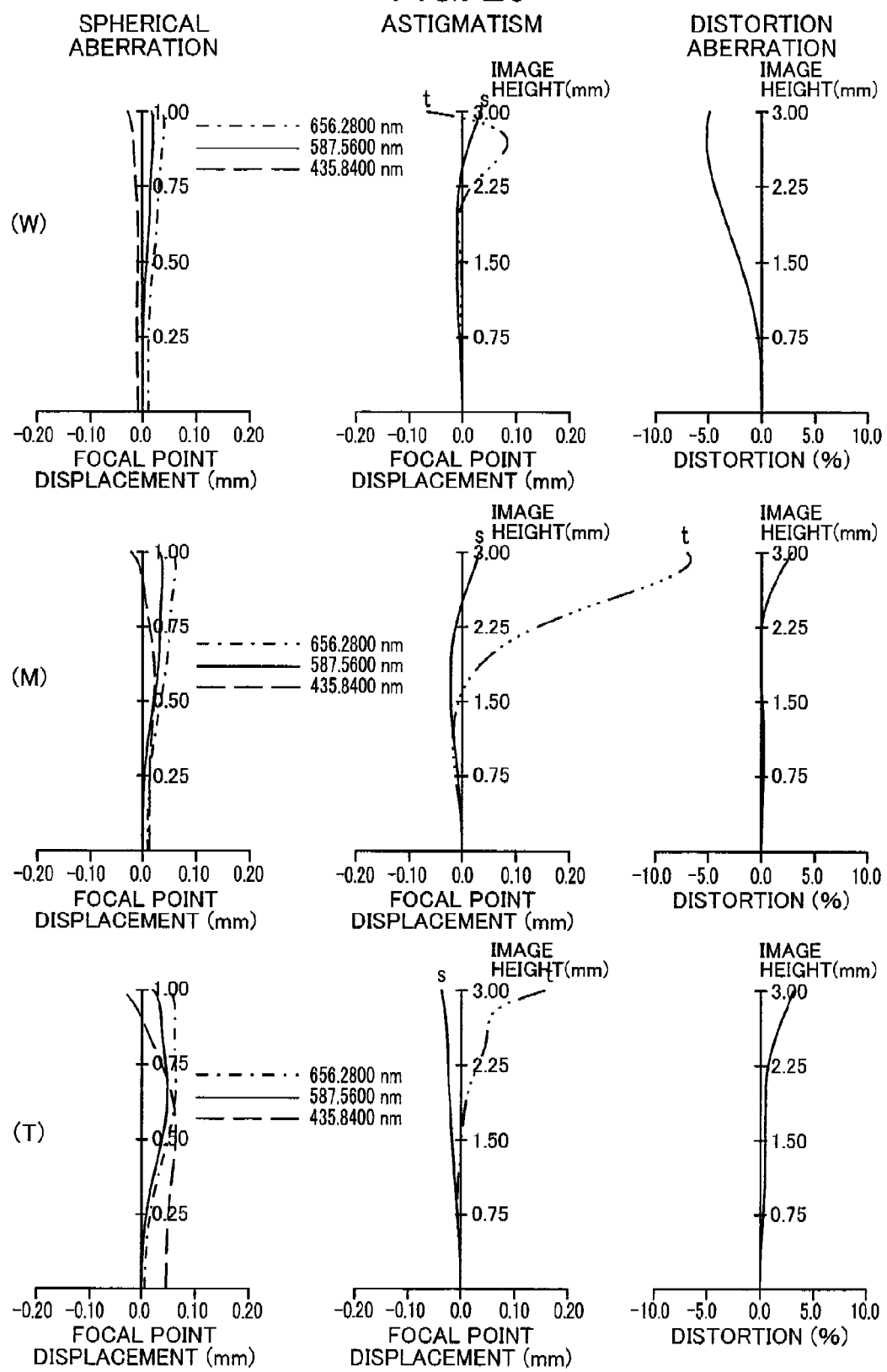
FIG. 20 is aberration diagrams showing spherical aberration, astigmatism, and distortion aberration of lens groups in Example 7.
Figure 21:
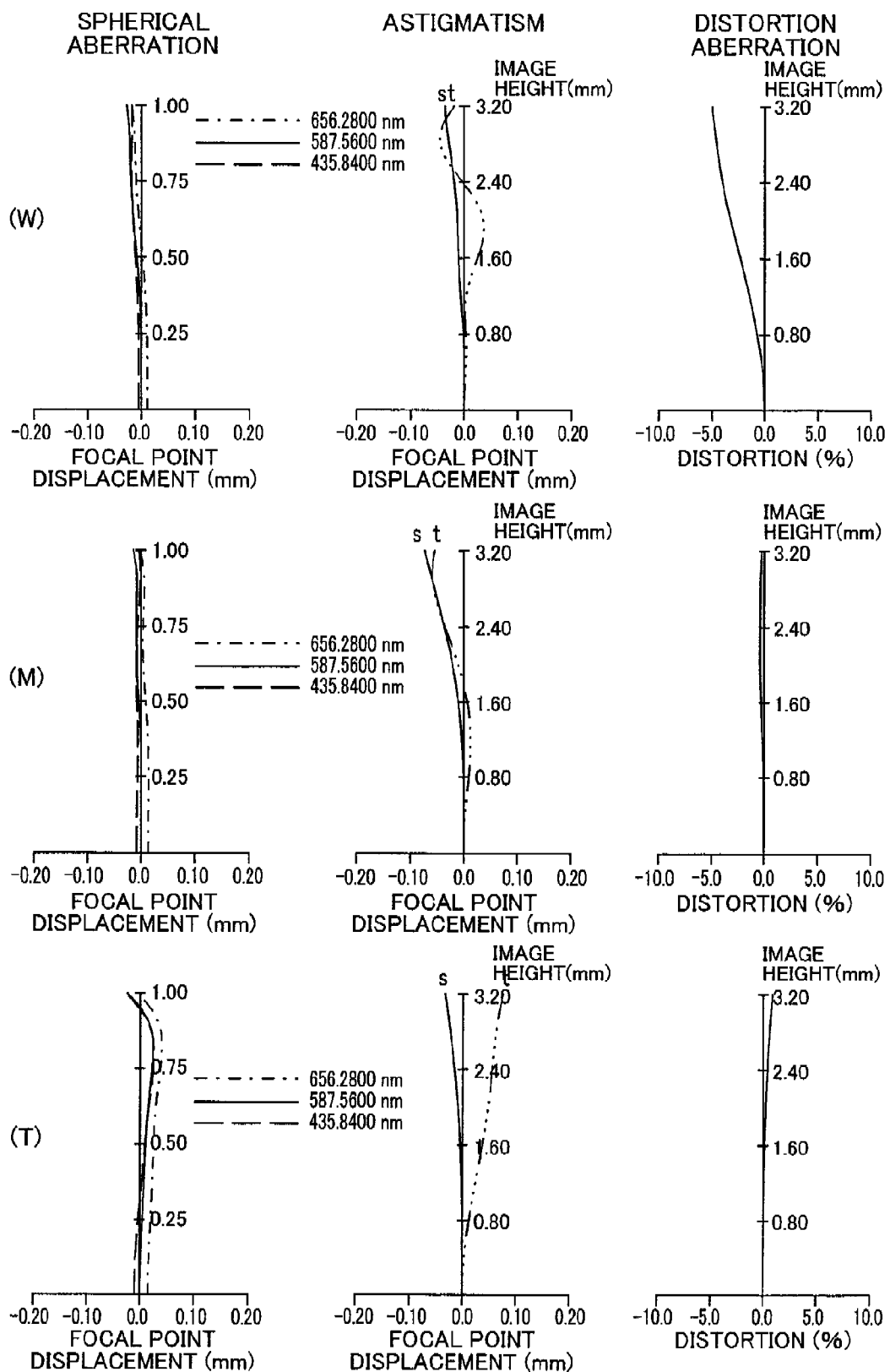
FIG. 21 is aberration diagrams showing spherical aberration, astigmatism, and distortion aberration of lens groups in Example 8.

The spherical aberration (LONGITUDINAL SPHERICAL ABERRATION, the astigmatism (ASTIGMATISM), and the distortion aberration (DISTORTION) of the entire optical system in Example 1 having the above lens arrangement and construction are shown in FIG. 14 from the left column in this order. Specifically, in FIG. 14, the aberrations at the wide angle end (W), the mid point (M), and the telephoto end (T) are shown in the uppermost row, the intermediate row, and the lowermost row, respectively. Each of the horizontal axes in the spherical aberration diagrams and the astigmatism diagrams shows a focal point displacement in the unit of mm. Each of the horizontal axes in the distortion aberration diagrams shows a distortion with respect to the entire image in terms of percentage. Each of the vertical axes in the spherical aberration diagrams shows a value standardized by the incident height, and each of the vertical axes in the astigmatism diagrams and the distortion aberration diagrams shows a height of an optical image (i.e. an image height) (unit: mm).

In the spherical aberration diagrams, aberrations in case of using light of three different wavelengths are shown, wherein the one-dotted-chain lines represent aberrations in using red ray (wavelength: 656.28 nm), the solid lines represent aberrations in using yellow ray (so-called d-line, wavelength: 587.56 nm), and the broken lines represent aberrations in using blue ray (wavelength: 435.84 nm). In the astigmatism diagrams, the solid lines indicated by the symbol "s" and the broken lines indicated by the symbol "t" respectively represent displacement results on a sagittal (radial) plane and a tangential (meridional) plane. Further, the astigmatism diagrams and the distortion aberration diagrams show displacement results in using yellow ray (i.e. d-line). As is obvious from FIG. 14, the lens groups in Example 1 show superior optical characteristics that the distortion aberration is within about 5% at any position of the wide angle end (W), the mid point (M), and the telephoto end (T). The focal length (unit: mm) and the F-number at the wide angle end (W), the mid point (M), and the telephoto end (T) in Example 1 are shown in Tables 18 and 19, respectively. Tables 18 and 19 show that Example 1 provides a fast optical system of a short focal length.

Example 2

Figure 7:
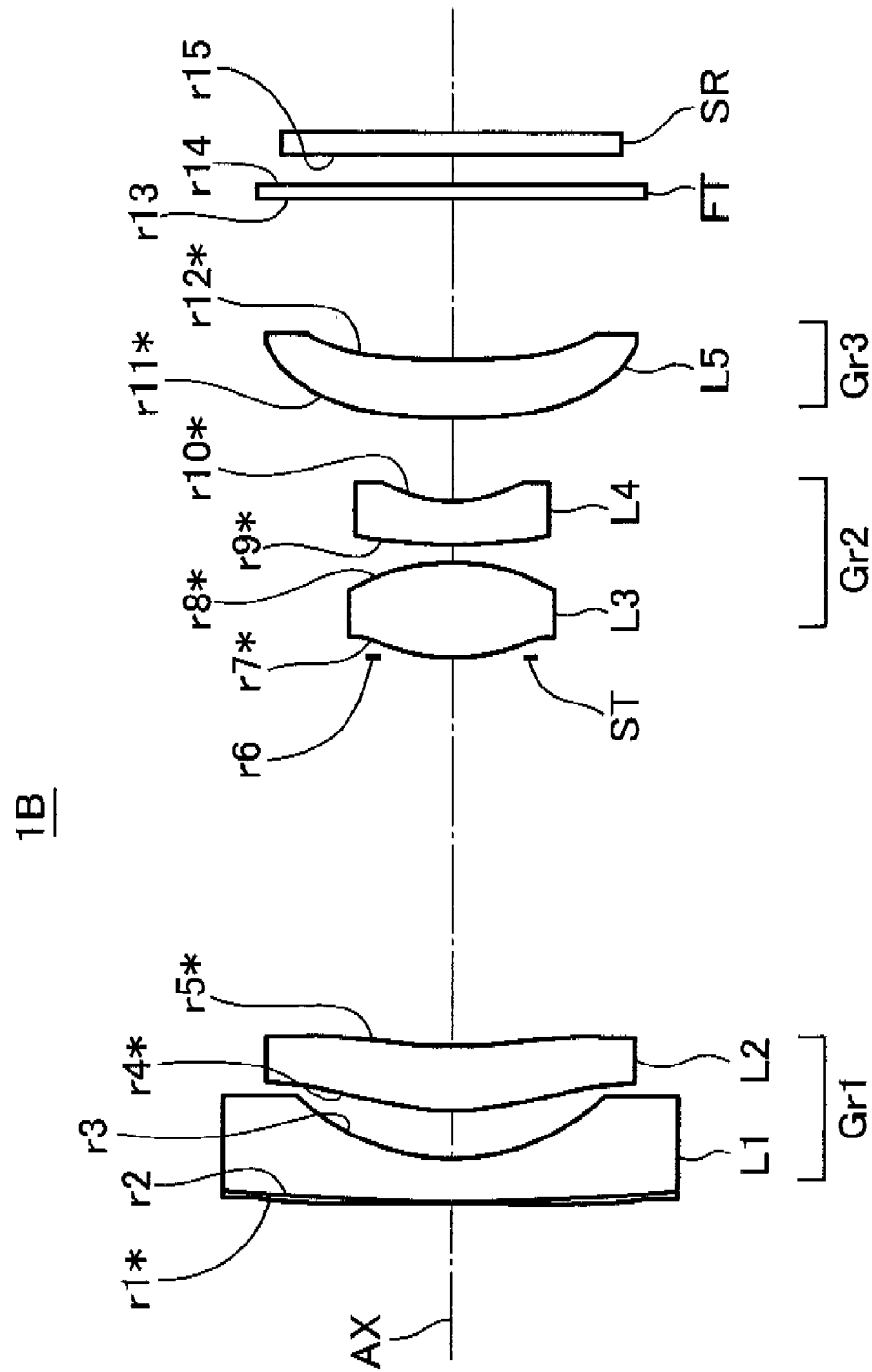
FIG. 7 is a cross-sectional view showing an optical path diagram at a wide angle end in a zoom optical system as Example 2.

FIG. 7 is a cross-sectional view, taken along the optical axis (AX), showing an arrangement of lens groups in a zoom optical system 1B in Example 2. The zoom optical system 1B in Example 2 includes, in the order from the object side, a first lens group (Gr1) having a negative optical power as a whole, an aperture stop (ST), a second lens group (Gr2) having a positive optical power as a whole, and a third lens group (Gr3) having a positive optical power. More specifically, the first lens group (Gr1) is constituted of a biconcave negative lens element (L1) and a positive meniscus lens element (L2) convex to the object side in this order from the object side. The second lens group (Gr2) is constituted of a biconvex positive lens element (L3) and a negative meniscus lens element (L4) convex to the object side in this order from the object side. The third lens group (Gr3) is constituted of a positive meniscus lens element (L5) convex to the object side.

In the zoom optical system 1B in Example 2 having the above lens arrangement, as shown in FIG. 22, in zooming from the wide angle end (W) to the telephoto end (T), the first lens group (Gr1) makes U-turn, the second lens group (Gr2) is linearly moved toward the object side, and the third lens group (Gr3) is fixed. The aperture stop (ST) is moved with the second lens group (Gr2) in zooming.

Construction data concerning the lens elements in the zoom optical system 1B in Example 2 are shown in Tables 4 and 5. As shown in Tables 4 and 5, and FIG. 7, in Example 2, the second through the fifth lens elements (L2 through L5) are bi-aspherical lens elements, and the first lens element (L1) is a mono-aspherical lens element. The first lens element (L1) is a composite aspherical lens element. In the zoom optical system 1B, all the lens elements (L1 through L5) are glass lens elements.

TABLE 4

| LENS SUR-FACE NO. | RADIUS OF CURVATURE (mm) | AXIAL SURFACE DISTANCE (mm) | | | REFRAC-TIVE INDEX | ABBE NUMBER |
|---|---|---|---|---|---|---|
| | | W | M | T | | |
| 1* | −44.288 | 0.020 | | | 1.51313 | 53.84 |
| 2 | 46.451 | 0.800 | | | 1.77250 | 49.77 |
| 3 | 4.235 | 0.904 | | | | |
| 4* | 5.356 | 1.245 | | | 1.80518 | 25.43 |
| 5* | 9.607 | 7.261 | 2.535 | 0.900 | | |
| 6 | ∞ | 0.000 | | | | |
| 7* | 3.452 | 1.781 | | | 1.61154 | 61.22 |
| 8* | −4.080 | 0.350 | | | | |
| 9* | 11.887 | 0.800 | | | 1.80518 | 25.43 |
| 10* | 2.468 | 1.571 | 4.867 | 7.933 | | |
| 11* | 15.226 | 1.093 | | | 1.80518 | 25.43 |
| 12* | 44.341 | 2.984 | | | | |
| 13 | ∞ | 0.300 | | | 1.51680 | 64.20 |
| 14 | ∞ | 0.540 | | | | |
| 15 | ∞ | | | | | |

TABLE 5

| LENS SURFACE NO. | CONICAL COEFFICIENT | ASPHERICAL COEFFICIENT | | | |
|---|---|---|---|---|---|
| | | A | B | C | D |
| 1 | 0 | 1.64E−03 | 1.08E−06 | −1.14E−06 | 0.00E+00 |
| 4 | 0 | −1.23E−03 | −5.19E−04 | −6.93E−06 | 2.00E−06 |
| 5 | 0 | −4.73E−04 | −8.94E−04 | 6.89E−05 | −1.68E−06 |
| 7 | 0 | −5.00E−03 | −1.77E−03 | 1.87E−04 | −1.18E−04 |
| 8 | 0 | 9.85E−03 | −4.87E−03 | 6.37E−04 | −3.83E−05 |
| 9 | 0 | −1.96E−04 | −1.75E−03 | 4.93E−05 | 2.23E−04 |
| 10 | 0 | −8.67E−03 | 3.24E−03 | −1.21E−03 | 5.50E−04 |
| 11 | 0 | 5.33E−03 | −2.39E−05 | −1.09E−05 | 1.69E−06 |
| 12 | 0 | 6.02E−03 | 3.01E−04 | −7.32E−05 | 7.12E−06 |

Example 3

Figure 8:
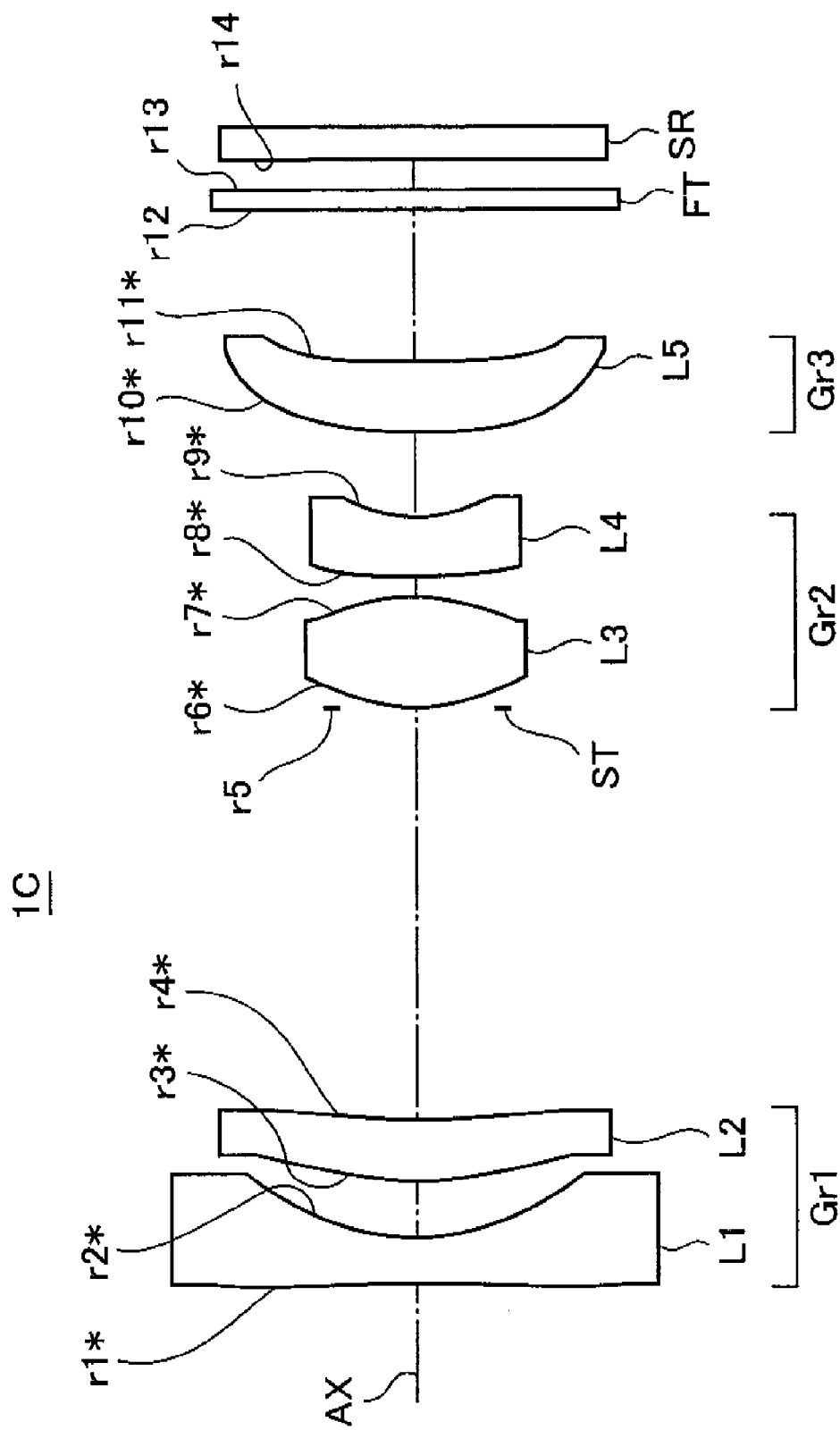
FIG. 8 is a cross-sectional view showing an optical path diagram at a wide angle end in a zoom optical system as Example 3.

FIG. 8 is a cross-sectional view, taken along the optical axis (AX), showing an arrangement of lens groups in a zoom optical system 1C in Example 3. The zoom optical system 1C in Example 3 includes, in the order from the object side, a first lens group (Gr1) having a negative optical power as a whole, an aperture stop (ST) arranged on the object side of a second lens group (Gr2), the second lens group (Gr2) having a positive optical power as a whole, and a third lens group (Gr3) having a positive optical power. More specifically, the first lens group (Gr1) is constituted of a biconcave negative lens element (L1) and a positive meniscus lens element (L2) convex to the object side in this order from the object side. The second lens group (Gr2) is constituted of a biconvex positive lens element (L3) and a negative meniscus lens element (L4) convex to the object side in this order from the object side. The third lens group (Gr3) is constituted of a positive meniscus lens element (L5) convex to the object side.

In the zoom optical system 1C in Example 3 having the above lens arrangement, as shown in FIG. 22, in zooming from the wide angle end (W) to the telephoto end (T), the first lens group (Gr1) makes a U-turn, the second lens group (Gr2) is linearly moved toward the object side, and the third lens group (Gr3) is fixed (the entire length at the wide angle end is larger than the entire length at the telephoto end). The aperture stop (ST) is moved with the second lens group (Gr2) in zooming.

Construction data concerning the lens elements in the zoom optical system 1C in Example 3 are shown in Tables 6 and 7. As shown in Tables 6 and 7, and FIG. 8, in Example 3, all the first through the fifth lens elements (L1 through L5) are bi-aspherical lens elements. In the zoom optical system 1C, the fifth lens element (L5) is a resin lens element, and the lens elements other than the fifth lens element (L5) are glass lens elements.

TABLE 6

| LENS SUR-FACE NO. | RADIUS OF CURVATURE (mm) | AXIAL SURFACE DISTANCE (mm) | | | REFRAC-TIVE INDEX | ABBE NUMBER |
|---|---|---|---|---|---|---|
| | | W | M | T | | |
| 1* | −30.922 | 0.800 | | | 1.68980 | 52.80 |
| 2* | 4.543 | 1.016 | | | | |
| 3* | 6.199 | 1.087 | | | 1.80542 | 26.12 |
| 4* | 10.775 | 7.276 | 2.472 | 0.900 | | |
| 5 | ∞ | 0.000 | | | | |
| 6* | 3.400 | 1.916 | | | 1.58913 | 61.25 |
| 7* | −3.894 | 0.367 | | | | |
| 8* | 18.861 | 0.991 | | | 1.80542 | 26.12 |
| 9* | 2.628 | 1.499 | 4.812 | 7.781 | | |

TABLE 6-continued

| LENS SUR-FACE NO. | RADIUS OF CURVATURE (mm) | AXIAL SURFACE DISTANCE (mm) | | | REFRAC-TIVE INDEX | ABBE NUMBER |
|---|---|---|---|---|---|---|
| | | W | M | T | | |
| 10* | 14.830 | 1.219 | | | 1.58340 | 30.23 |
| 11* | 201.858 | 2.719 | | | | |
| 12 | ∞ | 0.300 | | | 1.51680 | 64.12 |
| 13 | ∞ | 0.540 | | | | |
| 14 | ∞ | | | | | |

TABLE 7

| LENS SURFACE NO. | CONICAL COEFFICIENT | ASPHERICAL COEFFICIENT ||||||
|---|---|---|---|---|---|---|---|
| | | A | B | C | D | E | F |
| 1 | 0 | 5.66E−04 | 2.56E−04 | −2.18E−05 | −1.03E−07 | 6.29E−08 | −1.60E−09 |
| 2 | 0 | −1.72E−04 | −1.27E−04 | 1.05E−04 | −5.43E−06 | −1.23E−06 | 9.95E−08 |
| 3 | 0 | −9.44E−04 | −1.15E−03 | 1.16E−04 | 2.01E−06 | −6.81E−07 | 1.70E−08 |
| 4 | 0 | −6.12E−04 | −1.30E−03 | 1.67E−04 | −2.55E−06 | −6.09E−07 | 2.10E−08 |
| 6 | 0 | −4.10E−03 | −3.14E−03 | 2.53E−03 | −1.42E−03 | 3.39E−04 | −2.82E−05 |
| 7 | 0 | 9.32E−03 | −8.86E−04 | −8.88E−04 | 2.60E−04 | −5.12E−05 | 1.25E−05 |
| 8 | 0 | −6.71E−03 | 1.52E−03 | 8.01E−05 | −1.17E−03 | 5.60E−04 | −6.00E−05 |
| 9 | 0 | −6.78E−03 | 3.75E−03 | 1.30E−03 | −2.26E−03 | 7.76E−04 | −6.91E−06 |
| 10 | 0 | 6.21E−03 | −7.10E−04 | 3.15E−04 | −5.81E−05 | 5.05E−06 | −1.54E−07 |
| 11 | 0 | 6.90E−03 | −4.79E−04 | 1.84E−04 | −4.79E−06 | −3.58E−06 | 3.68E−07 |

Example 4

Figure 9:
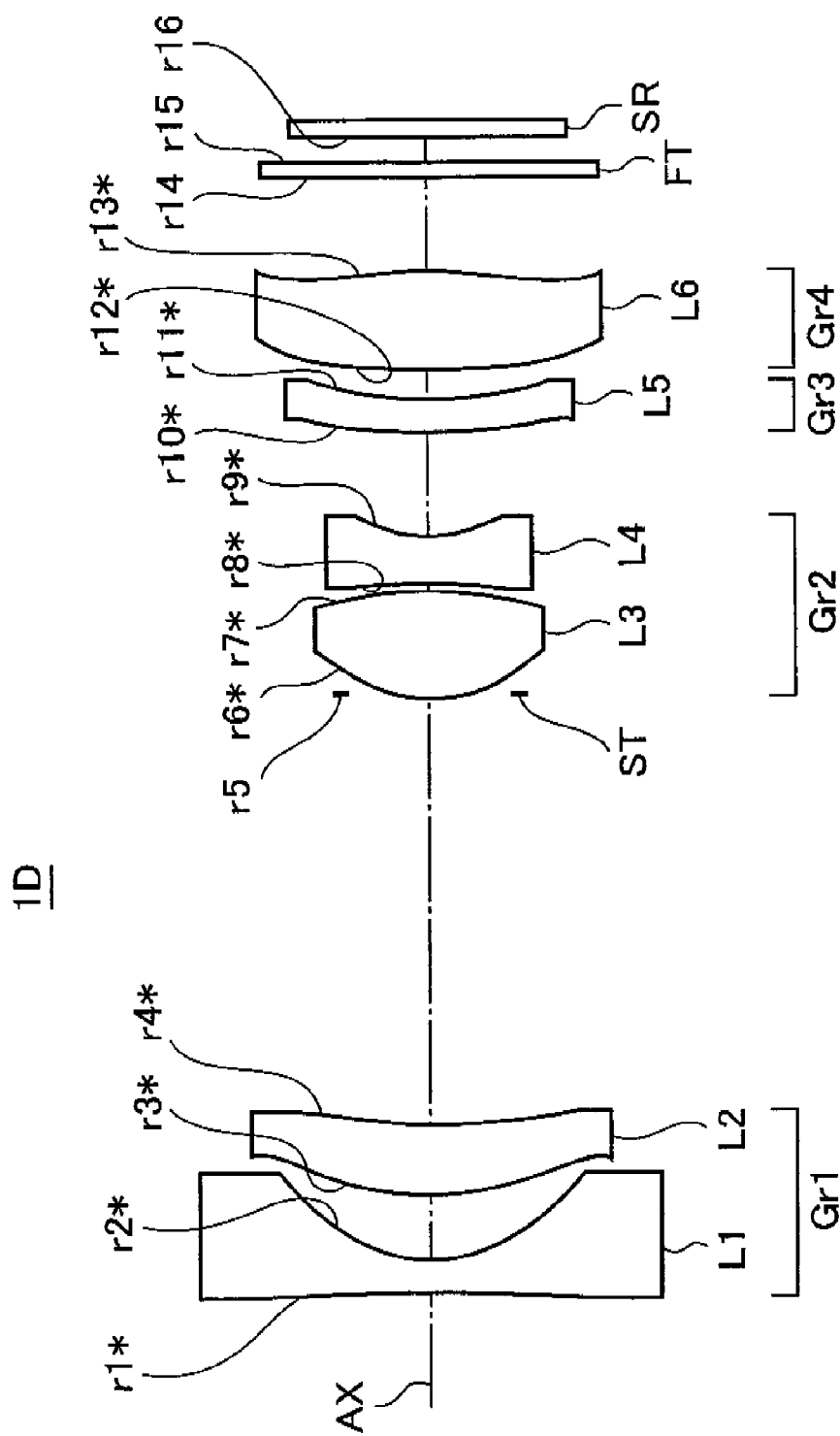
FIG. 9 is a cross-sectional view showing an optical path diagram at a wide angle end in a zoom optical system as Example 4.

FIG. 9 is a cross-sectional view, taken along the optical axis (AX), showing an arrangement of lens groups in a zoom optical system 1D in Example 4. The zoom optical system 1D in Example 4 includes, in the order from the object side, a first lens group (Gr1) having a negative optical power as a whole, an aperture stop (ST), a second lens group (Gr2) having a positive optical power as a whole, a third lens group (Gr3) having a negative optical power, and a fourth lens group (Gr4) having a positive optical power. More specifically, the first lens group (Gr1) is constituted of a biconcave negative lens element (L1) and a positive meniscus lens element (L2) convex to the object side in this order from the object side. The second lens group (Gr2) is constituted of a biconvex positive lens element (L3) and a biconcave negative lens element (L4) in this order from the object side. The third lens group (Gr3) is constituted of a negative meniscus lens element (L5) convex to the object side The fourth lens group (Gr4) is constituted of a biconvex positive lens element (L6).

In the zoom optical system 1D in Example 4 having the above lens arrangement, as shown in FIG. 22, in zooming from the wide angle end (W) to the telephoto end (T), the second lens group (Gr2) is linearly moved toward the object side, and the third lens group (Gr3) makes a U-turn. On the other hand, the first lens group (Gr1) and the fourth lens group (Gr4) are fixed. The aperture stop (ST) is moved with the second lens group (Gr2) in zooming.

Construction data concerning the lens elements in the zoom optical system 1D in Example 4 are shown in Tables 8 and 9. As shown in Tables 8 and 9, and FIG. 9, in Example 4, all the lens elements (L1 through L6) are bi-aspherical lens elements. In the zoom optical system 1D, the first lens element (L1), the fifth lens element (L5), and the sixth lens element (L6) are resin lens elements, and the lens elements other than the first lens element (L1), the fifth lens element (L5), and the sixth lens element (L6) are glass lens elements.

TABLE 8

| LENS SURFACE NO. | RADIUS OF CURVATURE (mm) | AXIAL SURFACE DISTANCE (mm) | | | REFRACTIVE INDEX | ABBE NUMBER |
|---|---|---|---|---|---|---|
| | | W | M | T | | |
| 1* | −19.573 | 0.700 | | | 1.53048 | 55.72 |
| 2* | 3.571 | 1.410 | | | | |
| 3* | 5.935 | 1.507 | | | 1.79850 | 22.60 |
| 4* | 10.024 | 9.141 | 3.905 | 1.500 | | |
| 5 | ∞ | 0.100 | | | | |
| 6* | 3.177 | 2.319 | | | 1.58913 | 61.24 |
| 7* | −7.159 | 0.145 | | | | |
| 8* | −20.246 | 0.700 | | | 1.72009 | 25.79 |
| 9* | 5.554 | 2.580 | 0.711 | 5.287 | | |
| 10* | 20.738 | 0.700 | | | 1.53048 | 55.72 |
| 11* | 10.113 | 0.624 | 7.729 | 5.558 | | |
| 12* | 20.533 | 2.126 | | | 1.58340 | 30.23 |
| 13* | −14.849 | 2.038 | | | | |
| 14 | ∞ | 0.300 | | | 1.51680 | 64.12 |
| 15 | ∞ | 0.540 | | | | |
| 16 | ∞ | | | | | |

TABLE 9

| LENS SURFACE NO. | CONICAL COEFFICIENT | ASPHERICAL COEFFICIENT ||||
|---|---|---|---|---|---|
| | | A | B | C | D |
| 1 | 0 | 2.54E−03 | −1.71E−04 | 5.43E−06 | −5.04E−08 |
| 2 | 0 | −2.14E−03 | 4.64E−04 | −3.81E−05 | −5.43E−07 |
| 3 | 0 | −3.59E−03 | 3.61E−04 | −1.06E−05 | −6.74E−07 |
| 4 | 0 | −2.88E−03 | 2.18E−04 | −7.21E−06 | −6.53E−07 |
| 6 | 0 | −8.32E−04 | −9.94E−06 | −2.17E−05 | 2.15E−07 |
| 7 | 0 | 4.49E−03 | −1.35E−03 | 3.38E−04 | −3.55E−05 |
| 8 | 0 | 1.36E−03 | −1.98E−03 | 6.65E−04 | −8.78E−05 |
| 9 | 0 | 6.54E−03 | −1.89E−05 | 5.38E−04 | −4.78E−05 |

TABLE 9-continued

| LENS SURFACE NO. | CONICAL COEFFICIENT | ASPHERICAL COEFFICIENT | | | |
|---|---|---|---|---|---|
| | | A | B | C | D |
| 10 | 0 | 2.19E−04 | 3.83E−04 | −1.72E−05 | −2.70E−06 |
| 11 | 0 | 4.28E−04 | 3.85E−04 | 9.31E−08 | −4.19E−06 |
| 12 | 0 | 1.03E−03 | −2.23E−04 | 3.52E−05 | −1.13E−06 |
| 13 | 0 | 2.56E−03 | −5.25E−04 | 5.83E−05 | −1.44E−06 |

Example 5

Figure 10:
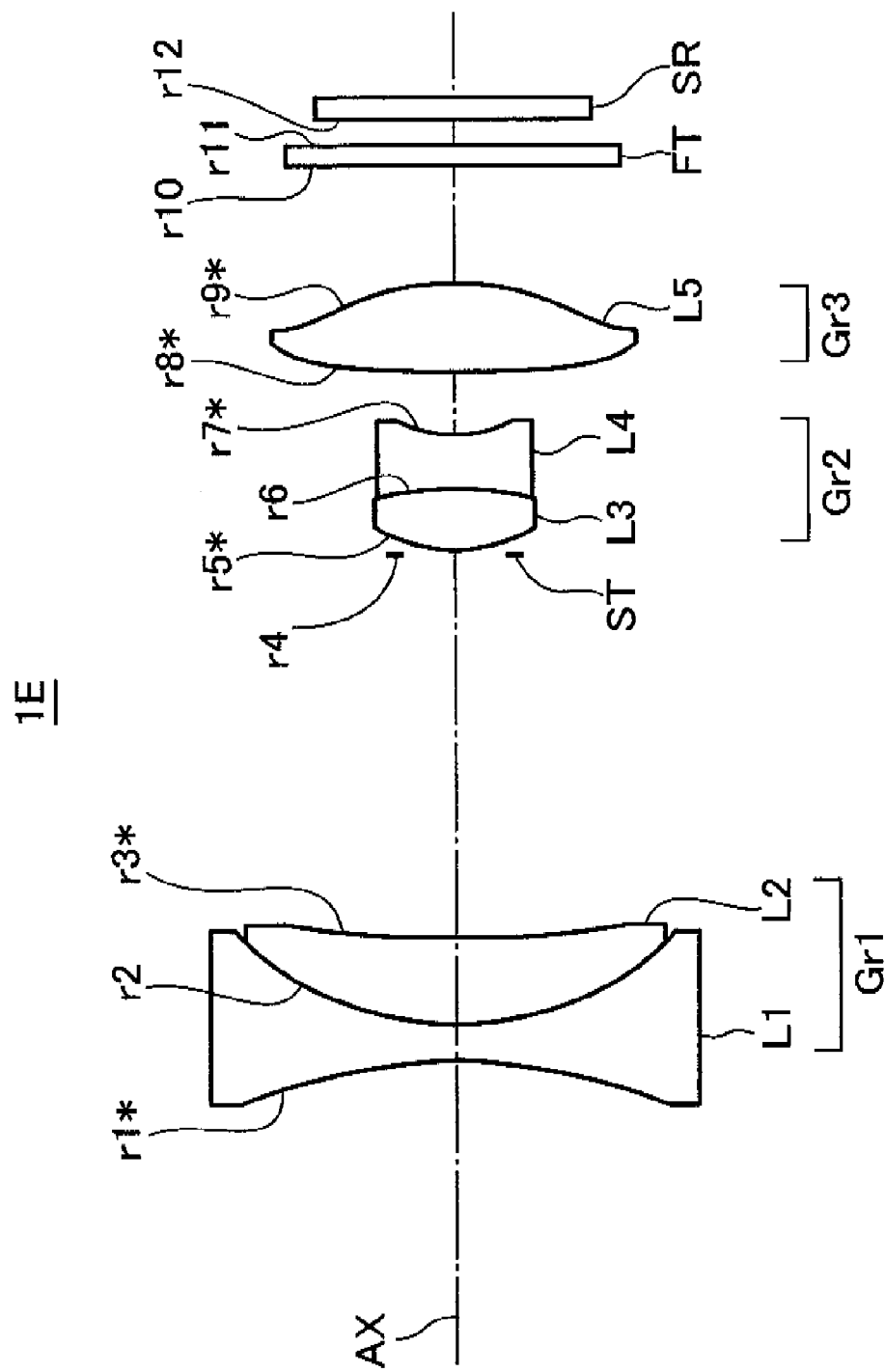
FIG. 10 is a cross-sectional view showing an optical path diagram at a wide angle end in a zoom optical system as Example 5.

FIG. 10 is a cross-sectional view, taken along the optical axis (AX), showing an arrangement of lens groups in a zoom optical system 1E in Example 5. The zoom optical system 1E in Example 5 includes, in the order from the object side, a first lens group (Gr1) having a negative optical power as a whole, an aperture stop (ST), a second lens group (Gr2) having a positive optical power as a whole, and a third lens group (Gr3) having a positive optical power. More specifically, the first lens group (Gr1) is constituted of a cemented lens element composed of a biconcave negative lens element (L1), and a positive meniscus lens element (L2) convex to the object side in this order from the object side. The second lens group (Gr2) is constituted of a cemented lens element composed of a biconvex positive lens element (L3), and a biconcave negative lens element (L4) in this order from the object side. The third lens group (Gr3) is constituted of a biconvex positive lens element (L5).

In the zoom optical system 1E in Example 5 having the above lens arrangement, as shown in FIG. 23, in zooming from the wide angle end (W) to the telephoto end (T), the first lens group (Gr1) makes a U-turn, the second lens group (Gr2) is linearly moved toward the object side, and the third lens group (Gr3) is linear moved toward the image side. The aperture stop (ST) is moved with the second lens group (Gr2) in zooming.

Construction data concerning the lens elements in the zoom optical system 1E in Example 5 are shown in Tables 10 and 11. As shown in Tables 10 and 11, and FIG. 10, in Example 5, the first through the fourth lens elements (L1 through L4) are mono-aspherical lens elements, and the fifth lens element (L5) is a bi-aspherical lens element. In the zoom optical system 1E, the first lens element (L1), the second lens element (L2), and the fifth lens element (L5) are resin lens elements, and the lens elements other than the first lens element (L1), the second lens element (L2), and the fifth lens element (L5) are glass lens elements.

TABLE 10

| LENS SURFACE NO. | RADIUS OF CURVATURE (mm) | AXIAL SURFACE DISTANCE (mm) | | | REFRACTIVE INDEX | ABBE NUMBER |
|---|---|---|---|---|---|---|
| | | W | M | T | | |
| 1* | −9.056 | 0.800 | | | 1.53048 | 55.72 |
| 2 | 6.929 | 1.910 | | | 1.58340 | 30.23 |
| 3* | 28.038 | 8.314 | 3.200 | 1.400 | | |
| 4 | ∞ | 0.100 | | | | |
| 5* | 3.171 | 1.342 | | | 1.85335 | 39.62 |
| 6 | −6.828 | 1.183 | | | 1.72284 | 25.43 |
| 7* | 2.898 | 1.400 | 6.705 | 9.840 | | |
| 8* | 45.880 | 1.926 | | | 1.53048 | 55.72 |
| 9* | −4.449 | 2.525 | 1.596 | 1.000 | | |
| 10 | ∞ | 0.500 | | | 1.51680 | 64.20 |
| 11 | ∞ | 0.500 | | | | |
| 12 | ∞ | | | | | |

TABLE 11

| LENS SURFACE NO. | CONICAL COEFFICIENT | ASPHERICAL COEFFICIENT | | | |
|---|---|---|---|---|---|
| | | A | B | C | D |
| 1 | 0 | 1.23E−03 | −4.90E−05 | 2.20E−06 | −4.13E−08 |
| 3 | 0 | 2.00E−04 | −4.12E−05 | 4.99E−06 | −1.92E−07 |
| 5 | 0 | −8.17E−04 | −3.70E−04 | 2.12E−04 | −6.70E−05 |
| 7 | 0 | 1.04E−02 | 9.21E−04 | 5.27E−04 | −1.10E−04 |
| 8 | 0 | 1.06E−03 | −1.34E−04 | 1.23E−05 | −9.04E−08 |
| 9 | 0 | 6.05E−03 | −3.84E−04 | 2.29E−05 | −2.40E−08 |

Example 6

Figure 11:
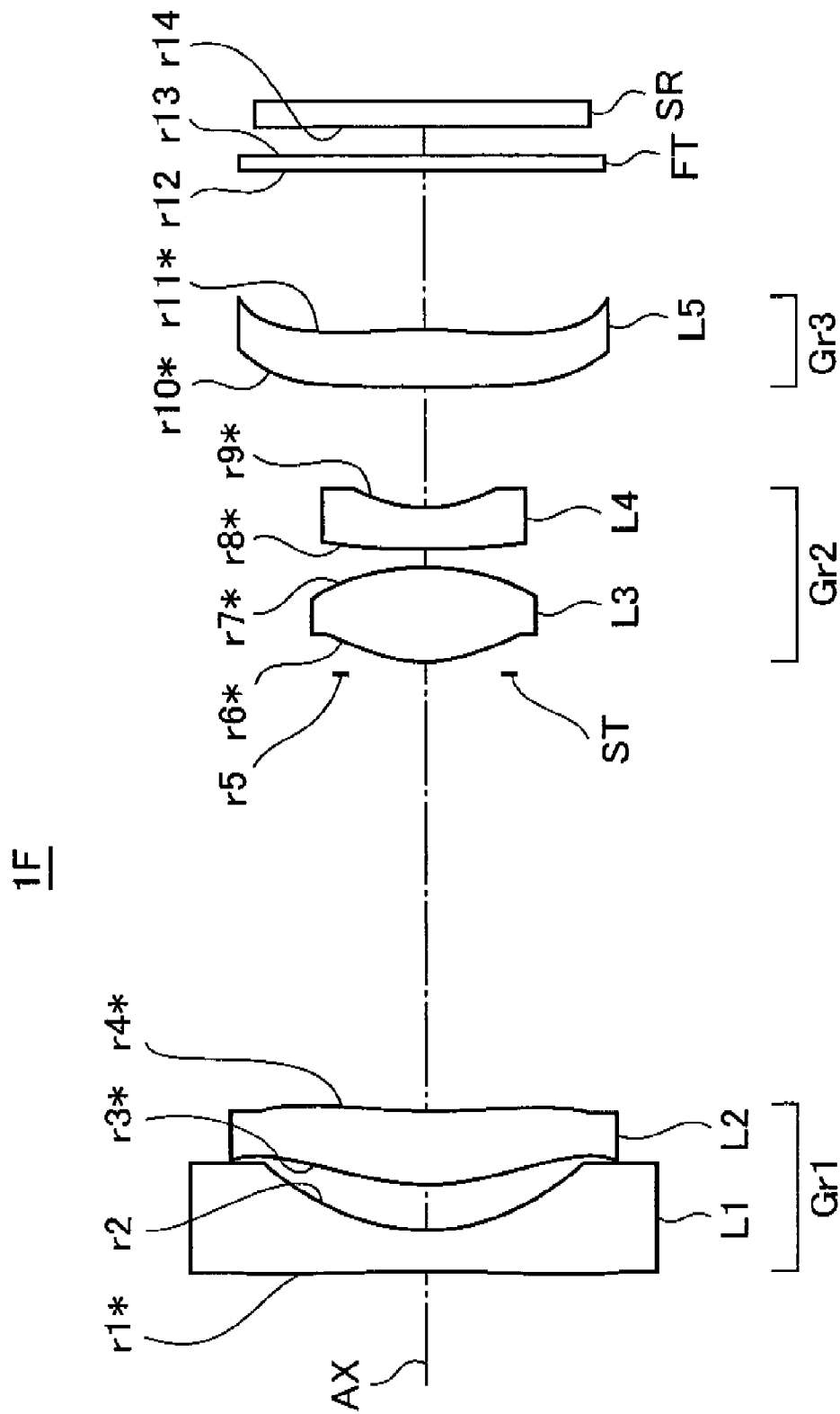
FIG. 11 is a cross-sectional view showing an optical path diagram at a wide angle end in a zoom optical system as Example 6.

FIG. 11 is a cross-sectional view, taken along the optical axis (AX), showing an arrangement of lens groups in a zoom optical system 1F in Example 6. The zoom optical system 1F in Example 6 includes, in the order from the object side, a first lens group (Gr1) having a negative optical power as a whole, an aperture stop (ST), a second lens group (Gr2) having a positive optical power as a whole, and a third lens group (Gr3) having a positive optical power. More specifically, the first lens group (Gr1) is constituted of a biconcave negative lens element (L1) and a positive meniscus lens element (L2) convex to the object side in this order from the object side. The second lens group (Gr2) is constituted of a biconvex positive lens element (L3) and a negative meniscus lens element (L4) convex to the object side in this order from the object side. The third lens group (Gr3) is constituted of a biconvex positive lens element (L5).

In the zoom optical system 1F in Example 6 having the above lens arrangement, as shown in FIG. 23, in zooming from the wide angle end (W) to the telephoto end (T), the first lens group (Gr1) makes a U-turn, the second lens group (Gr2) is linearly moved toward the object side, and the third lens group (Gr3) is linearly moved toward the image side (the entire length at the wide angle end is larger than the entire length at the telephoto end). The aperture stop (ST) is moved with the second lens group (Gr2) in zooming.

Construction data concerning the lens elements in the zoom optical system 1F in Example 6 are shown in Tables 12 and 13. As shown in Tables 12 and 13, and FIG. 11, in Example 6, the second through the fifth lens elements (L2 through L5) are bi-aspherical lens elements, and the first lens element (L1) is a mono-aspherical lens element. In the zoom optical system 1F, all the first through the fifth lens elements (L1 through L5) are glass lens elements.

Example 7

Figure 12:
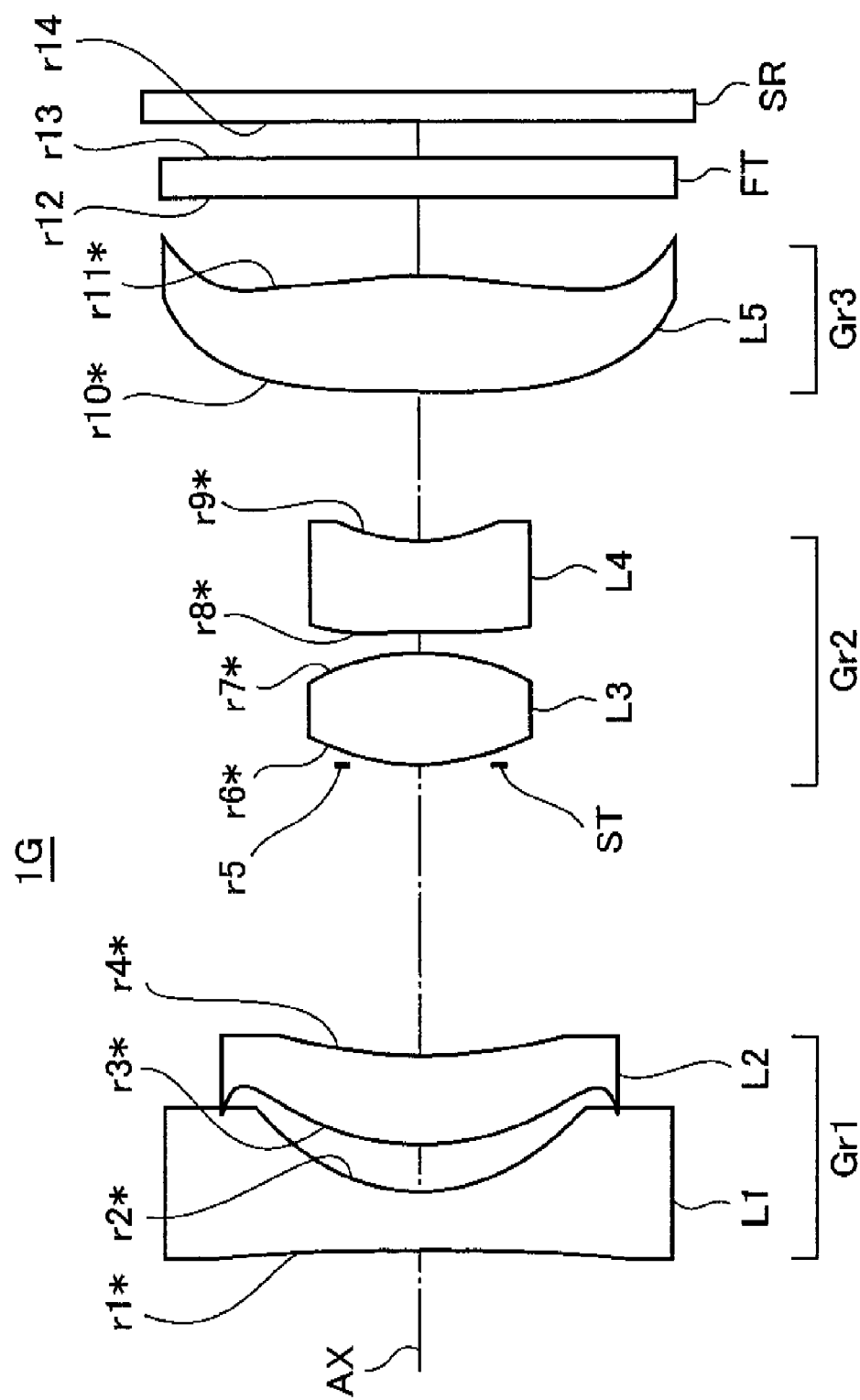
FIG. 12 is a cross-sectional view showing an optical path diagram at a wide angle end in a zoom optical system as Example 7.

FIG. 12 is a cross-sectional view, taken along the optical axis (AX), showing an arrangement of lens groups in a zoom optical system 1G as Example 7. The zoom optical system 1G in Example 7 includes, in the order from the object side, a first lens group (Gr1) having a negative optical power as a whole, an aperture stop (ST), a second lens group (Gr2) having a positive optical power as a whole, and a third lens group (Gr3) having a positive optical power. More specifically, the first lens group (Gr1) is constituted of a biconcave negative lens element (L1) and a positive meniscus lens element (L2) convex to the object side in this order from the object side. The second lens group (Gr2) is constituted of a biconvex positive lens element (L3) and a negative meniscus lens element (L4) convex to the object side in this order from the object side. The third lens group (Gr3) is constituted of a biconvex positive lens element (L5).

In the zoom optical system 1G in Example 7 having the above lens arrangement, as shown in FIG. 22, in zooming from the wide angle end (W) to the telephoto end (T), the first lens group (Gr1) makes a U-turn, the second lens group (Gr2) is linearly moved toward the object side, and the third lens group (Gr3) is fixed. The aperture stop (ST) is moved with the second lens group (Gr2) in zooming.

Construction data concerning the lens elements in the zoom optical system 1G in Example 7 are shown in Tables 14 and 15. As shown in Tables 14 and 15, and FIG. 12, in Example 7, all the first through the fifth lens elements (L1 through L5) are bi-aspherical lens elements. In the zoom optical system 1G, the first lens element (L1), the second lens element (L2), and the fifth lens element (L5) are resin lens elements, and the lens elements other than the first lens element (L1), the second lens element (L2), and the fifth lens element (L5) are glass lens elements.

TABLE 12

| LENS SUR-FACE NO. | RADIUS OF CURVATURE (mm) | AXIAL SURFACE DISTANCE (mm) | | | REFRAC-TIVE INDEX | ABBE NUMBER |
|---|---|---|---|---|---|---|
| | | W | M | T | | |
| 1* | −23.793 | 0.800 | | | 1.77250 | 49.77 |
| 2 | 4.496 | 0.931 | | | | |
| 3* | 6.117 | 1.425 | | | 1.80518 | 25.43 |
| 4* | 17.663 | 8.700 | 3.241 | 1.200 | | |
| 5 | ∞ | 0.200 | | | | |
| 6* | 3.383 | 1.804 | | | 1.61154 | 61.22 |
| 7* | −4.476 | 0.352 | | | | |
| 8* | 25.245 | 0.800 | | | 1.80518 | 25.43 |
| 9* | 2.703 | 2.407 | 6.207 | 10.060 | | |
| 10* | 125.496 | 1.101 | | | 2.00170 | 20.60 |
| 11* | −24.236 | 3.148 | 3.021 | 2.958 | | |
| 12 | ∞ | 0.300 | | | 1.51680 | 64.12 |
| 13 | ∞ | 0.540 | | | | |
| 14 | ∞ | | | | | |

TABLE 13

| LENS SURFACE NO. | CONICAL COEFFICIENT | ASPHERICAL COEFFICIENT | | | |
|---|---|---|---|---|---|
| | | A | B | C | D |
| 1 | 0 | 1.59E−03 | −2.27E−05 | −6.39E−07 | 2.58E−08 |
| 3 | 0 | −8.05E−04 | −2.84E−04 | 8.24E−08 | 2.48E−07 |
| 4 | 0 | 7.26E−05 | −4.27E−04 | 2.03E−05 | −4.13E−07 |
| 6 | 0 | −3.78E−03 | −6.65E−04 | −8.12E−05 | −3.08E−05 |
| 7 | 0 | 1.04E−02 | −3.47E−03 | 3.74E−04 | −2.49E−05 |
| 8 | 0 | 1.62E−04 | −9.24E−04 | 1.22E−04 | 7.93E−05 |
| 9 | 0 | −6.97E−03 | 3.03E−03 | −5.57E−04 | 2.30E−04 |
| 10 | 0 | 2.55E−03 | 7.64E−05 | −8.03E−06 | 6.51E−07 |
| 11 | 0 | 2.77E−03 | 1.86E−04 | −2.56E−05 | 1.94E−06 |

TABLE 14

| LENS SUR-FACE NO. | RADIUS OF CURVATURE (mm) | AXIAL SURFACE DISTANCE (mm) | | | REFRAC-TIVE INDEX | ABBE NUMBER |
|---|---|---|---|---|---|---|
| | | W | M | T | | |
| 1* | −25.773 | 0.800 | | | 1.53048 | 55.72 |
| 2* | 2.506 | 0.665 | | | | |

TABLE 14-continued

| LENS SUR- FACE NO. | RADIUS OF CURVATURE (mm) | AXIAL SURFACE DISTANCE (mm) | | | REFRAC- TIVE INDEX | ABBE NUMBER |
|---|---|---|---|---|---|---|
| | | W | M | T | | |
| 3* | 3.345 | 1.234 | | | 1.58340 | 30.23 |
| 4* | 6.961 | 3.988 | 1.979 | 0.900 | | |
| 5 | ∞ | 0.000 | | | | |
| 6* | 3.068 | 1.528 | | | 1.58913 | 61.24 |
| 7* | −2.922 | 0.280 | | | | |
| 8* | 23.453 | 1.234 | | | 1.80542 | 26.12 |
| 9* | 2.181 | 2.053 | 3.612 | 5.141 | | |
| 10* | 18.878 | 1.578 | | | 1.58340 | 30.23 |
| 11* | −10.705 | 1.081 | | | | |
| 12 | ∞ | 0.500 | | | 1.51680 | 64.12 |
| 13 | ∞ | 0.500 | | | | |
| 14 | ∞ | | | | | |

TABLE 15

| LENS SURFACE NO. | CONICAL COEFFICIENT | ASPHERICAL COEFFICIENT | | | | |
|---|---|---|---|---|---|---|
| | | A | B | C | D | E |
| 1 | 0 | −1.28E−03 | 1.38E−03 | −3.52E−04 | 3.80E−05 | −1.49E−06 |
| 2 | 0 | −6.03E−03 | 3.86E−03 | −1.43E−03 | 1.51E−04 | −7.25E−06 |
| 3 | 0 | −1.45E−03 | 3.85E−04 | −9.94E−04 | 3.09E−04 | −3.04E−05 |
| 4 | 0 | 7.59E−05 | −2.20E−03 | −6.65E−05 | 3.16E−04 | −5.27E−05 |
| 6 | 0 | −9.76E−03 | −4.64E−03 | 6.78E−03 | −7.66E−03 | 2.79E−03 |
| 7 | 0 | 1.19E−02 | 8.01E−03 | −1.57E−02 | 8.04E−03 | −1.23E−03 |
| 8 | 0 | −7.27E−03 | 1.69E−02 | −2.34E−02 | 1.31E−02 | −2.29E−03 |
| 9 | 0 | −1.80E−02 | 9.61E−03 | −3.92E−03 | −2.19E−03 | 1.86E−03 |
| 10 | 0 | 4.30E−03 | −2.06E−03 | 5.17E−04 | −4.59E−05 | 1.50E−06 |
| 11 | 0 | 6.11E−03 | −2.45E−03 | 4.15E−04 | −1.70E−05 | 0.00E+00 |

Example 8

Figure 13:
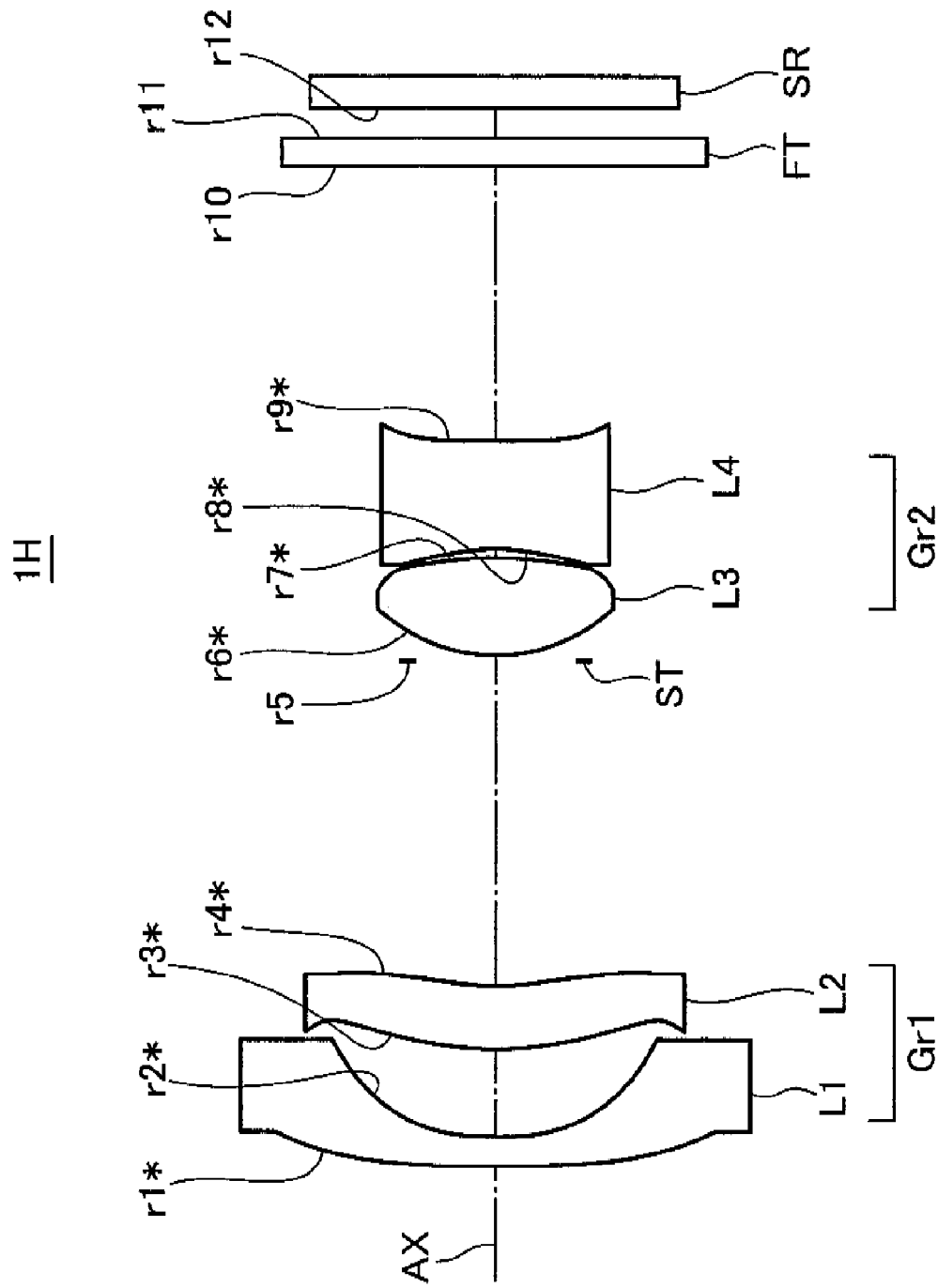
FIG. 13 is a cross-sectional view showing an optical path diagram at a wide angle end in a zoom optical system as Example 8.

FIG. 13 is a cross-sectional view, taken along the optical axis (AX), showing an arrangement of lens groups in a zoom optical system 1H in Example 8. The zoom optical system 1H in Example 8 includes, in the order from the object side, a first lens group (Gr1) having a negative optical power as a whole, an aperture stop (ST), and a second lens group (Gr2) having a positive optical power as a whole. More specifically, the first lens group (Gr1) is constituted of a biconcave negative lens element (L1) and a positive meniscus lens element (L2) convex to the object side in this order from the object side. The second lens group (Gr2) is constituted of a biconvex positive lens element (L3) and a negative meniscus lens element (L4) convex to the image side in this order from the object side.

In the zoom optical system 1H in Example 8 having the above lens arrangement, as shown in FIG. 23, in zooming from the wide angle end (W) to the telephoto end (T), the first lens group (Gr1) is linearly moved toward the image side, and the second lens group (Gr2) is linearly moved toward the object side. The aperture stop (ST) is moved with the second lens group (Gr2) in zooming.

Construction data concerning the lens elements in the zoom optical system 1H in Example 8 are shown in Tables 16 and 17. As shown in Tables 16 and 17, and FIG. 13, in Example 8, the first through the fourth lens elements (L1 through L4) are bi-aspherical lens elements. In the zoom optical system 1H, all the lens elements (L1 through L4) are glass lens elements.

TABLE 16

| LENS SUR- FACE NO. | RADIUS OF CURVATURE (mm) | AXIAL SURFACE DISTANCE (mm) | | | REFRAC- TIVE INDEX | ABBE NUMBER |
|---|---|---|---|---|---|---|
| | | W | M | T | | |
| 1* | −29.141 | 0.500 | | | 1.76252 | 50.22 |
| 2* | 4.585 | 1.502 | | | | |
| 3* | 5.871 | 1.102 | | | 1.92286 | 20.88 |
| 4* | 8.390 | 5.493 | 2.165 | 0.500 | | |

TABLE 16-continued

| LENS SUR- FACE NO. | RADIUS OF CURVATURE (mm) | AXIAL SURFACE DISTANCE (mm) | | | REFRAC- TIVE INDEX | ABBE NUMBER |
|---|---|---|---|---|---|---|
| | | W | M | T | | |
| 5 | ∞ | 0.100 | | | | |
| 6* | 3.057 | 1.660 | | | 1.72000 | 50.31 |
| 7* | −5.032 | 0.153 | | | | |
| 8* | −3.335 | 1.842 | | | 1.79850 | 22.60 |
| 9* | −22.279 | 4.648 | 5.990 | 7.344 | | |
| 10 | ∞ | 0.500 | | | 1.51680 | 64.20 |
| 11 | ∞ | 0.500 | | | | |
| 12 | ∞ | | | | | |

TABLE 17

| LENS SURFACE NO. | CONICAL COEFFICIENT | ASPHERICAL COEFFICIENT | | | |
|---|---|---|---|---|---|
| | | A | B | C | D |
| 1 | 0 | 8.89E−03 | −4.97E−04 | 1.14E−05 | −5.01E−08 |
| 2 | 0 | 7.07E−03 | 6.69E−04 | 4.42E−05 | −7.68E−06 |
| 3 | 0 | −5.70E−03 | 9.48E−04 | −7.19E−05 | −1.85E−06 |
| 4 | 0 | −5.34E−03 | 9.07E−04 | −1.62E−04 | 6.94E−06 |
| 6 | 0 | −2.19E−04 | 2.14E−04 | 4.50E−05 | 1.42E−06 |
| 7 | 0 | 1.91E−02 | −3.58E−03 | 2.41E−03 | −7.44E−04 |
| 8 | 0 | 3.06E−02 | −6.01E−03 | 2.62E−03 | −7.88E−04 |
| 9 | 0 | 1.79E−02 | 1.28E−04 | 4.16E−04 | −1.61E−05 |

FIGS. 15 through 21 show spherical aberration, astigmatism, and distortion aberration of all the optical systems in Examples 2 through 8 having the aforementioned lens arrangements and constructions, respectively. Similarly to FIG. 14, the spherical aberration diagrams in FIGS. 15 through 21 show aberrations in the case where three rays of different wavelengths are used. Specifically, the one-dotted-chain lines represent aberrations in using red ray, the solid lines represent aberrations in using yellow ray, and the broken lines represent aberrations in using blue ray. The lens groups in all Examples 2 through 8 show superior optical characteristics that the distortion aberration is within about 5% at any position of the wide angle end (W), the mid point (M), and the telephoto end (T).

The focal length (unit: mm) and the F-number at the wide angle end (W), the mid point (M), and the telephoto end (T) in the zoom optical systems in Examples 2 through 8 are shown in Tables 18 and 19, respectively. Similarly to Example 1, Tables 18 and 19 show that the zoom optical systems in Examples 2 through 8 each provides a fast optical system of a short focal length.

TABLE 18

| | FOCAL LENGTH (mm) | | |
|---|---|---|---|
| | W | M | T |
| EXAMPLE 1 | 4.5 | 8.5 | 12.3 |
| EXAMPLE 2 | 4.5 | 8.5 | 12.3 |
| EXAMPLE 3 | 4.5 | 8.7 | 12.4 |
| EXAMPLE 4 | 4.6 | 9.1 | 13.0 |
| EXAMPLE 5 | 4.3 | 8.5 | 12.2 |
| EXAMPLE 6 | 4.5 | 8.6 | 12.8 |
| EXAMPLE 7 | 4.5 | 6.5 | 8.5 |
| EXAMPLE 8 | 3.9 | 5.9 | 7.9 |

TABLE 19

| | F NUMBER | | |
|---|---|---|---|
| | W | M | T |
| EXAMPLE 1 | 3.3 | 4.6 | 5.9 |
| EXAMPLE 2 | 3.3 | 4.6 | 5.9 |
| EXAMPLE 3 | 3.3 | 4.7 | 5.9 |
| EXAMPLE 4 | 3.0 | 4.5 | 5.4 |
| EXAMPLE 5 | 3.0 | 4.7 | 6.0 |
| EXAMPLE 6 | 3.2 | 4.5 | 5.9 |
| EXAMPLE 7 | 4.0 | 4.9 | 5.8 |
| EXAMPLE 8 | 2.9 | 3.4 | 3.9 |

The values of the conditional expressions (1) through (21) in the case where the conditional expressions (1) through (21) are applied to the optical systems in Example 2 through 8 are also shown in Table 20.

TABLE 20

| | | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|---|
| CONDITIONAL EXPRESSION (1) | D1/fw | 0.66 | 0.66 | 0.64 | 0.79 | 0.63 | 0.70 | 0.61 | 0.79 |
| CONDITIONAL EXPRESSION (2) | f2/fw | 1.35 | 1.34 | 1.33 | 1.54 | 1.77 | 1.52 | 1.06 | 1.32 |
| CONDITIONAL EXPRESSION (3) | \|ΔZ1pi/d1pi\| | 0.107 | 0.104 | 0.078 | 0.076 | 0.004 | 0.094 | 0.046 | 0.100 |
| CONDITIONAL EXPRESSION (5) | T1e/T1c | 2.30 | 2.27 | 2.41 | 3.96 | 3.77 | 2.69 | 2.43 | 3.93 |
| CONDITIONAL EXPRESSION (6) | Lb/fw | 0.84 | 0.83 | 0.77 | 0.61 | 0.43 | 0.82 | 0.43 | 2.08 |
| CONDITIONAL EXPRESSION (7) | \|f1n/f1p\| | 0.40 | 0.40 | 0.35 | 0.36 | 0.48 | 0.44 | 0.43 | 0.29 |
| CONDITIONAL EXPRESSION (8) | \|f2n/f2p\| | 1.20 | 1.20 | 1.14 | 1.47 | 0.99 | 1.11 | 1.09 | 1.78 |
| CONDITIONAL EXPRESSION (9) | N1p | 1.805 | 1.805 | 1.805 | 1.799 | 1.583 | 1.805 | 1.583 | 1.923 |
| CONDITIONAL EXPRESSION (10) | \|ν1p − ν1n\| | 24.3 | 24.3 | 26.7 | 33.1 | 25.5 | 24.3 | 25.5 | 29.3 |
| CONDITIONAL EXPRESSION (11) | \|N2p − N2n\| | 0.194 | 0.194 | 0.216 | 0.131 | 0.131 | 0.194 | 0.216 | 0.079 |
| CONDITIONAL EXPRESSION (12) | \|ν2p − ν2n\| | 35.8 | 35.8 | 35.1 | 35.4 | 14.2 | 35.8 | 35.1 | 27.7 |
| CONDITIONAL EXPRESSION (13) | \|f1/fw\| | 2.00 | 2.00 | 1.99 | 2.02 | 3.18 | 2.12 | 1.72 | 1.93 |
| CONDITIONAL EXPRESSION (14) | \|f1/ft\| | 0.73 | 0.73 | 0.73 | 0.71 | 1.12 | 0.75 | 0.90 | 0.97 |
| CONDITIONAL EXPRESSION (15) | f2/ft | 0.49 | 0.49 | 0.48 | 0.54 | 0.62 | 0.53 | 0.55 | 0.66 |
| CONDITIONAL EXPRESSION (16) | νp | 25.4 | 25.4 | 30.2 | 30.2 | 55.7 | 20.6 | 30.2 | — |
| CONDITIONAL EXPRESSION (17) | fp/fw | 6.38 | 6.33 | 6.07 | 3.32 | 1.81 | 4.52 | 2.68 | — |

TABLE 20-continued

|  |  | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|---|
| CONDITIONAL EXPRESSION (18) | Y'/TL | 0.15 | 0.15 | 0.15 | 0.12 | 0.15 | 0.13 | 0.19 | 0.18 |
| CONDITIONAL EXPRESSION (19) | t2/TL | 0.32 | 0.32 | 0.32 | 0.31 | 0.34 | 0.33 | 0.20 | 0.15 |
| CONDITIONAL EXPRESSION (20) | αw | 22.0 | 22.0 | 22.0 | 14.1 | 16.8 | 17.6 | 20.0 | 22.2 |
| CONDITIONAL EXPRESSION (21) | \|αw − αt\| | 9.9 | 9.9 | 9.9 | 9.9 | 20.1 | 9.9 | 8.0 | 4.7 |

As described above, according to the zoom optical systems 1A through 1H in Examples 1 through 8, particularly the zoom optical system whose zoom ratio is about two to three times is advantageous in desirably correcting various aberrations in the entire zoom range, and providing a zoom lens device capable of realizing miniaturization or microminiaturization with a less cost.

The foregoing embodiment and/or modifications primarily include the inventions having the following arrangements.

A zoom optical system according to an aspect of the invention includes: a first lens group having a negative optical power; and a second lens group having a positive optical power in the order from an object side, a distance between the first lens group and the second lens group being decreased in zooming from a wide angle end to a telephoto end, wherein the first lens group includes at least one negative lens element and at least one positive lens element, the second lens group is constituted of three or less lens elements, and the zoom optical system satisfies the conditional expressions (1) and (2):

$$0.5 < D1/fw < 0.8 \quad (1)$$

$$0.7 < f2/fw < 2.0 \quad (2)$$

where

D1: a thickness of the first lens group on an optical axis from a forwardmost lens surface to a rearmost lens surface, fw: a composite focal length of an entirety of the optical system at the wide angle end, and f2: a composite focal length of the second lens group.

In the above arrangement, the zoom optical system is configured into a negative dominant optical system, in which the first lens group closest to the object side has a negative optical power. This enables to promptly reduce emission of light rays incident from the object side with a large angle by the negative optical power of the first lens group, which is advantageous in reducing the entire length of the optical system or the diameter of the forwardmost lens element. Also, in the lens arrangement of the first lens group including the negative lens element and the positive lens element, a relatively long moving distance of the zoom lens group can be secured despite miniaturization of the optical system. Accordingly, increase of error sensitivity of the second lens group can be suppressed. These advantages are particularly effectively obtained in a zoom lens device whose zoom ratio is about two to three times. Also, including the at least one negative lens element and the at least one positive lens element in the first lens group is advantageous in desirably correcting magnification chromatic aberration. Further, constituting the second lens group of three or less lens elements enables to reduce a load of a driving device for driving the second lens group whose moving amount is increased in zooming, and reduce the production cost by reducing the number of lens elements.

The zoom optical system satisfies the conditional expressions (1) and (2), considering production feasibility and optical performance. If the value of D1/fw is over the upper limit in the conditional expression (1), it is required to increase the optical power of the second lens group, because the substantial moving amount of the second lens group for zooming is decreased in maintaining the entire length of the optical system. This may make it difficult to produce the lens elements in the second lens group. On the other hand, if the value of D1/fw is under the lower limit in the conditional expression (1), the optical power of the negative lens element in the first lens group is weakened, and the rear principal point is away from the image plane. Accordingly, it may be difficult to secure a relative back focus distance in maintaining substantially the same focal length as in a condition before the optical power of the negative lens element in the first lens group is weakened. Also, it may be difficult to keep the exit pupil away from the image plane. If the value of f2/fw is over the upper limit in the conditional expression (2), the power of the second lens group may be weakened, which may make it difficult to obtain a zoom ratio of about two to three times, while securing miniaturization. On the other hand, if the value of f2/fw is under the lower limit in the conditional expression (2), decentering error sensitivity of the second lens group may be unduly increased, which may make it difficult to produce the lens elements in the second lens group.

A zoom optical system according to another aspect of the invention includes: a first lens group having a negative optical power; and a second lens group having a positive optical power in the order from an object side, a distance between the first lens group and the second lens group being decreased in zooming from a wide angle end to a telephoto end, wherein the first lens group includes at least one negative lens element and at least one positive lens element, the second lens group is constituted of three or less lens elements, and the zoom optical system satisfies the conditional expressions (3) and (4):

$$|\Delta Z1pi/d1pi| < 0.2 \quad (3)$$

$$0.7 < f2/fw < 2.0 \quad (4)$$

where $\Delta Z1pi$: a sag amount of an image-side lens surface of a positive lens element in the first lens group at a maximum effective radius, with a vertex of the lens surface being defined as a reference, d1pi: the maximum effective radius of the image-side lens surface of the positive lens element in the first lens group, fw: a composite focal length of an entirety of the optical system at the wide angle end, and f2: a composite focal length of the second lens group.

Similarly to the arrangement of the one aspect, in the above arrangement, the zoom optical system is configured into a negative dominant optical system to secure substantially the same advantage as in the one aspect. The second lens group is constituted of three or less lens elements. The zoom optical system satisfies the conditional expressions (3) and (4), considering production feasibility and optical performance. If the value of $|\Delta Z1pi/d1pi|$ is over the upper limit in the conditional expression (3), the curvature of each lens element in the first lens group may be unduly increased, and the expansion ratio thereof may be increased, which may make it difficult to produce the lens elements in the first lens group or measure the surface configuration thereof. In addition to the above disadvantages, lens barrels for respectively holding the first lens group and the second lens group may interfere with each other, which may make it difficult to shorten the distance between the first lens group and the second lens group. This is disadvantageous in miniaturizing the zoom optical system. If the value of f2/fw is over the upper limit in the conditional expression (4), the power of the second lens group may be weakened, which may make it difficult to obtain a zoom ratio of about two to three times while securing miniaturization. On the other hand, if the value of f2/fw is under the lower limit in the conditional expression (4), decentering error sensitivity of the second lens group may be unduly increased, which may make it difficult to produce the lens elements in the second lens group.

Preferably, one of the zoom optical systems may further comprise a third lens group having a positive optical power on an image side of the second lens group. In this arrangement, the zoom optical system is configured into an optical system having a negative-positive-positive arrangement. The optical system having the negative-positive-positive arrangement enables to distribute the optical power to the third lens group. Accordingly, it is possible to increase the optical power of the second lens group having substantially the same production error sensitivity as in the optical system having the negative-positive arrangement. Thus, the arrangement is advantageous in miniaturization, because the required moving amount of the second lens group is small. The above arrangement is also advantageous in bringing an incident angle of an off-axis ray onto an image plane (i.e. a light receiving surface of an image sensor) closer to a telecentric state by the third lens group.

In the above arrangement, preferably, the zoom optical system may be constituted merely of the first lens group, the second lens group, and the third lens group. In the case where a zoom optical system is microminiaturized, the space occupation ratio of lens elements relative to the total space of a lens unit is relatively increased, because the lens elements occupy a certain space, in view of a limit in producing lens elements. Under the above circumstances, it is required to reduce the number of lens groups or the number of lens elements as much as possible, despite a requirement that single lens elements themselves should have enhanced precision. In view of this, configuring a zoom optical system into a three-component optical system constituted of a lens group having a negative optical power, a lens group having a positive optical power, and a lens group having a positive optical power in the order from the object side enables to optimize the balance between performance of the zoom optical system, focusing performance, production error sensitivity, and telecentricity with respect to an incident angle onto an image plane, while securing further miniaturization, as compared with a zoom optical system other than the three-component optical system having a negative-positive-positive arrangement.

In one of the zoom optical systems, preferably, a negative lens element closest to the object side in the first lens group may satisfy the conditional expression (5):

$$1 < T1e/T1c < 4 \quad (5)$$

where

T1e: a maximum value of a thickness of the negative lens element in a direction of the optical axis, and T1c: a thickness of the negative lens element on the optical axis.

The zoom optical system satisfying the conditional expression (5) is a zoom optical system superior in production feasibility and optical performance. If the value of T1e/T1c is over the upper limit in the conditional expression (5), the expansion ratio of each lens element may be increased, which may make it difficult to fabricate the lens elements. On the other hand, if the value of T1e/T1c is under the lower limit in the conditional expression (5), the optical power of the negative lens element may be weakened, which may make it difficult to secure a back focus distance or telecentricity.

In one of the zoom optical systems, preferably, in the case where an image sensor is arranged on an image side, the zoom optical system satisfies the conditional expression (6):

$$Lb/fw < 1.5 \quad (6)$$

where

Lb: a distance on the optical axis from a vertex of a lens surface of a lens element closest to the image side and having an optical power to an imaging surface of the image sensor at the telephoto end (in air).

The zoom optical system satisfying the conditional expression (6) is a zoom optical system superior in production feasibility and optical performance. If the value of Lb/fw is over the upper limit in the conditional expression (6), it is required to increase the negative power of the first lens group to secure a long back focus distance. As a result, the curvature of the negative lens element in the first lens group may be unduly increased, which may make it difficult to produce the lens element.

In the above zoom optical system, preferably, the third lens group may be fixed in zooming from the wide angle end to the telephoto end. This arrangement enables to simplify a lens barrel mechanism, and enhance precision in positioning by fixing the third lens group in zooming.

In one of the zoom optical systems, preferably, the first lens group may be constituted of a negative lens element and a positive lens element in the order from the object side, and the zoom optical system may satisfy the conditional expression (7):

$$0.2 < |f1n/f1p| < 0.5 \quad (7)$$

where f1p: a focal length of the positive lens element in the first lens group, and f1n: a focal length of the negative lens element in the first lens group.

In the above arrangement, constituting the first lens group of the one negative lens element and the one positive lens element in the order from the object side enables to easily secure a back focus distance at the wide angle end, and desirably correct astigmatism or magnification chromatic aberration of a wide-angle off-axis ray. If the value of |f1n/f1p| is over the upper limit in the conditional expression (7), particularly, correction of astigmatism or magnification chromatic aberration at the wide angle end may be insufficient. On the other hand, if the value of |f1n/f1p| is under the lower limit in the conditional expression (7), the power of each lens element constituting the first lens group may be unduly increased, which may make it difficult to produce the lens elements in the first lens group.

In one of the zoom optical systems, preferably, the second lens group may be constituted of a positive lens element and a negative lens element in the order from the object side, and the zoom optical system may satisfy the conditional expression (8):

$$0.7 < |f2n/f2p| < 1.8 \quad (8)$$

where f2p: a focal length of the positive lens element in the second lens group, and f2n: a focal length of the negative lens element in the second lens group.

In the above arrangement, the second lens group is constituted of the one positive lens element and the one negative lens element, and the zoom optical system satisfies the conditional expression (8) concerning |f2n/f2p|. This enables to sufficiently correct spherical aberration and on-axis chromatic aberration with use of the positive lens element and the negative lens element in the second lens group. Also, arranging the positive lens element and the negative lens element in the order from the object side enables to bring the principal point position of the second lens group closer to the first lens group. Thereby, the substantial power of the second lens group can be reduced while maintaining a zoom function. This is advantageous in reducing error sensitivity in the second lens group. If the value of |f2n/f2p| is over the upper limit in the conditional expression (8), the optical power of the negative lens element in the second lens group may be weakened. As a result, correction of spherical aberration may be insufficient. On the other hand, if the value of |f2n/f2p| is under the lower limit in the conditional expression (8), the power of the negative lens element in the second lens group may be unduly increased, which may increase magnification chromatic aberration and degrade the image quality.

In one of the zoom optical systems, preferably, the first lens group may be constituted of a biconcave lens element or a negative meniscus lens element convex to the object side, and a positive meniscus lens element convex to the object side in the order from the object side.

Having the above lens arrangement as the first lens group enables to easily secure a back focus distance at the wide angle end, and desirably correct distortion aberration and astigmatism of a wide-angle ray. Also, arranging the positive meniscus lens element convex to the object side enables to desirably correct astigmatism and enhance the performance of maintaining an image plane.

In the above arrangement, preferably, the first lens group may satisfy the conditional expressions (9) and (10):

$$N1p > 1.7 \quad (9)$$

$$|v1p - v1n| > 20 \quad (10)$$

where

N1p: a refractive index of the positive meniscus lens element in the first lens group, v1p: the Abbe number of the positive meniscus lens element in the first lens group, and v1n: the Abbe number of the negative lens element in the first lens group.

The above arrangement enables to provide a zoom optical system advantageous in miniaturization and correction of magnification chromatic aberration. If the value of N1p is under the lower limit in the conditional expression (9), the curvature of the image-side surface of the positive meniscus lens element may be unduly increased. As a result, lens barrels for respectively holding the first lens group and the second lens group may interfere with each other, which may make it difficult to shorten the distance between the first lens group and the second lens group. Thus, the arrangement is disadvantageous in miniaturizing the zoom optical system. If the value of |v1p-v1n| is under the lower limit in the conditional expression (10), correction of magnification chromatic aberration may be insufficient.

In one of the zoom optical systems, preferably, the second lens group may be constituted of a biconvex lens element, and a biconcave lens element or a negative meniscus lens element strongly concave to an image side.

In the above arrangement, since the second lens group is constituted of the positive lens element and the negative lens element in the order from the object side, the principal point position of the second lens group is brought closer to the first lens group. This enables to reduce the substantial power of the second lens group while securing a zoom function, and reduce error sensitivity in the second lens group. Also, arranging the biconvex lens element enables to increase the power of the second lens group, thereby reducing the moving amount of the second lens group in zooming. Further, forming the strongly concave surface toward the image side on the biconcave lens element or the negative meniscus lens element enables to desirably correct astigmatism and chromatic aberration.

In the above zoom optical system, preferably, the second lens group may satisfy the conditional expressions (11) and (12):

$$|N2p - N2n| > 0.15 \quad (11)$$

$$|v2p - v2n| > 30 \quad (12)$$

where

N2p: a refractive index of the positive lens element in the second lens group, v2p: the Abbe number of the positive lens element in the second lens group, N2n: a refractive index of the negative lens element in the second lens group, and v2n: the Abbe number of the negative lens element in the second lens group.

In the above arrangement, if the value of |N2p-N2n| is under the lower limit in the conditional expression (11), astigmatism resulting from an increase of Petzval sum may be increased. If the value of |v2p-v2n| is under the lower limit in the conditional expression (12), correction of on-axis chromatic aberration may be insufficient.

In one of the zoom optical systems, preferably, the third lens group may be constituted of a positive meniscus lens element convex to the object side.

The above arrangement enables to keep the principal point position of the lens element away from the image plane, and reduce the incident angle onto the image plane. This is advantageous in microminiaturizing the zoom optical system.

Preferably, one of the zoom optical systems may further comprise an aperture stop on the object side of the second lens group, the aperture stop having a fixed aperture diameter.

In the above arrangement, the size of the forwardmost lens element in the first lens group can be minimized by arranging the aperture stop on the object side of the second lens group. The entire length of the optical system greatly depends on the distance between the first lens group and the second lens group. Therefore, if the distance between the first lens group and the second lens group is increased to interpose a variable aperture mechanism therebetween, it is required to increase the entire length of the optical system by e.g. about two to three times. In view of this, simplifying the arrangement of an aperture member with the aperture diameter being fixed is advantageous in reducing the thickness of the zoom optical system in the optical axis direction.

In one of the zoom optical systems, preferably, focusing from an infinite object to a close distance object may be performed by moving the first lens group toward the object side.

A change in aberrations resulting from moving the first lens group is relatively small. Accordingly, performing a focusing operation by moving the first lens group toward the object side enables to suppress performance degradation by focusing. Also, since a defocusing amount on the image plane with respect to the moving amount of the first lens group is large, it is possible to obtain desirable focusing performance up to a position close to the lens element by about several centimeters with a small moving amount.

In one of the zoom optical systems, preferably, focusing from an infinite object to a close distance object may be performed by moving the third lens group, or a lens group closer to the image side than the third lens group toward the object side.

In the above arrangement, a clear image can be obtained with respect to the close distance object by performing a focusing operation with use of the third lens group, or the lens group closer to the image side than the third lens group, without increasing the entire length of the optical system by protrusion of a lens barrel, or increasing the size of the forward most lens element. Judgment as to whether the first lens group is to be moved, or the third lens group or the lens group closer to the image side than the third lens group is to be moved in focusing can be determined depending on the optical specifications of the zoom optical system. In other words, in the case where a close-up distance is reduced as much as possible, and close-up performance is desirably maintained, the first lens group is moved. In the case where miniaturization is prioritized, the third lens group, or the lens group closer to the image side than the third lens group is moved.

In one of the zoom optical systems, preferably, the second lens group may include a cemented lens element.

If a zoom optical system is miniaturized in the optical axis direction, the moving amount of a second lens group is restricted. If an intended zoom ratio is obtained under the restricted condition, it is required to increase the power of the second lens group. As a result, error sensitivity such as sensitivity with respect to a curvature error, a center thickness error, or a refractive index error of a lens element, a distance error between lens elements, or a decentering error may be increased, which may require to enhance mechanical precision of a lens barrel, or adjust the position between the lens elements in the second lens group. Arranging the cemented lens element in the second lens group enables to significantly reduce error sensitivity of each lens element in the second lens group, and desirably keep the balance in sensitivity, even if adjustment between the lens elements in the second lens group is required. Also, the above arrangement enables to simplify the lens barrel arrangement of the second lens group. Thus, the above arrangement enables to efficiently utilize the space, which has been required to be expanded in the conventional arrangement, considering a mechanical constraint, despite an optical disadvantage. This is advantageous in further miniaturizing the zoom optical system. In addition to the above advantages, cementing lens elements into a cemented lens element is advantageous in suppressing unwanted reflection light between lens surfaces.

In one of the zoom optical systems, preferably, the first lens group may include a cemented lens element.

If a zoom optical system is miniaturized in the optical axis direction, decentering error sensitivity in the first lens group may be increased, which may require to enhance mechanical precision of a lens barrel, or adjust the position between the lens elements in the first lens group. Arranging the cemented lens element in the first lens group enables to significantly reduce decentering error sensitivity of each lens element in the first lens group, and desirably keep the balance in sensitivity, even if adjustment between the lens elements in the first lens group is required. Also, the above arrangement enables to simplify the lens barrel arrangement of the first lens group. Thus, the above arrangement enables to efficiently utilize the space, which has been required to be expanded in the conventional arrangement, considering a mechanical constraint, despite an optical disadvantage. This is advantageous in further miniaturizing the zoom optical system. In addition to the above advantages, cementing lens elements into a cemented lens element is advantageous in suppressing unwanted reflection light between lens surfaces.

In one of the zoom optical systems, preferably, at least one lens element in the lens groups may be made of a resin material.

In the above arrangement, using the resin lens element is advantageous in mass-producing the lens elements with stable quality, and significantly reducing the production cost.

In the above arrangement, preferably, the lens element made of the resin material may be a lens element produced by molding a material obtained by dispersing inorganic particles of 30 nm or less in maximum diameter in the resin material.

Generally, mixing fine particles in a transparent resin material causes light scattering, which may lower the light transmittance. Accordingly, it is difficult to use a transparent resin material containing fine particles, as an optical material. However, light scattering can be substantially eliminated by setting the size of fine particles smaller than the wavelength of a transmitted light flux. The refractive index of a resin material is lowered, as the temperature rises. However, the refractive index of fine particles of an inorganic material is increased, as the temperature rises. In view of this, a refractive index change can be substantially eliminated by utilizing and counteracting the temperature-dependent properties of the resin material and the inorganic material. Specifically, dispersing inorganic particles having a maximum diameter of 30 nm or less in a resin material as a base material enables to produce a resin material whose temperature-dependency on refractive index is significantly small. For instance, dispersing fine particles of niobium oxide ($Nb_2O_5$) in an acrylic resin enables to suppress a refractive index change by a temperature change. Accordingly, use of an inorganic-particle-dispersed resin material for producing at least one lens element is advantageous in suppressing a back focus error of the entirety of the zoom optical system in the embodiment of the invention, resulting from an ambient temperature change.

In the above zoom optical system, preferably, a positive lens element in a third lens group, or in a lens group closer to an image side than the third lens group may be the lens element made of the resin material.

In the above arrangement, since the positive lens element in the third lens group, or the lens group closer to the image side than the third lend group is made of the resin material, the production cost can be reduced without obstructing miniaturization. Also, in view of likelihood that the positive lens element may affect a back focus distance when the ambient temperature is changed, using the resin material, in which inorganic particles with 30 nm or less in maximum diameter are dispersed, as a material for the positive lens element, is advantageous in significantly suppressing the influence by the temperature change.

An imaging lens device according to yet another aspect of the invention includes one of the aforementioned zoom optical systems, and an image sensor for converting an optical image of a subject into an electrical signal, wherein the zoom optical system is operable to form the optical image of the subject on a light receiving surface of the image sensor. This arrangement enables to realize a compact, high-precision, and zoomable imaging lens device to be mounted on a mobile phone, a personal digital assistant, or a like device.

A digital apparatus according to still another aspect of the invention includes the aforementioned imaging lens device, and a controller for causing the imaging lens device and the image sensor to perform at least one of still image shooting and moving image shooting of the subject, wherein the zoom optical system of the imaging lens device is mounted in such a manner as to be operable to form the optical image of the subject on the light receiving surface of the image sensor. Preferably, the digital apparatus may be a mobile terminal. The above arrangements enable to realize a digital apparatus loaded with a high-precision and zoomable imaging lens device. The mobile terminal is a digital apparatus to be carried by a user in a normal use state, as represented by e.g. a mobile phone or a personal digital assistant.

The embodiment of the invention having the above arrangement enables to provide a zoom optical system having lens elements produced with less difficulty i.e. with substantially the same skill level as the conventional arrangement, while securing sufficient miniaturization, and particularly advantageous in providing a zoom optical system having a zoom ratio of about two to three times, and an imaging lens device or a digital apparatus loaded with the zoom optical system, at a less cost and with sufficient miniaturization.

The invention claimed is:

1. A zoom optical system, comprising:

a first lens group having a negative optical power; and a second lens group having a positive optical power in the order from an object side, a distance between the first lens group and the second lens group being decreased in zooming from a wide angle end to a telephoto end, wherein the first lens group includes at least one negative lens element and at least one positive lens element, the second lens group is constituted of three or less lens elements, and the zoom optical system satisfies the conditional expressions (1) and (2):

$$0.5 < D1/fw < 0.8 \quad (1)$$

$$0.7 < f2/fw < 2.0 \quad (2)$$

where

D1: a thickness of the first lens group on an optical axis from a forwardmost lens surface to a rearmost lens surface, fw: a composite focal length of an entirety of the optical system at the wide angle end, and f2: a composite focal length of the second lens group, wherein the second lens group is constituted of a positive lens element and a negative lens element in the order from the object side, and the zoom optical system satisfies the conditional expression (8):

$$0.7 < |f2n/f2p| < 1.8 \quad (8)$$

where f2p: a focal length of the positive lens element in the second lens group, and f2n: a focal length of the negative lens element in the second lens group, and wherein the second lens group satisfies the conditional expressions (11) and (12):

$$|N2p-N2n| > 0.15 \quad (11)$$

$$|v2p-v2n| > 30 \quad (12)$$

where

N2p: a refractive index of the positive lens element in the second lens group, v2p: the Abbe number of the positive lens element in the second lens group, N2n: a refractive index of the negative lens element in the second lens group, and v2n: the Abbe number of the negative lens element in the second lens group.

2. A zoom optical system, comprising:

a first lens group having a negative optical power; and a second lens group having a positive optical power in the order from an object side, a distance between the first lens group and the second lens group being decreased in zooming from a wide angle end to a telephoto end, wherein the first lens group includes at least one negative lens element and at least one positive lens element, the second lens group is constituted of three or less lens elements, and the zoom optical system satisfies the conditional expressions (1) and (2):

$$0.5 < D1/fw < 0.8 \quad (1)$$

$$0.7 < f2/fw < 2.0 \quad (2)$$

where

D1: a thickness of the first lens group on an optical axis from a forwardmost lens surface to a rearmost lens surface, fw: a composite focal length of an entirety of the optical system at the wide angle end, and wherein the first lens group includes a cemented lens element.

3. A zoom optical system, comprising:

a first lens group having a negative optical power; and a second lens group having a positive optical power in the order from an object side, a distance between the first lens group and the second lens group being decreased in zooming from a wide angle end to a telephoto end, wherein the first lens group includes at least one negative lens element and at least one positive lens element, the second lens group is constituted of three or less lens elements, and the zoom optical system satisfies the conditional expressions (1) and (2):

$$0.5 < D1/fw < 0.8 \quad (1)$$

$$0.7 < f2/fw < 2.0 \quad (2)$$

where

D1: a thickness of the first lens group on an optical axis from a forwardmost lens surface to a rearmost lens surface, fw: a composite focal length of an entirety of the optical system at the wide angle end, and wherein at least one lens element in the lens groups is made of a resin material, and the lens element made of the resin material is a lens element produced by molding a material obtained by dispersing inorganic particles of 30 nm or less in maximum diameter in the resin material.

4. A zoom optical system, comprising:

a first lens group having a negative optical power; and a second lens group having a positive optical power in the order from an object side, a distance between the first lens group and the second lens group being decreased in zooming from a wide angle end to a telephoto end, wherein the first lens group includes at least one negative lens element and at least one positive lens element, the second lens group is constituted of three or less lens elements, and the zoom optical system satisfies the conditional expressions (3) and (4):

$$|\Delta Z1pi/d1pi| < 0.2 \quad (3)$$

$$0.7 < f2/fw < 2.0 \quad (4)$$

where $\Delta Z1pi$: a sag amount of an image-side lens surface of a positive lens element in the first lens group at a maximum effective radius, with a vertex of the lens surface being defined as a reference, $d1pi$: the maximum effective radius of the image-side lens surface of the positive lens element in the first lens group, $fw$: a composite focal length of an entirety of the optical system at the wide angle end, and $f2$: a composite focal length of the second lens group.

5. The zoom optical system according to claim 4, further comprising a third lens group having a positive optical power on an image side of the second lens group.

* * * * *